(12) United States Patent
Araki

(10) Patent No.: US 11,470,132 B2
(45) Date of Patent: Oct. 11, 2022

(54) INFORMATION PROCESSING APPARATUS, INFORMATION PROCESSING SYSTEM, ELECTRONIC BLACKBOARD APPARATUS, CONTROL METHOD, AND PROGRAM

(71) Applicant: Shigeo Araki, Kanagawa (JP)

(72) Inventor: Shigeo Araki, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 189 days.

(21) Appl. No.: 16/697,884

(22) Filed: Nov. 27, 2019

(65) Prior Publication Data
US 2020/0177648 A1    Jun. 4, 2020

(30) Foreign Application Priority Data

Nov. 29, 2018  (JP) .............................. JP2018-224054
Mar. 8, 2019   (JP) .............................. JP2019-043194

(51) Int. Cl.
| | |
|---|---|
| *H04L 65/403* | (2022.01) |
| *G06F 3/048* | (2013.01) |
| *H04L 65/1069* | (2022.01) |
| *G06Q 10/06* | (2012.01) |
| *H04L 12/18* | (2006.01) |

(52) U.S. Cl.
CPC ............ *H04L 65/403* (2013.01); *G06F 3/048* (2013.01); *G06Q 10/06* (2013.01); *H04L 12/1822* (2013.01); *H04L 65/1069* (2013.01)

(58) Field of Classification Search
CPC ..... G06F 3/048; G06Q 10/06; H04L 12/1822; H04L 65/1069; H04L 65/403
See application file for complete search history.

(56) References Cited

U.S. PATENT DOCUMENTS

| | | | | |
|---|---|---|---|---|
| 6,044,466 A | * | 3/2000 | Anand .................... | G06F 21/54 726/1 |
| 2004/0111520 A1 | * | 6/2004 | Krantz .................. | H04L 69/329 709/229 |

(Continued)

FOREIGN PATENT DOCUMENTS

| | | |
|---|---|---|
| JP | H11-161602 | 6/1999 |
| JP | 2006-005590 | 1/2006 |

(Continued)

OTHER PUBLICATIONS

Japanese Office Action for 2019-043194 dated Aug. 30, 2022 4 pages.

*Primary Examiner* — Ariel Mercado
*Assistant Examiner* — William Wong
(74) *Attorney, Agent, or Firm* — IPUSA, PLLC

(57) ABSTRACT

An information processing apparatus utilized by a plurality of users at a predetermined installation location including circuitry that implements to perform login authentication of the plurality of users, register the plurality of users who have been subjected to the login authentication into a participant view, determine whether a predetermined condition has been satisfied by each of the plurality of the users registered in the participant view, and restrict access to a resource owned by any one of the plurality of users registered in the participant view while maintaining the registration of the plurality of users in the participant view if it is determined that the predetermined conditions have been satisfied.

16 Claims, 40 Drawing Sheets

(56) References Cited

U.S. PATENT DOCUMENTS

| | | | | |
|---|---|---|---|---|
| 2004/0186594 A1* | 9/2004 | Kondo | ................ | G06F 16/50 |
| | | | | 700/9 |
| 2005/0233743 A1* | 10/2005 | Karaoguz | ........... | H04L 65/4038 |
| | | | | 455/432.3 |
| 2010/0169798 A1* | 7/2010 | Hyndman | ............... | A63F 13/12 |
| | | | | 715/757 |
| 2011/0154266 A1* | 6/2011 | Friend | ...................... | G09B 5/06 |
| | | | | 715/863 |
| 2011/0231795 A1* | 9/2011 | Cheon | ................. | G06F 3/0481 |
| | | | | 715/810 |
| 2011/0271332 A1* | 11/2011 | Jones | ................... | H04L 9/3247 |
| | | | | 726/7 |
| 2011/0295392 A1* | 12/2011 | Cunnington | ............ | H04N 7/15 |
| | | | | 700/90 |
| 2014/0108544 A1* | 4/2014 | Lewis | ................ | H04L 12/1818 |
| | | | | 709/204 |
| 2018/0074761 A1 | 3/2018 | Yamaguchi | | |
| 2019/0020770 A1 | 1/2019 | Araki | | |
| 2019/0129669 A1 | 5/2019 | Takahashi et al. | | |
| 2019/0235735 A1 | 8/2019 | Toyota et al. | | |

FOREIGN PATENT DOCUMENTS

| | | |
|---|---|---|
| JP | 2009-163282 | 7/2009 |
| JP | 2015-075975 | 4/2015 |
| JP | 2018-046326 | 3/2018 |
| JP | 2018-055632 | 4/2018 |

\* cited by examiner

FIG.5

SERVICE ACCOUNT INFORMATION

| USER ID | NAME | MAIL ADDRESS |
|---|---|---|
| a01 | MARY | a01@example.com |
| a02 | SATO | a02@example.com |
| a03 | SAITO | a03@example.com |
| ... | ... | ... |

FIG.6

STORAGE INFORMATION

| OWNER USER | TYPE | NAME |
|---|---|---|
| a02 | FILE | a02.doc |
| a02 | FOLDER | /WeeklyMeeting |

FIG.7

USER INFORMATION VIEW

| USER ID | NAME | PASSWORD | SETTING INFORMATION | SERVICE INFORMATION | IDENTIFICATION INFORMATION |
|---|---|---|---|---|---|
| user001 | MARY SMITH | 1qaz | setting1 | service11, service12 | ICCARD-123 |
| user002 | SATO SUZUKI | 2wsx | setting2 | service21, service22 | ICCARD-248 |
| user003 | SAITO YU | 3edc | setting3 | service3 | ICCARD-390 |
| ... | | | | | ... |

FIG.8

SERVICE INFORMATION VIEW

| SERVICE INFORMATION | USER ID | ADDRESS INFORMATION | USER ID OF EXTERNAL SERVICE | AUTHENTICATION TOKEN FOR EXTERNAL SERVICE |
|---|---|---|---|---|
| service11 | user001 | office.example.com | a01 | eyJhbGc11... |
| service12 | user001 | suite.example.com | b01 | eyJhbGc12... |
| service21 | user002 | office.example.com | a02 | eyJhbGc21... |
| service22 | user002 | suite.example.com | b02 | eyJhbGc22... |
| service3 | user003 | alice@example.com | | |
| ... | | ... | | ... |

FIG.10

PARTICIPANT VIEW

| USER ID | USER NAME | AUTHENTICATION STATUS | FINAL AUTHENTICATION TIME | DELIVERY DESTINATION INFORMATION |
|---|---|---|---|---|
| user001 | MARY SMITH | OFF | 2018/4/29 13:00:00 | a01@office.example.com |
| user002 | SATO SUZUKI | ON | 2018/4/29 13:15:00 | a02@office.example.com |
| user003 | SAITO YU | ON | 2018/4/29 13:16:00 | a03@office.example.com |
| ... | ... | ... | ... | ... |

FIG.14

| SERVICE INFORMATION | USER ID | ADDRESS INFORMATION | USER ID OF EXTERNAL SERVICE | AUTHENTICATION TOKEN OF EXTERNAL SERVICE |
|---|---|---|---|---|
| service11 | user001 | office.example.com | a01 | eyJhbGc11·· |
| service12 | user001 | suite.example.com | b01 | eyJhbGc12··· |

FIG.22

| USER ID | FEATURE POINT DATA |
|---------|---------------------|
| user001 | C802FFC2··· |
| user002 | B88820FE··· |
| ··· | ··· |

FIG.29

| APPARATUS IP | PARTICIPANT |
|---|---|
| 192.168.0.2 | user001, user002, user003 |
| 192.168.0.5 | user008 |
| ... | ... |

INFORMATION PROCESSING APPARATUS, INFORMATION PROCESSING SYSTEM, ELECTRONIC BLACKBOARD APPARATUS, CONTROL METHOD, AND PROGRAM

CROSS-REFERENCE TO RELATED APPLICATIONS

This application is based on and claims priority to Japanese Patent Application No. 2018-224054, filed on Nov. 29, 2018, and Japanese Patent Application No. 2019-043194, filed on Mar. 8, 2019, the entire contents of which are incorporated herein by reference.

BACKGROUND OF THE INVENTION

1. Field of the Invention

The present invention relates to an information processing apparatus, an information processing system, an electronic blackboard apparatus, a control method, and a program.

2. Description of the Related Art

Patent Document 1 discloses a technique in which, by authenticating a participant in a remote meeting, the participant can share individual files and shared files stored on a shared workspace server.

[Patent Document 1] Japanese Laid-Open Patent Application Publication No. 2006-5590

SUMMARY OF THE INVENTION

One aspect of the embodiments of the present invention may be to provide an information processing apparatus utilized by a plurality of users at a predetermined installation location including a circuitry that implements to perform login authentication of the plurality of users, register the plurality of users who have been subjected to the login authentication into a participant view, determine whether a predetermined condition has been satisfied by each of the plurality of the users registered in the participant view, and restrict access to a resource owned by any one of the plurality of users registered in the participant view while maintaining the registration of the plurality of users in the participant view if it is determined that the predetermined conditions have been satisfied.

BRIEF DESCRIPTION OF THE DRAWINGS

FIG. 5 is a configuration diagram illustrating an example of service account information.

FIG. 6 is a configuration diagram illustrating an example of storage information.

FIG. 7 is a configuration diagram of an example of a user information view.

FIG. 8 is a configuration diagram illustrating an example of a service information view.

FIG. 10 is a diagram illustrating an example of a list of participants used in the information processing system according to the first embodiment.

FIG. 14 is a diagram illustrating an example of the service information acquired by a participant management unit according to the first embodiment.

FIG. 22 is a diagram illustrating an example of feature point data information used in the electronic blackboard apparatus according to the second embodiment.

FIG. 29 is a diagram illustrating an example of the apparatus management information held by the apparatus management information unit.

DETAILED DESCRIPTION OF THE PREFERRED EMBODIMENTS

A description is given below, with reference to the FIG. 1 through FIG. 42 of embodiments of the present invention. Where the same reference symbols are attached to the same parts, repeated description of the parts is omitted.

Reference symbols typically designate as follows:
1 Information processing system;
10 User information server;
12 External service group system;
11 Apparatus management server;
14,14A,14B Electronic blackboard apparatus (information processing apparatus);
16 Network;
18 PC;
20 User information unit;
30 Apparatus management unit;
32 Apparatus management information unit;
40 User service;
44 Storage service;
52 File reading unit;
54 File transmission unit (file transmission means);
56 Participant management unit;
56A Authentication unit (authentication means);
56B Registration unit (registration means);
56C Determination unit (determination means);
56D Restriction unit (restriction means);
58 Blackboard display unit;
60 Remote connection unit;
64 IC card detection unit;
66 Face tracking unit;
70 Remote connection unit;
618 Camera (image capturing means);
1100 File chooser;
1200 Storage folder selection screen;
1300 User individual information display screen;
1310 Login authentication status;
1320 File read button;
1330 Save file button;
3600 Recommended connection destination screen; and
3700 Connection destination selection screen.

However, when a plurality of users are logged in to an information processing apparatus such as the electronic blackboard apparatus, for example, when some users move away from the vicinity of the information processing apparatus, there is a risk that other users may have unauthorized access to the resources owned by the user.

Embodiments of the present invention are intended to prevent other users from unauthorized access to resources owned by the user when some users move away from the vicinity of the information processing apparatus.

Hereinafter, one embodiment of the present invention will be described with reference to the drawings. According to this embodiment, as an example of an "information processing apparatus", an example of the electronic blackboard apparatus that performs remote sharing will be described. However, the present invention is not limited to the electronic blackboard apparatus. It may be an information processing apparatus such as a PC.

First Embodiment (System Configuration)

Figure 1:
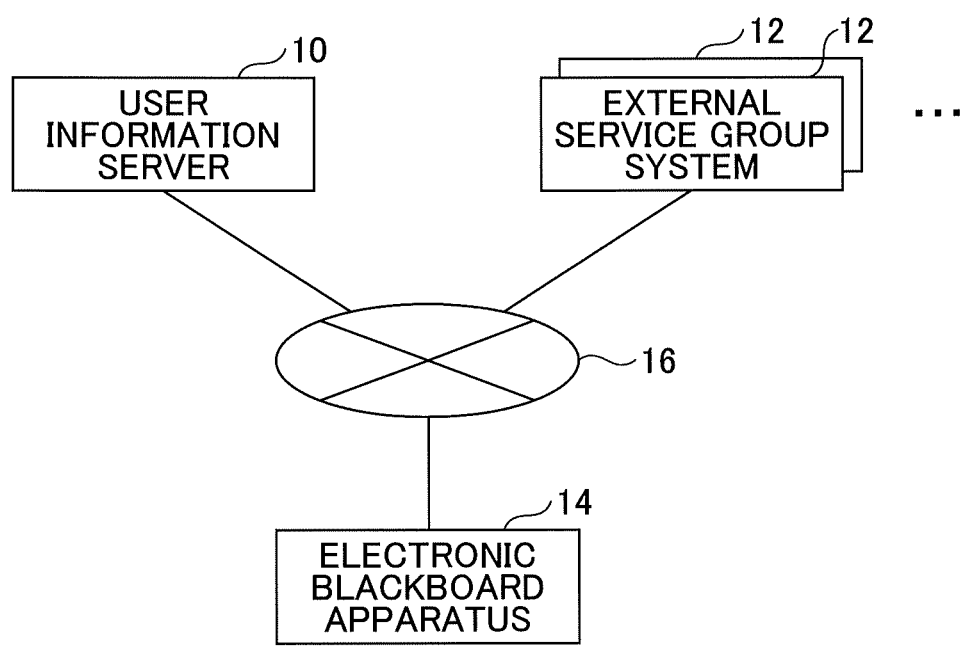
FIG. 1 is a configuration diagram illustrating an example of an information processing system according to a first embodiment.

FIG. 1 is a configuration diagram illustrating an example of an information processing system according to the first embodiment. In the information processing system 1 illustrated in FIG. 1, a user information server 10, a plurality of external service group systems 12 and the electronic blackboard apparatus 14 are connected to each other in a communicable manner via a network 16 such as the Internet or a LAN. The user information server 10 and the electronic blackboard apparatus 14 form an electronic blackboard system. The user information server 10 and the electronic blackboard apparatus 14 operate in association with the external service group system 12 external to the electronic blackboard system to provide a function related to the electronic blackboard apparatus 14.

An external service group provided by the external service group system 12 is also called groupware, and each service belonging to the same external services group can be used with the same authentication information (combination of ID and a password, an access token, etc.).

For example, an external service group refers to an integrated service such as Office 365® ("Office 365" is a registered trademark), which consists of user service, storage service, schedule service, shared site service, etc. External services are provided in the form of services such as user services, storage services, schedule services, and shared site services that can be used by the same user account.

Multiple external service groups are provided, for example, by different companies. Therefore, for example, it is assumed that one user uses A's external service group and B's external service group. Different companies are by way of example, and may be provided with multiple set of external services by the same company. The external service group system 12 is implemented by at least one computer.

The user information server 10 stores a user information view (see FIG. 7) and the like and is used from the electronic blackboard apparatus 14. The user information server 10 may not be on the same network segment. The user information server 10 may be embedded in the electronic blackboard apparatus 14. The user information server 10 is implemented by at least one computer.

The electronic blackboard apparatus 14 displays, for example, an image drawn by an electronic pen or hand. The electronic blackboard apparatus 14 may also display an image of an electronic file read from a USB memory, a PC connected via a cable, or the like. The electronic blackboard apparatus 14 is provided with an authentication function for authenticating the user, such as IC card authentication and face authentication.

The electronic blackboard apparatus 14 is an example of an "information processing apparatus." However, the "information processing apparatus" may be any information processing apparatus that is available to a plurality of users, not limited to the electronic blackboard apparatus. The configuration of the information processing system 1 illustrated in FIG. 1 is an example. For example, a portion of the functions of the electronic blackboard apparatus 14 may be provided in a user information server 10, an external service group system 12, or other server apparatus or the like. For example, a portion of the functions of the user information server 10 may be provided in the electronic blackboard apparatus 14, an external service group system 12, or other server device.

(Computer Hardware Configuration)

Figure 2:
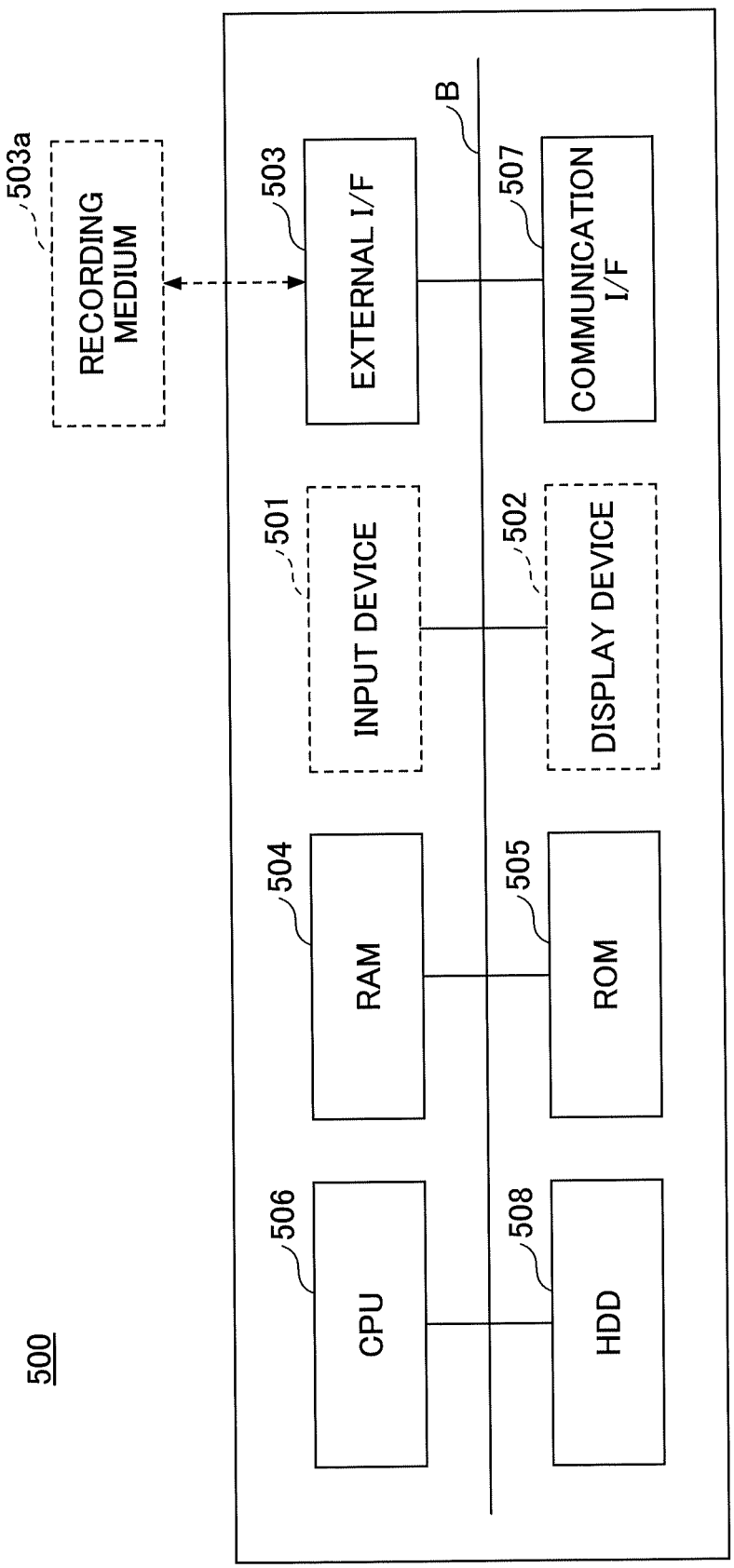
FIG. 2 is an example of a hardware configuration diagram of a computer.

FIG. 2 is an example of a hardware configuration diagram of a computer. For example, the functions of the user information server 10 and the external service group system 12 illustrated in FIG. 1 are implemented by a computer having the hardware configuration illustrated in FIG. 2.

The computer 500 illustrated in FIG. 2 includes an input device 501, a display device 502, an external I/F 503, a RAM 504, a ROM 505, a CPU 506, a communication I/F 507, and an HDD 508, each of which is interconnected by a bus B. The input device 501 and the display device 502 may be connected to and utilized by the computer 500 when necessary.

The input device 501 may include a keyboard, mouse, touch panel, or the like, and may be used by a user to input respective operation signals. The display device 502 includes a display or the like to display the results of processing by computer 500.

The communication I/F 507 is an interface that connects the computer 500 to various networks. Thus, the computer 500 can perform data communication via the communication I/F 507.

The HDD 508 is an example of a non-volatile memory device that stores programs and data.

The stored programs and data include the operating system, which is the basic software for controlling the entire computer 500, and applications that provide various functions on the operating system. The computer 500 may use a drive device (for example, a solid state drive (SSD)) that replaces the HDD 508 and uses a flash memory as the memory medium.

The external I/F 503 is an interface with an external device. The external device includes a recording medium 503a or the like. This allows the computer 500 to read and/or write the recording medium 503a via the external I/F 503. The recording medium 503a includes a flexible disk, CD, DVD, SD memory card, USB memory, SIM card, and the like.

The ROM 505 is an example of a non-volatile semiconductor memory (memory device) that can hold programs and data even when the power is turned off. The ROM 505 stores programs and data such as BIOS, OS settings, and network settings that are executed when the computer 500 starts up. The RAM 504 is an example of a volatile semiconductor memory (memory device) that temporarily holds a program and data.

The CPU 506 is an arithmetic device which realizes the control and functions of the entire computer 500 by reading out the program and data from storage devices such as the ROM 505 and the HDD 508 to the RAM 504 and executing processing. The CPU 506 may be implemented by one or more processors.

(Hardware Configuration of Electronic Blackboard Apparatus)

Figure 3:
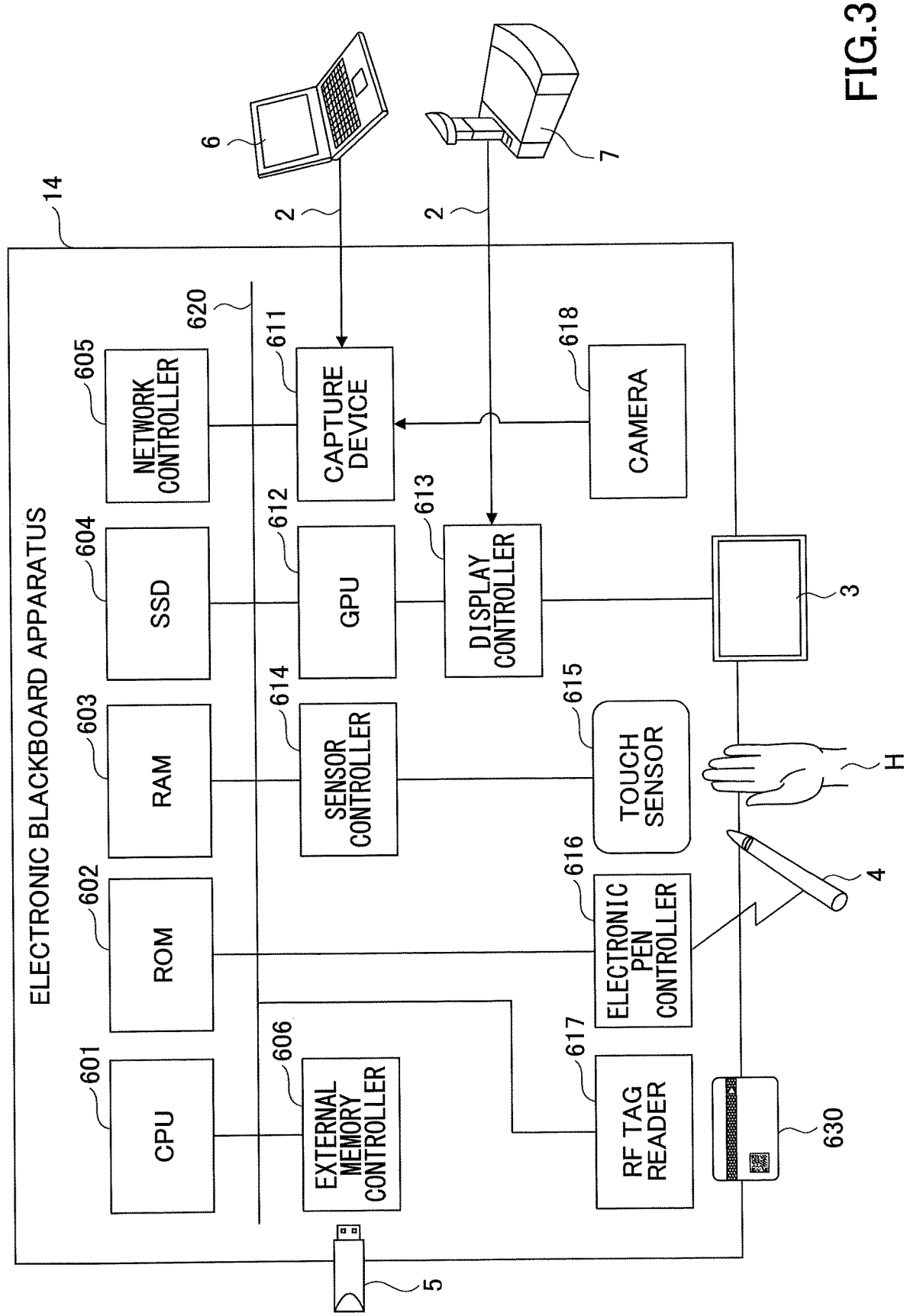
FIG. 3 is an example of a hardware configuration diagram of an electronic blackboard apparatus.

FIG. 3 is an example of a hardware configuration diagram of the electronic blackboard apparatus. The electronic blackboard apparatus 14 includes a CPU 601, ROM 602, RAM 603, SSD 604, network controller 605, external memory controller 606, capture device 611, GPU 612, display controller 613, sensor controller 614, touch sensor 615, electronic pen controller 616, RF tag reader 617, and camera 618.

The CPU 601 controls the operation of the entire electronic blackboard apparatus 14. ROM 602 stores the program used to drive CPU 601. RAM 603 is used as the work area of CPU 601. The SSD 604 stores various data, such as a program for the electronic blackboard apparatus 14. The network controller 605 controls communication with the network 16. The external memory controller 606 controls communication with a recording medium such as the USB memory 5.

The electronic blackboard apparatus 14 also includes a capture device 611, a GPU (Graphics Processing Unit) 612, a display controller 613, a sensor controller 614, a touch sensor 615, an electronic pen controller 616, an RF tag reader 617, and a camera 618.

The capture device 611 captures video information from the PC 6 or camera 618 as a still image or video file. GPU 612 specializes in graphics. The display controller 613 controls and manages the screen display to output the output image from the GPU 612 to the display 3 or the video meeting terminal 7. The sensor controller 614 controls the processing of the touch sensor 615. The touch sensor 615 detects that the electronic pen 4, the hand H of the user, or the like has come into contact with the display 3.

The touch sensor 615 performs input of coordinates and detection of coordinates in an infrared cutoff manner. A method of inputting coordinates and detecting coordinates is a method in which two light emitting and receiving devices installed at both upper ends of the display 3 emit a plurality of infrared rays parallel to the display 3 and are reflected by a reflecting member provided around the display 3 to receive light coming back on the same optical path as the light emitted by the light receiving device. The touch sensor 615 outputs to the sensor controller 614 the infrared ID emitted by the two emitting and receiving devices interrupted by the object. The sensor controller 614 identifies the coordinate position that is the contact position of the object.

The touch sensor 615 is not limited to an infrared blocking method. Various detection means may be used, such as a touch panel of an electrostatic capacitance type in which a contact position is specified by sensing a change in capacitance, a touch panel of a resistive film type in which a contact position is specified by a voltage change of two opposing resistive films, and an electromagnetic induction type in which an electromagnetic induction caused by a contact object contacts a display portion is sensed and a contact position is specified.

The electronic pen controller 616, in communication with the electronic pen 4, determines whether there is a touch on the tip of the pen or the butt of the pen to the display 3. Further, the electronic pen controller 616 may determine whether a touch is made on a part of the electronic pen 4 that is grasped by a user of the electronic pen 4 or on another part of the electronic pen 4.

RF tag reader 617 wirelessly reads identification information unique to IC card 630 from an RF tag embedded in IC card 630. The RF tag reader 617 may be embedded in or externally attached to the electronic blackboard apparatus 14. The IC card 630 may include a smart device such as a smartphone. Further, the electronic blackboard apparatus 14 may use other than the RF tag reader 617 if it can obtain user identifiable information, or may use a biometric device (such as a fingerprint, a palm print, or an iris) or a bar code reader.

The electronic blackboard apparatus 14 includes a bus line 620, such as an address bus or data bus, for electrically connecting the CPU 601, ROM 602, RAM 603, SSD 604, network controller 605, external memory controller 606, capture device 611, GPU 612, sensor controller 614, electronic pen controller 616, and RF tag reader 617 to each other. The program for the electronic blackboard apparatus 14 may be stored and distributed in a computer-readable recording medium such as a CD-ROM.

(Functional Configuration of Information Processing System 1)

Figure 4:
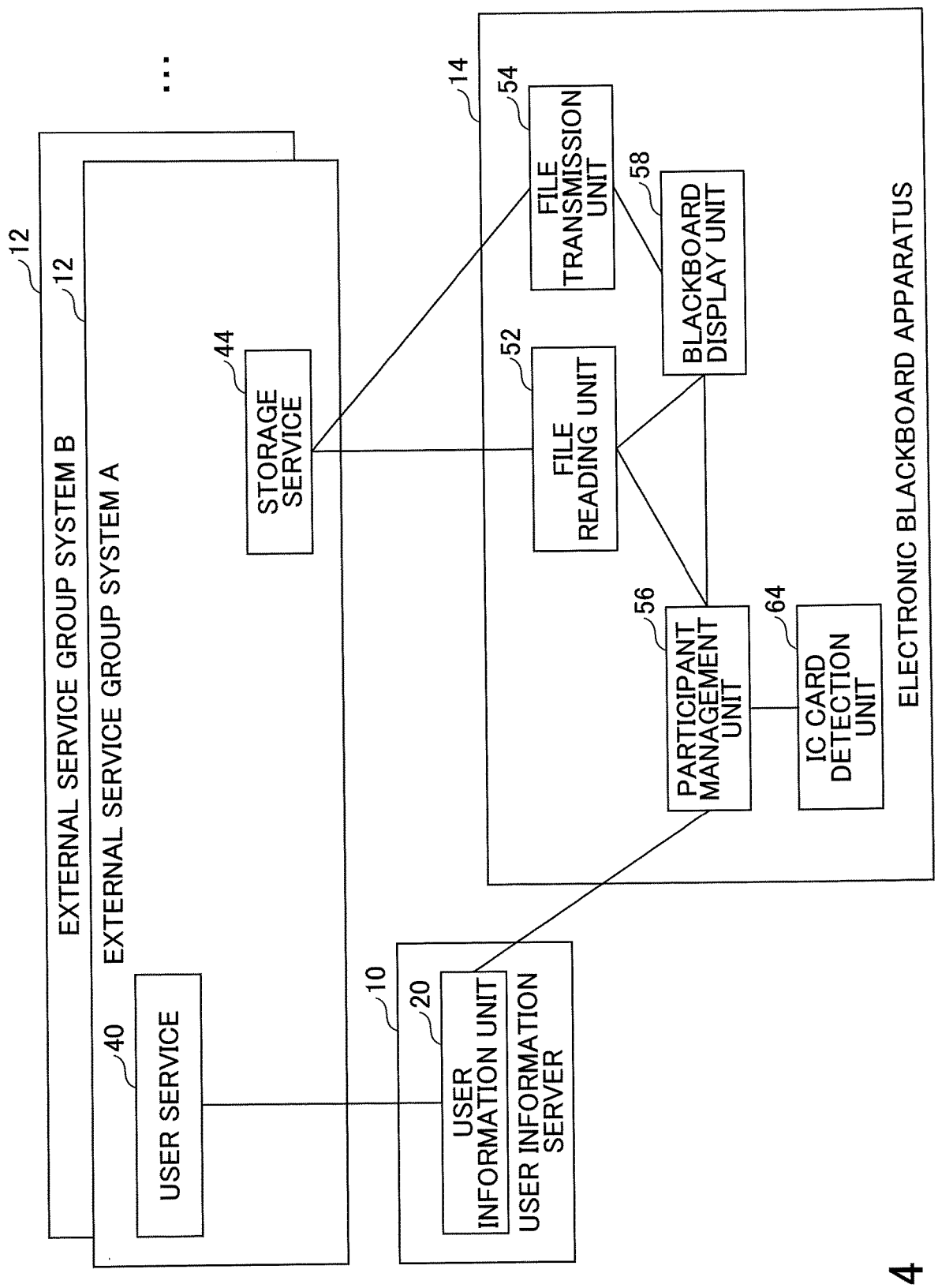
FIG. 4 is a functional configuration diagram illustrating an example of an information processing system according to the first embodiment.

FIG. 4 is a functional configuration diagram illustrating an example of an information processing system according to the first embodiment. In the information processing system 1 illustrated in FIG. 4, the external service group system 12 includes a user service 40 and a storage service 44.

The user service 40 stores, for example, the service account information illustrated in FIG. 5. FIG. 5 is a configuration diagram illustrating an example of service account information. The service account information of FIG. 5 includes the user ID, name, and mail address of the user (the user of the external service) using the external service group system 12.

The storage service 44 is capable of storing and reading the user's files and stores, for example, the storage information illustrated in FIG. 6. FIG. 6 is a configuration diagram illustrating an example of storage information. For example, the storage information of FIG. 6 includes the file or folder owner user, the file or folder type, and the name of the file or folder. As described above, the storage information manages the types of files and folders, as well as the names of files and folders owned by each user.

The user information server 10 includes a user information unit 20. The user information unit 20 stores the user information view illustrated in FIG. 7 and a list of the service information view illustrated in FIG. 8. FIG. 7 is a configuration diagram of an example of a user information view. FIG. 8 is a configuration diagram of an example of a service information view;

The user information view illustrated in FIG. 7 includes the user ID, name, password, setting information, service information, and identification information of the user (the user of the electronic blackboard system) managed in the electronic blackboard system. The service information view illustrated in FIG. 8 is information that matches the user ID of the user of the electronic blackboard system with the user ID of the user of the external service and includes the service information, the user ID of the electronic blackboard system, the address information, the user ID of the external service, and an authentication token of the external service.

The service information included in the user information view is information for specifying the service information from the service information view illustrated in FIG. 8. The identification information included in the user information view is the identification information for uniquely identifying the IC card 630. For example, the identification information "ICCARD-123" illustrated in FIG. 7 is identification information for uniquely identifying the IC card 630 possessed by the user to which the "user001" is assigned. The service information of the user identified by the identification information can be specified from the service information view illustrated in FIG. 8 by using the user information view illustrated in FIG. 7.

The service information view illustrated in FIG. 8 is a service information view for the user to use the external service group system 12. The service information has an account (user ID, name, and mail address) for each external service group for each user. Each user has one or more external services accounts. For example, if one user uses two external service groups, two service information items exists for one user. That is, the service information is an identifier for uniquely identifying all the account information using this information processing system 1 regardless of the account information of any external service group. The address information and the user ID of the external service are examples of connection information to the external service group system 12. The external service authentication token is an example of the authentication information of the external service group system 12.

The electronic blackboard apparatus 14 includes a file reading unit 52, a file transmission unit 54, a participant management unit 56, a blackboard display unit 58, and an IC card detection unit 64.

The IC card detection unit 64 is a function implemented by an RF tag reader 617. The IC card detection unit 64 reads identification information from the user's IC card 630.

The participant management unit 56 transmits the identification information read by the IC card detection unit 64 to the user information server 10 and acquires the service information of the user corresponding to the identification information from the user information unit 20 of the user information server 10. The participant management unit 56 transmits the service information of the user obtained from the user information unit 20 to the file reading unit 52 and the file transmission unit 54.

The file reading unit 52 reads the file from the storage service 44 of the external service group system 12. The file reading unit 52 has a UI that causes a user to select a file to be read from the storage service 44.

The file transmission unit 54 transmits a file to be stored (for example, a file representing the board writing content displayed by the blackboard display unit 58) to the storage service 44 and stores the file in the storage service 44. The file transmission unit 54 has a UI that causes a user to select a folder to which a file to be saved is to be saved.

The blackboard display unit 58 is a function for displaying various information on the display 3 (see FIG. 3). For example, the blackboard display unit 58 displays a file read from the storage service 44 by the file reading unit 52 on the display 3. For example, the blackboard display unit 58 displays the contents of the board written by the user on the display 3.

(Detailed Functional Configuration of Participant Management Unit 56)

Figure 9:
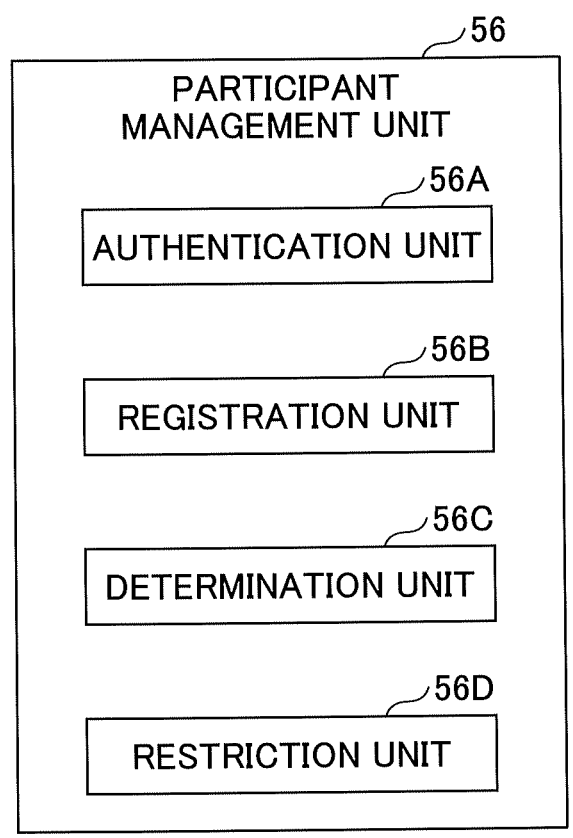
FIG. 9 is a block diagram illustrating a detailed functional configuration of a participant management unit section according to the first embodiment.

FIG. 9 is a block diagram illustrating a detailed functional configuration of a participant management unit 56 according to the first embodiment. As illustrated in FIG. 9, the participant management unit 56 includes an authentication unit 56A, a registration unit 56B, a determination unit 56C, and a restriction unit 56D.

The authentication unit 56A is an example of the "authentication means" and performs login authentication by the user. Specifically, when the identification information is read from the IC card 630 by the RF tag reader 617, the authentication unit 56A determines whether the identification information is appropriate. When it is determined that the identification information is appropriate, the authentication unit 56A authenticates the user's login. The authentication unit 56A again requests login authentication of the user when the user satisfying the predetermined condition re-accesses the resource after restricting access to the resource possessed by the user satisfying the predetermined condition.

The registration unit 56B is an example of "registration means," and the participant view information (see FIG. 10) representing the login state of a user who is logged in authentication by the authentication unit 56A is registered in the participant view (see FIG. 10). The participant view is information stored in a memory provided by the electronic blackboard apparatus 14 (for example, RAM 603, SSD 604, or the like illustrated in FIG. 3).

The determination unit 56C is an example of "determination means" and determines whether a predetermined condition is fulfilled for each of a plurality of users registered in the participant view. In this embodiment, the predetermined condition determined by the determination unit 56C is that any user registered in the participant view has elapsed time since login authentication (i.e., elapsed time from the last authentication time illustrated in the participant view) reached a predetermined time.

The restricting unit 56D is an example of "restricting means." When it is determined that a predetermined condition is fulfilled for any user registered in the participant view, the restricting unit 56D restricts access to resources owned by the user. In this embodiment, the restricting unit 56D prohibits both reading out a file from a folder owned by a user in the storage service 44 and storing a file in a folder owned by a user in the storage service 44 as "restriction of access to a resource owned by a user."

While the restriction unit 56D is restricted, the authenticated participant is still registered in the participant view.

(Example of List of Participants)

FIG. 10 is a diagram illustrating an example of a list of participants used in the information processing system according to the first embodiment. As illustrated in FIG. 10, the participant view information of each of the plurality of users is registered by the registration unit 56B. Each participant view information includes the user ID, user name, authentication status, final authentication time, and distribution destination information of the electronic blackboard system.

In the participant view, when the user's login authentication is performed by the authentication unit 56A, the authentication status of the participant view information of the user is set to "ON", and the system time when the login authentication is performed at the final authentication time is set to "ON."

In the participant view, when it is determined that the user is away from the electronic blackboard apparatus 14 by the determination unit 56C, the authentication status of the participant view information of the user is set to "OFF." In addition, in each participant view information, the e-mail address of the distribution destination, which is used when a file is distributed to all users concurrently, is set in the distribution destination information.

(Outline of Information Processing System Processing)

Figure 11:
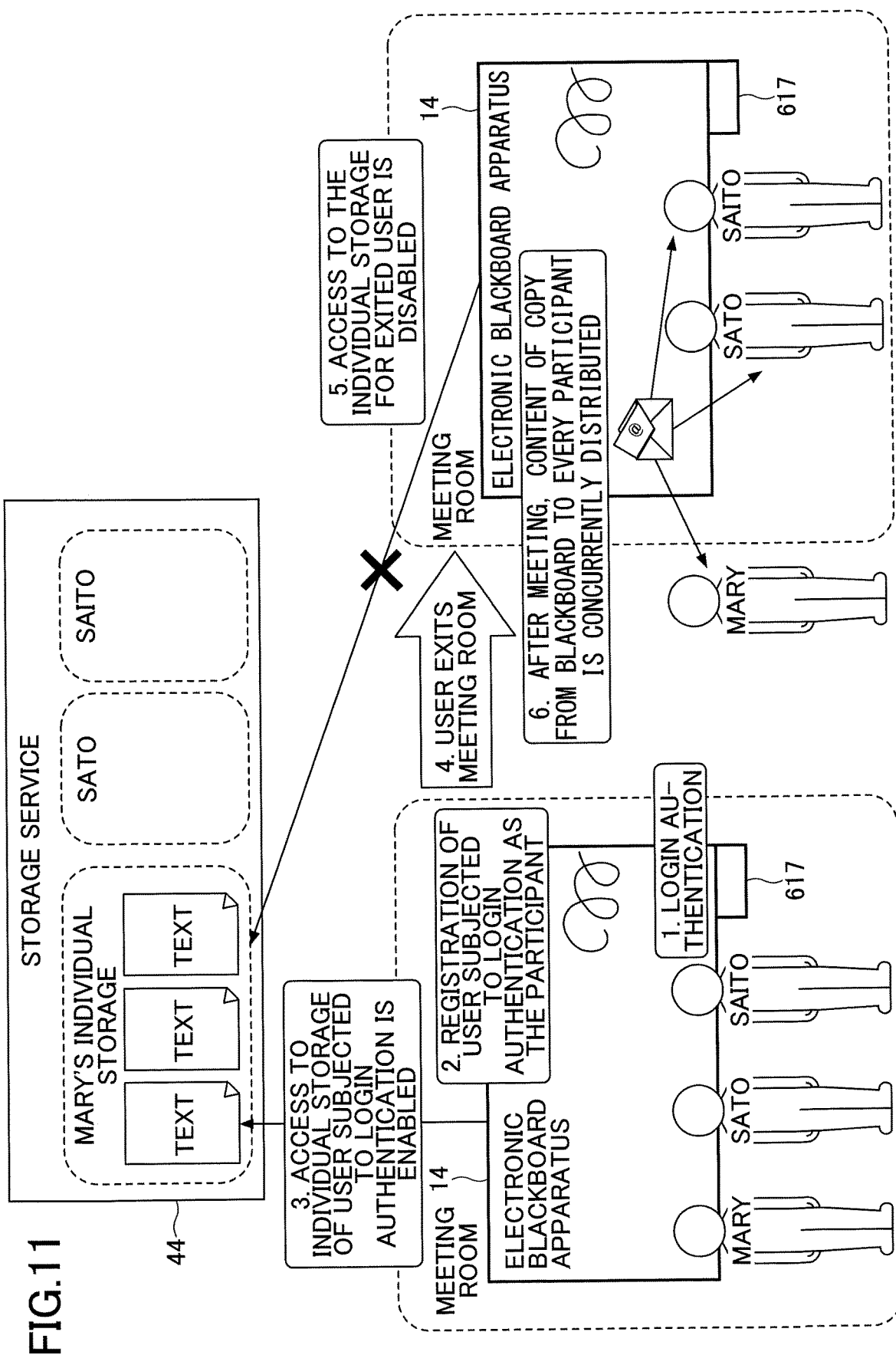
FIG. 11 is a diagram for explaining a processing overview by the information processing system according to the first embodiment.

FIG. 11 is a diagram for explaining a processing overview by the information processing system 1 according to the first embodiment. FIG. 11 illustrates an example of three users (Mary, Sato, Saito) holding a meeting in a meeting room using the electronic blackboard apparatus 14.

1. Each user is required to have login authenticated by the electronic blackboard apparatus 14 by placing an IC card 630 over the RF tag reader 617 to utilize the electronic blackboard apparatus 14. The user's login authentication may be by other means (e.g., by entering the user ID and password).

2. A user who has been logged in by the electronic blackboard apparatus 14 is able to register the participant view information and thereby recognize the participant as a participant by the electronic blackboard apparatus 14.

3. When login authentication is performed, each user is able to access (read and store files) the storage (not limited thereto, but may be a schedule service, shared site service, or the like) owned by him/her in the storage service 44 from the electronic blackboard apparatus 14.

4. When the user leaves the meeting room where the electronic blackboard apparatus 14 is installed, the login state is automatically uncertified. In this embodiment, after a period of time (e.g., 3 minutes) has elapsed since the user's login authentication was performed, the user is automatically in an unauthenticated state. "Authentication status" means the status in which resources can be used (authentication ON) by logging in and registering in the participant view. "Unauthenticated state" means a state in which the user has logged in and registered to the participant view, but the resource cannot be used (authentication OFF). Also, "logout state" means a state that is not included in the participant view or is deleted once, and for which the resource cannot be used.

5. If the user is in an unauthenticated state, the electronic blackboard apparatus 14 will not be able to access the user's storage. Accordingly, it is possible to prevent other users from illegally accessing the storage of users who have left the meeting room.

6. After the meeting, the electronic blackboard apparatus 14 can concurrently transmit a file indicating the content of copy from the blackboard displayed on the display 3 to all the users illustrated in the participant view (i.e., even the users in the unauthenticated state) by e-mail (not limited thereto, but may be a file transmission to an external storage device, a file server, or the like).

However, the electronic blackboard apparatus 14 does not distribute a file representing the content of the copy from the blackboard to a user who intentionally logs out of the apparatus. Further, in addition to the user for whom login authentication is performed, the electronic blackboard apparatus 14 may distribute a file representing the content of the copy from the blackboard to other users (for example, the user registered in the schedule) concurrently.

As described above, when a user leaves the meeting room, the information processing system 1 according to the present embodiment cannot automatically access the user's storage from the electronic blackboard apparatus 14. Therefore, according to the information processing system 1 according to this embodiment, it is possible to prevent another user other than the user who left the meeting room from illegally accessing the storage of the user who left the meeting room.

Figure 12:
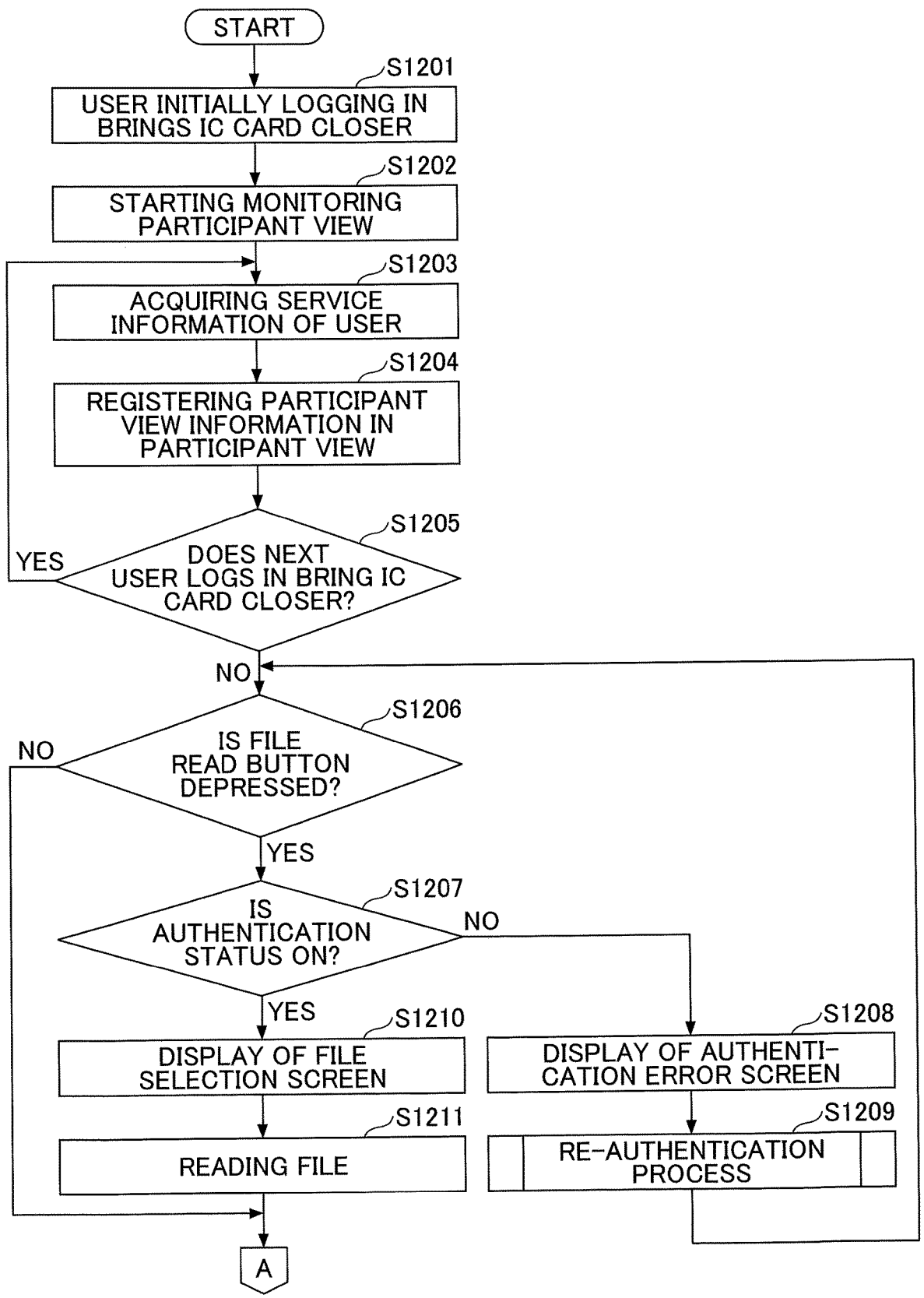
FIG. 12 is a flowchart illustrating a procedure of processing by the electronic blackboard apparatus according to the first embodiment.
Figure 13:
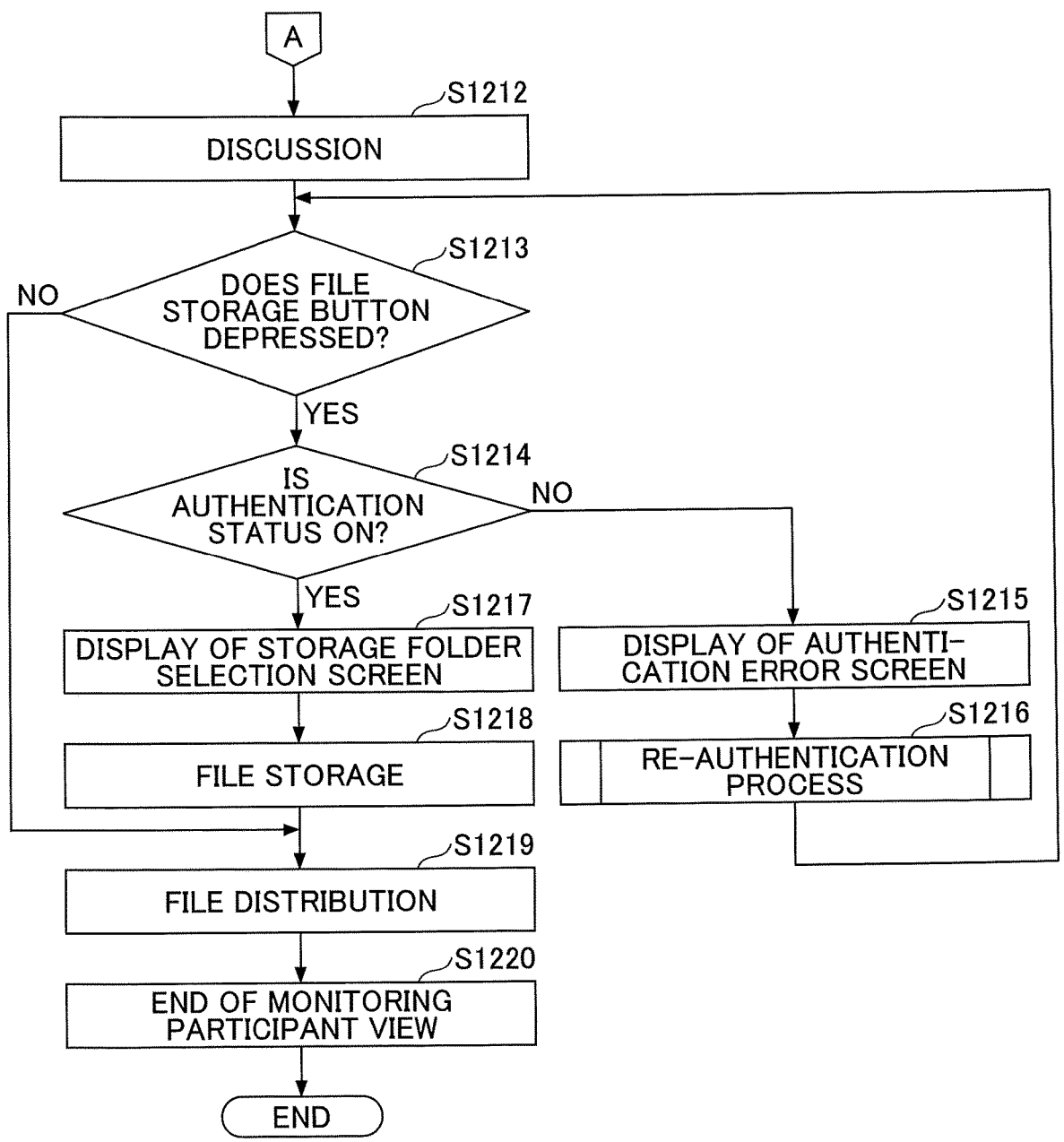
FIG. 13 is a flowchart illustrating a procedure of processing by the electronic blackboard apparatus according to the first embodiment.

FIGS. 12 and 13 are flowcharts illustrating a procedure of processing by the electronic blackboard apparatus 14 according to the first embodiment.

In the electronic blackboard apparatus 14, the user who first logs in holds the IC card 630 over the RF tag reader 617 (step S1201). At this time, the RF tag reader 617 reads the identification information from the IC card 630.

Next, the determination unit 56C of the participant management unit 56 starts monitoring the participant view (step S1202). Thereafter, the determination unit 56C calculates the elapsed time after login authentication for each user registered in the participant view at a predetermined time interval (for example, at 1 second intervals). When any user registered in the participant view reaches a predetermined time (for example, 3 minutes) after login authentication, the determination unit 56C determines that the user has moved away from the electronic blackboard apparatus 14. In this case, the determination unit 56C sets "OFF" to the authentication status of the participant view information of the user.

Next, in step S1203, the participant management unit 56 transmits the identification information read in step S1201 to the user information server 10 and acquires the service information of the user corresponding to the identification information from the user information server 10.

For example, when the identification information obtained from the IC card 630 is "ICCARD-123," the user ID "user001" corresponding to the identification information is identified from the list of the user information of FIG. 7. The participant management unit 56 acquires the service information "Service 11" and "Service 12" corresponding to the user ID "user 001" among the service information illustrated in FIG. 8. FIG. 14 is a diagram illustrating an example of the service information acquired by the participant management unit 56 according to the first embodiment.

Next, in step S1204, the registration unit 56B of the participant management unit 56 registers the participant view information (user ID, user name, authentication status, final authentication time, and distribution destination information of the electronic blackboard system) corresponding to the identification information read in step S1201 in the participant view.

Next, in step S1205, the participant management unit 56 determines whether the user who next logs in has placed the IC card 630 on the RF tag reader 617. In step S1205, when it is determined that "the user who logs in next held the IC card 630" (YES in step S1205), the electronic blackboard apparatus returns the process to step S1203 and acquires the service information and registers the participant view information for the user who logs in next.

Meanwhile, when it is determined in step S1205 that "the next user to log in does not hold the IC card 630 (NO in step S1205), the electronic blackboard apparatus 14 proceeds to process to step S1206.

In step S1206, the file reading unit 52 determines whether the file read button is depressed on any user individual information display screen 1300 (see FIG. 17) displayed for each user on the display 3 of the electronic blackboard apparatus 14. When it is determined in step S1206 that "the file read button is not depressed" (step S1206: No), the electronic blackboard apparatus 14 proceeds to process to step S1212.

Meanwhile, in step S1206, when it is determined that "the file read button is depressed" (YES in step S1206), the file reading unit 52 refers to the participant view information corresponding to the depressed file read button from the participant view and determines whether the authentication status of the user is ON (step S1207).

In step S1207, when it is determined that "the authentication status is not ON" in step S1207 (step S1207: No), the file reading unit 52 displays the authentication error screen 1400 (see FIG. 18) on the display 3 of the electronic blackboard apparatus 14 through the blackboard display unit 58 (step S1208) and performs a predetermined re-authentication process (step S1209). The electronic blackboard apparatus 14 returns the processing to step S1206.

A predetermined re-authentication process is, for example, a process in which a screen prompting the user to re-execute login authentication is displayed on display 3, or a process in which the user re-executes login authentication when the IC card 630 is held back in the RF tag reader 617. In this re-authentication process, when the user is again login authenticated, the authentication status in the participant view information of the user is set to "ON". In the example illustrated in FIG. 12, after the re-authentication process, the process is returned to step S1206, but this is not limited thereto. For example, in the re-authentication process, when the user is again login authenticated, the file reading unit 52 may proceed to the step S1210 and display the file selection screen on the display 3.

Figure 15:
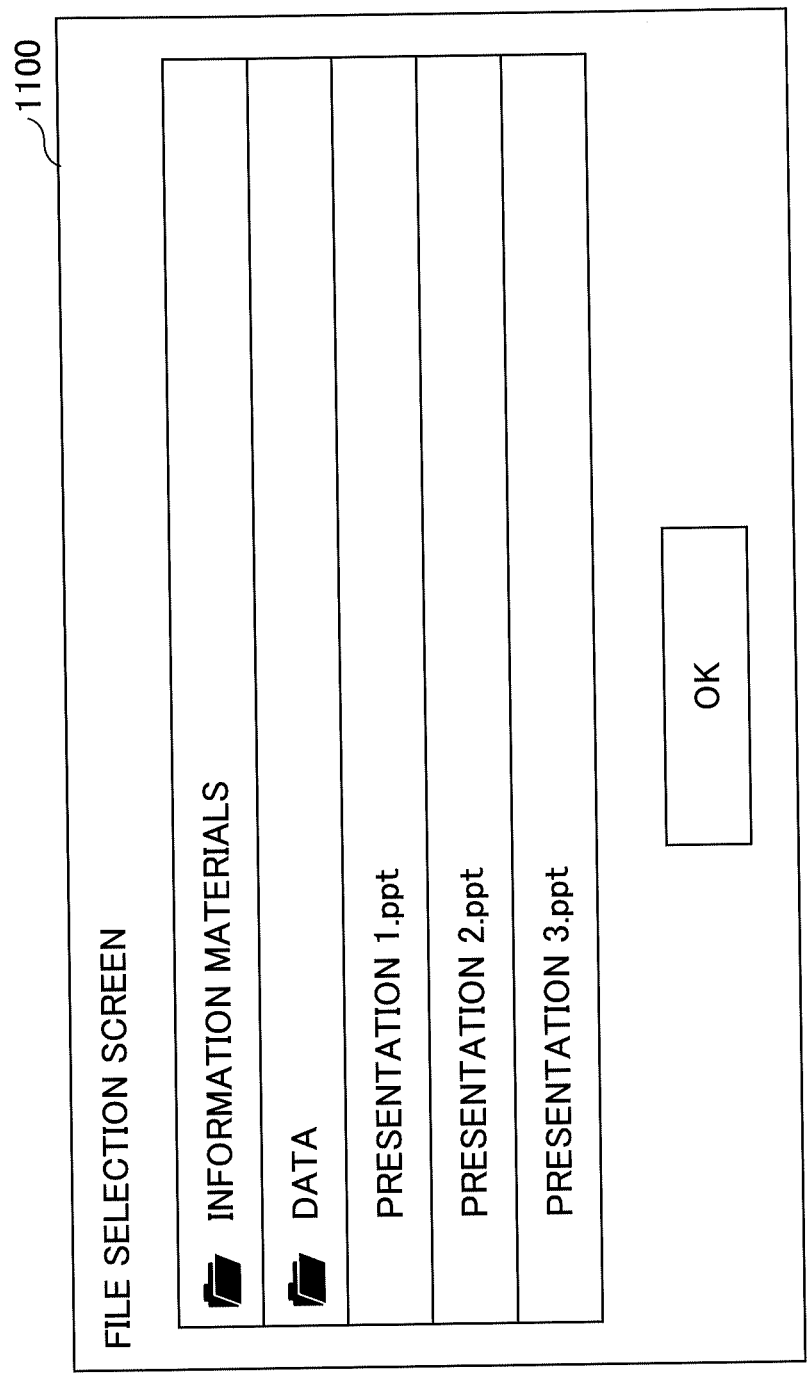
FIG. 15 is a diagram illustrating an example of a file selection screen displayed on a display of an electronic blackboard apparatus according to the first embodiment.

Meanwhile, when it is determined in step S1207 that "the authentication status is ON" (YES in step S1207), in step S1210, the file reading unit 52 displays the file selection screen 1100 illustrated in FIG. 15 on the display 3 of the electronic blackboard apparatus 14 through the blackboard display unit 58.

FIG. 15 is a diagram illustrating an example of a file selection screen displayed on a display 3 of the electronic blackboard apparatus 14 according to the first embodiment. The file selection screen 1100 illustrated in FIG. 15 is a screen in which a user who clicks the file read button selects a folder and a file to be read when reading any file from his/her own storage in the storage service 44.

Next, in step S1211, the file reading unit 52 reads the file selected in the file selection screen 1100 from the storage service 44 and displays the file on the display 3 of the electronic blackboard apparatus 14 through the blackboard display unit 58. Then, the electronic blackboard apparatus 14 proceeds with processing to step S1212.

In step S1212, a plurality of users registered in the participant view initiate a meeting using the electronic blackboard apparatus 14. In this arrangement, each user can write to the electronic blackboard apparatus 14 or the like.

Thereafter, in step S1213, the file transmission unit 54 determines whether the file storing button 1330 is depressed in any user individual information display screen 1300 (see FIG. 17) displayed for each user on the display 3 of the electronic blackboard apparatus 14. When it is determined in step S1213 that "the file storing button 1330 is not depressed" (step S1213: No), the electronic blackboard apparatus 14 proceeds to process to step S1219.

Meanwhile, in step S1213, when it is determined that "the file storing button 1330 is depressed" (YES in step S1213), the file transmission unit 54 refers to the participant view information corresponding to the depressed file storing button from the participant view and determines whether the authentication status of the user is ON (step S1214).

In step S1214, when it is determined that "the authentication status is not ON" in step S1214 (NO in step S1214), the file transmission unit 54 displays the authentication error screen 1400 (see FIG. 18) on the display 3 of the electronic blackboard apparatus 14 through the blackboard display unit 58 (step S1215), and performs a predetermined re-authentication process similar to that in step S1209 (step S1216). The electronic blackboard apparatus 14 returns the processing to step S1213.

Figure 16:
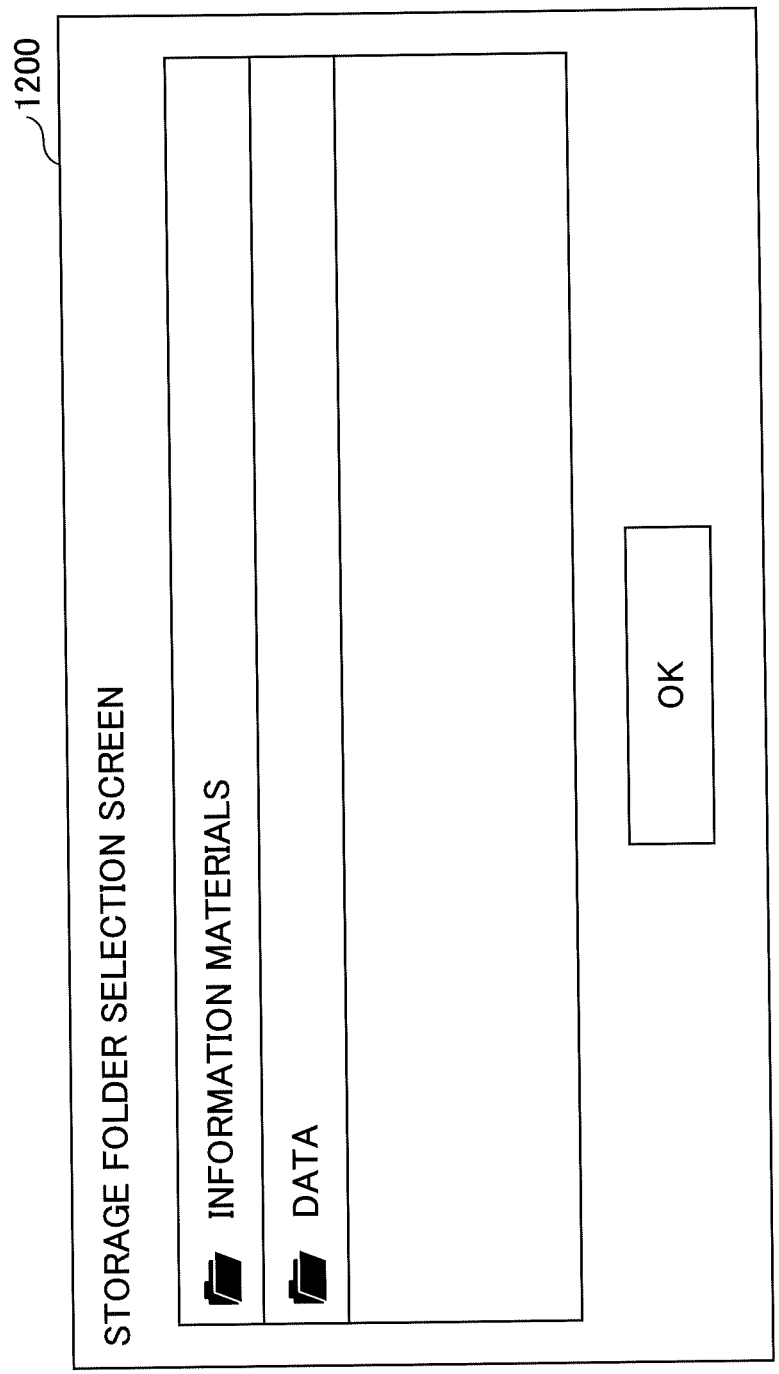
FIG. 16 is a diagram illustrating an example of a screen for selecting a save folder displayed on a display of an electronic blackboard apparatus according to the first embodiment.

Meanwhile, in step S1214, when it is determined that "the authentication status is ON" (YES in step S1214), the file transmission unit 54 displays the storage folder selection screen 1200 exemplified in FIG. 16 on the display 3 of the electronic blackboard apparatus 14 through the blackboard display unit 58 (step S1217).

FIG. 16 is a diagram illustrating an example of a storage folder selection screen displayed on a display 3 of the electronic blackboard apparatus 14 according to the first embodiment. The storage folder selection screen 1200 illustrated in FIG. 16 is a screen in which a user who clicks the file storing button selects a folder to be saved when saving a file to his/her own storage in the storage service 44.

Next, in step S1218, the file transmission unit 54 stores a file representing the board book content displayed on the display 3 of the electronic blackboard apparatus 14 in a folder selected on the storage folder selection screen 1200. Then, the electronic blackboard apparatus 14 advances the process to step S1219.

In step S1219, when the user depresses the meeting end button 1500 (see FIG. 17), the file transmission unit 54 distributes a file indicating the content of copy from the blackboard displayed on the display 3 of the electronic blackboard apparatus 14 to all the users illustrated in the participant view (i.e., including the users in the unauthenticated state) (the e-mail address illustrated in the distribution destination information of the participant view).

Thereafter, the determination unit 56C of the participant management unit 56 ends the monitoring of the participant view (step S1220). Then, the information processing system 1 ends a series of processes illustrated in FIGS. 12 and 13.

When the user depresses the meeting end button 1500, the electronic blackboard apparatus 14 performs a logoff process for all users logged in by the IC card 630. Further, when the user depresses the meeting end button 1500, the electronic blackboard apparatus 14 clears all the set values set in the participant view. When the user depresses the meeting end button 1500, the electronic blackboard apparatus 14 deletes the contents of the board book displayed on the display 3 of the electronic blackboard apparatus 14. The electronic blackboard apparatus 14 may switch its own device to a sleep state or a power off state when the user depresses the meeting end button 1500.

(Example of User Individual Information Display Screen and Authentication Error Screen)

Figure 17:
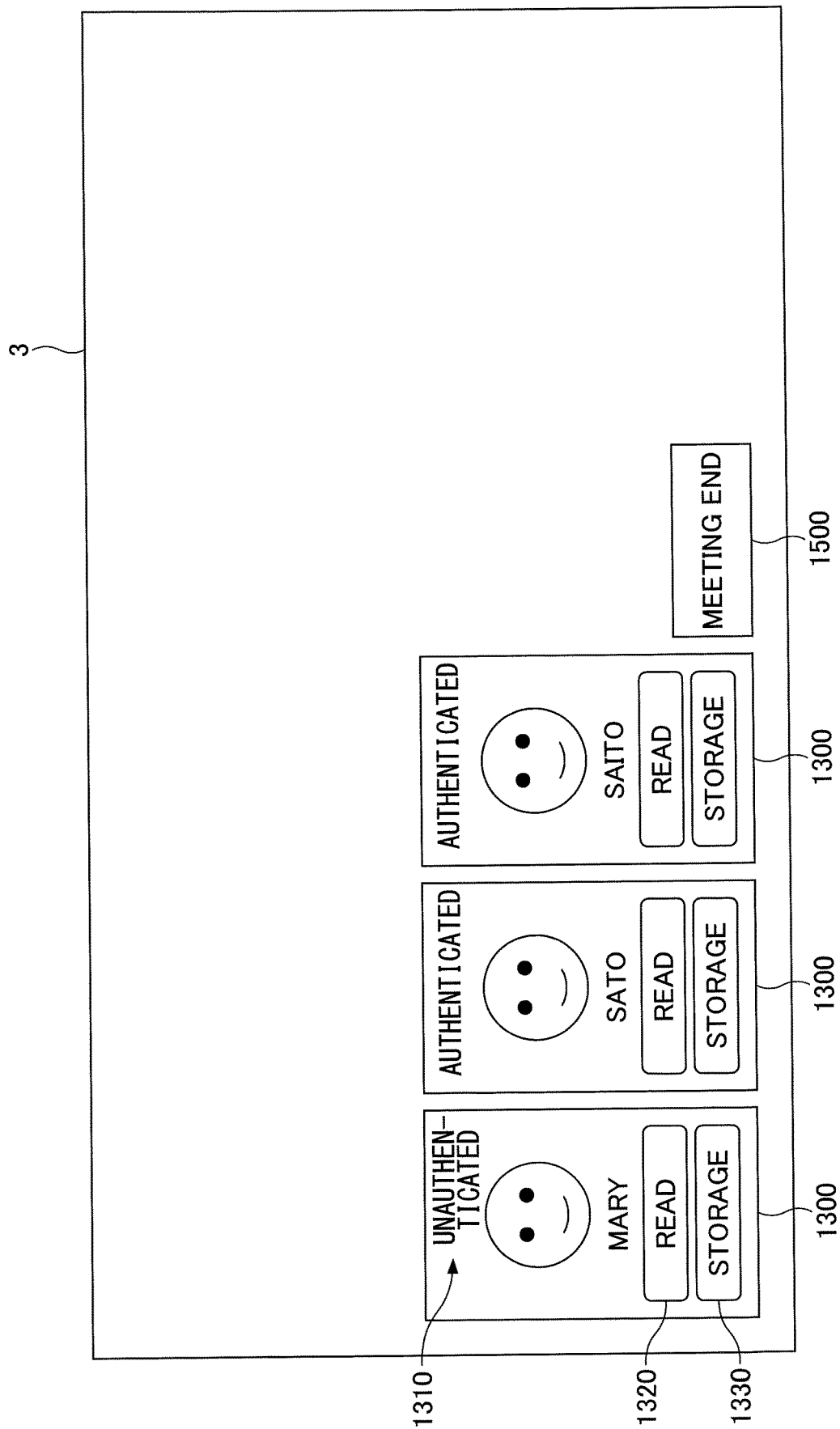
FIG. 17 is a diagram illustrating an example of a user individual information display screen displayed on a display of the electronic blackboard apparatus according to the first embodiment.

FIG. 17 is a diagram illustrating an example of a user individual information display screen displayed on a display 3 of the electronic blackboard apparatus 14 according to the first embodiment.

Figure 18:
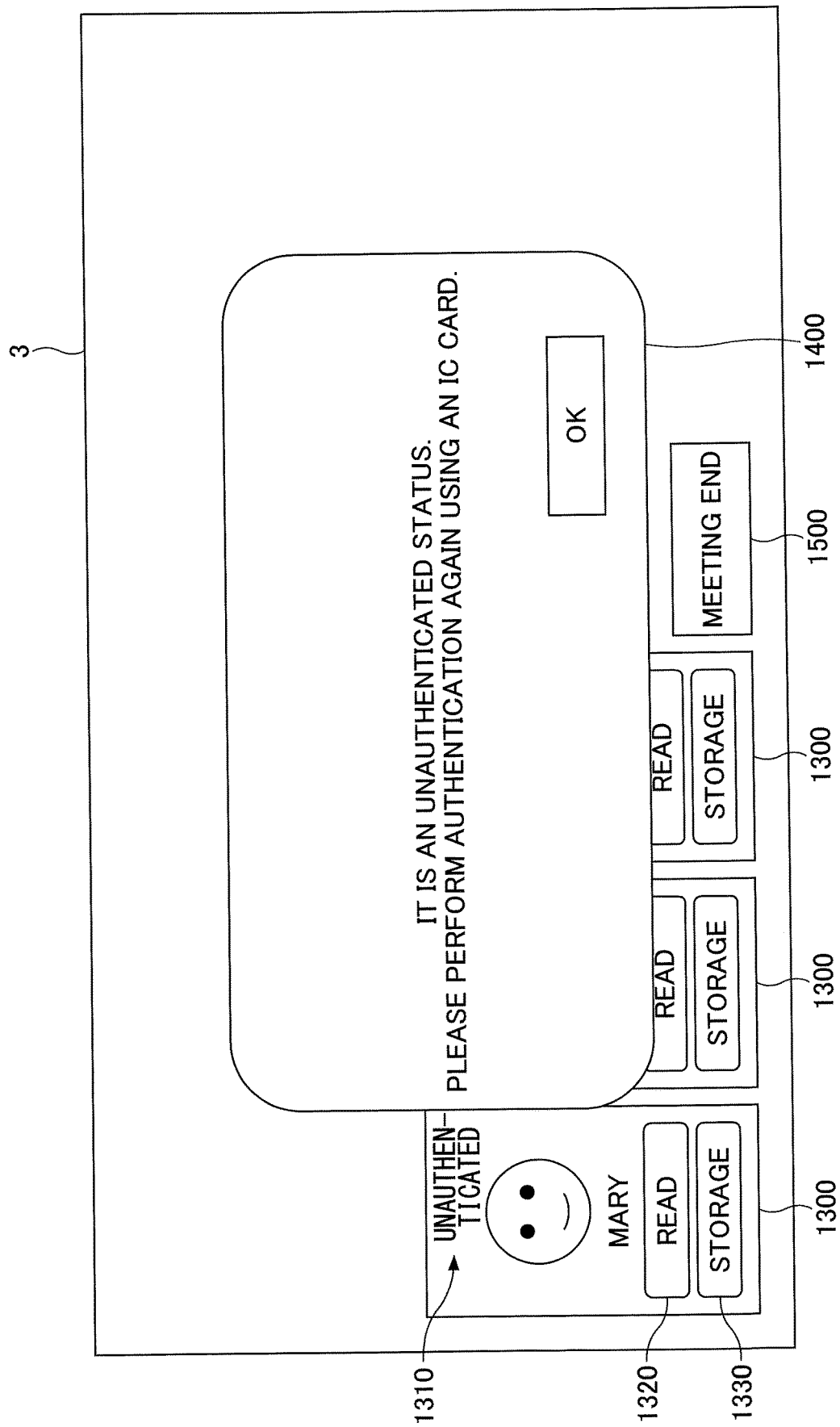
FIG. 18 is a diagram illustrating an example of an authentication error screen displayed on a display of an electronic blackboard apparatus according to the first embodiment.

FIG. 18 is a diagram illustrating an example of an authentication error screen displayed on the display 3 of the electronic blackboard apparatus 14 according to the first embodiment.

In the example illustrated in FIG. 17, the user individual information display screen 1300 of each of all users (Mary, Sato, and Saito) registered in the participant view is displayed on the display 3 of the electronic blackboard apparatus 14. The user individual information display screen 1300 includes a login authentication status 1310, a file read button 1320, and a file storing button 1330. The user individual information display screen 1300 may include a logout button for deleting a user from the participant view.

When the logout button is depressed, the user individual information display screen 1300 disappears from the display area.

The login authentication status 1310 displays the login authentication status of the user. For example, the login authentication status 1310 is displayed when the login authentication status of the user is in the authentication status (i.e., when the authentication status of the participant view is set to "ON"), when the login authentication status of the user is displayed, and when the login authentication status of the user is in an unauthenticated state (i.e., when the authentication status of the participant view is set to "OFF"), when the login authentication status of the user is displayed.

The login authentication status 1310 is an example of "information identifiable as to whether access to a resource is restricted by the restricting means". However, "information identifiable as to whether access to resources is restricted by the restricting means" may be other character strings, images, symbols, graphics, etc., at least if the login authentication status is enabled.

The file read button 1320 is depressed by the user as it reads the file from the corresponding user's storage in the storage service 44. For example, when the file read button 1320 is depressed, the file selection screen 1100 (see FIG. 15) is displayed on the display 3 of the electronic blackboard apparatus 14. However, when the corresponding user's login authentication status is in the unauthenticated state, the file reading from the user's storage is prohibited, and the authentication error screen 1400 is displayed on the display 3 of the electronic blackboard apparatus 14 as illustrated in FIG. 18. As illustrated in FIG. 18, the authentication error screen 1400 displays a message prompting the user to perform login authentication again by using the IC card 630.

The file storing button 1330 is depressed by the user as it saves the file to the corresponding user's storage in the storage service 44. For example, when the file storing button 1330 is depressed, the storage folder selection screen 1200 (see FIG. 16) is displayed on the display 3 of the electronic blackboard apparatus 14. However, when the corresponding user's login authentication status is in the unauthenticated state, file storage in the user's storage is prohibited, and the authentication error screen 1400 is displayed on the display 3 of the electronic blackboard apparatus 14 as illustrated in FIG. 18.

The user individual information display screen 1300 may further include a log off button for the user to intentionally log off.

In the example illustrated in FIG. 17, a meeting end button 1500 is displayed on the display 3 of the electronic blackboard apparatus 14. When the meeting end button 1500 is depressed by the user, the meeting by the electronic blackboard apparatus 14 ends, and a file representing the content of copy from blackboard displayed on the display 3 is concurrently transmitted by e-mail to the e-mail address of all the users registered in the participant view (i.e., even the users in the unauthenticated state).

In addition, an operation panel including the user individual information display screen 1300 (or user-specific icon) and the meeting end button 1500, as well as an addition button or deletion button for the participant, an acquisition button for acquiring the participant's schedule, and remote connection button for displaying the remote connection destination of another device, as a window or as a plurality of windows may be displayed on the display 3 of the electronic blackboard apparatus 14.

(Network of Processing by Electronic Blackboard Apparatus 14)

Figure 19:
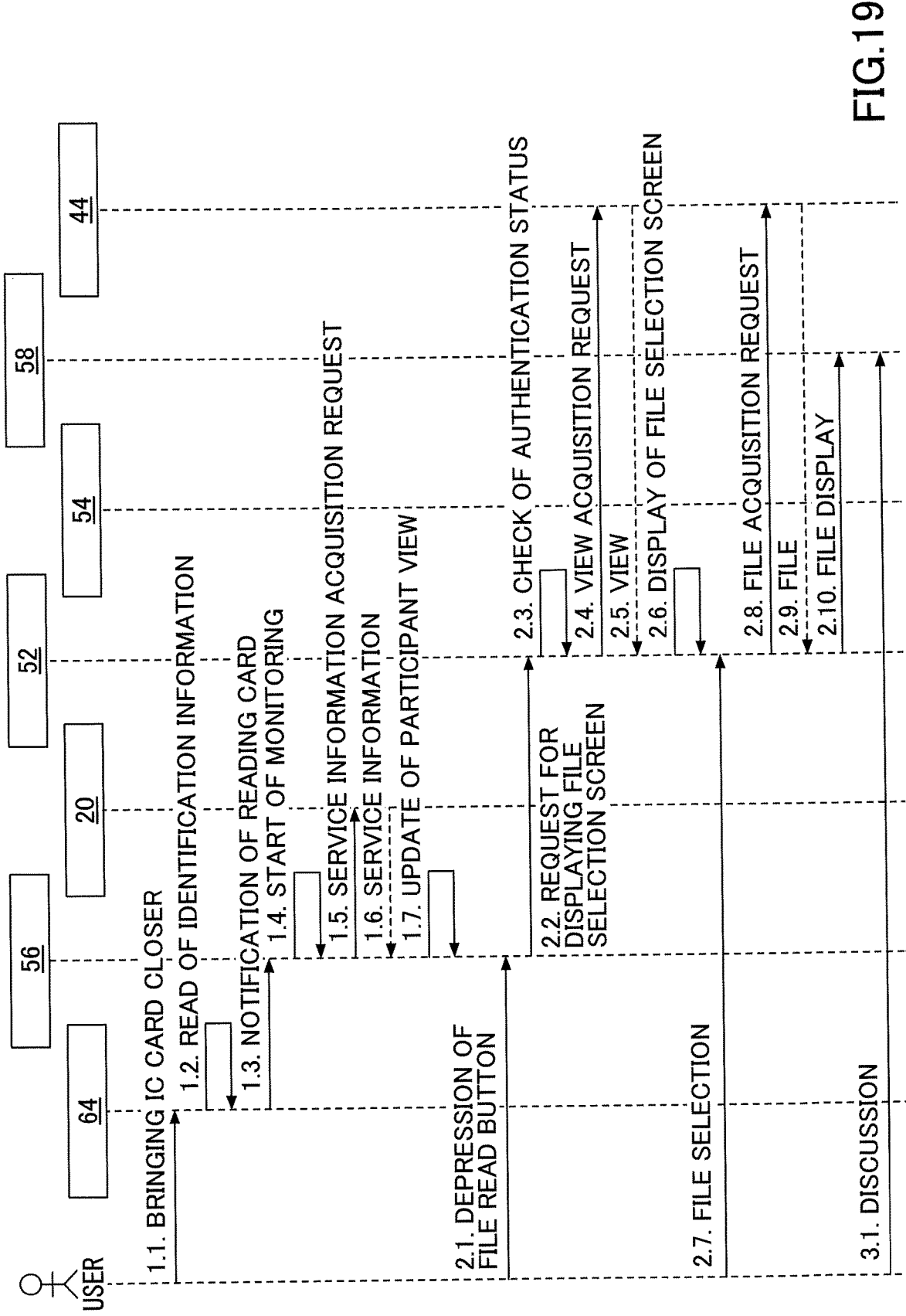
FIG. 19 is a network diagram illustrating a network of processing by the electronic blackboard apparatus according to the first embodiment.
Figure 20:
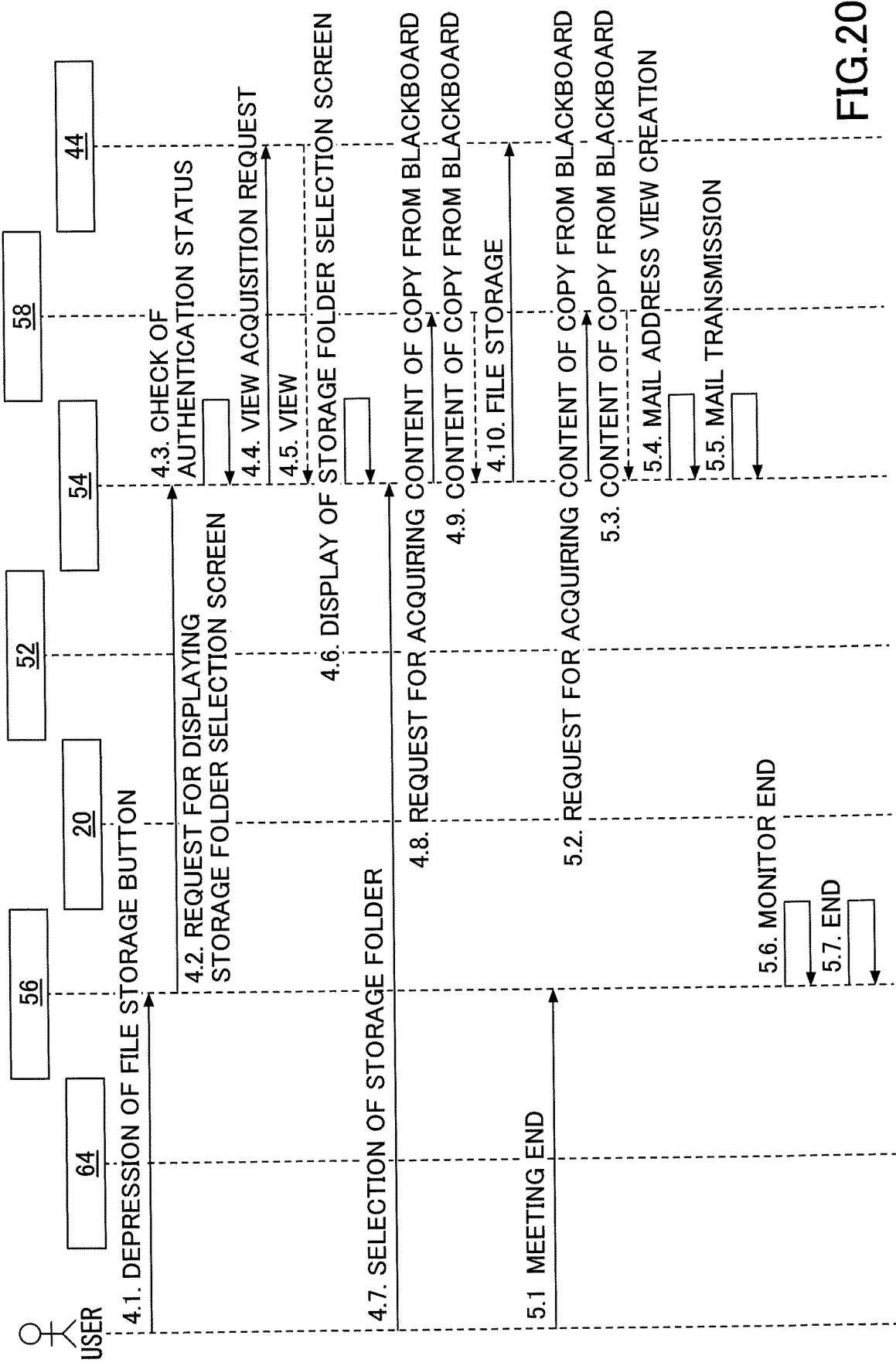
FIG. 20 is a network diagram illustrating a network of processing by the electronic blackboard apparatus according to the first embodiment.

FIGS. 19 and 20 are network diagrams illustrating a sequence of processing by the electronic blackboard apparatus 14 according to the first embodiment.

<Sequences 1.1. to 1.7.>

In the electronic blackboard apparatus 14, first, the user brings the IC card 630 closer to the RF tag reader 617 (the IC card detection unit 64) (sequence 1.1). At this time, the RF tag reader 617 reads the identification information from the IC card 630 (sequence 1.2.).

Next, the IC card detection unit 64 notifies the participant management unit 56 of the identification information read from the IC card 630 (sequence 1.3.). Next, the participant management unit 56 (determination unit 56C) starts monitoring the participant view (sequence 1.4.).

Next, the participant management unit 56 transmits the identification information notified from the IC card detection unit 64 to the user information unit 20 of the user information server 10 and requests the user information unit 20 to provide service information (sequence 1.5.). As a result, the participant management unit 56 acquires the service information transmitted from the user information unit 20 (sequence 1.6.).

Next, the participant management unit 56 (the registration unit 56B) registers the participant view information (user ID, user name, authentication status, final authentication time, and distribution destination information of the electronic blackboard system) corresponding to the identification information notified from the IC card detection unit 64 in the participant view (sequence 1.7).

<Sequence 2.1. to Sequence 2.10.>

Then, the user depresses the file read button in the user individual information display screen 1300 (see FIG. 17) displayed on the display 3 of the electronic blackboard apparatus 14 (sequence 2.1.). In this case, the participant management unit 56 transmits the service information acquired in sequence 1.6 to the file reading unit 52 and requests the file reading unit 52 to display the file selection screen (sequence 2.2.).

Accordingly, the file reading unit 52 checks the participant view information of the user from a participant view and checks the authentication status of the user (sequence 2.3.). Here, when the authentication status of the user is "ON," the file reading unit 52 requests the storage service 44 to a view of files and folders (sequence 2.4.). At this time, the file reading unit 52 accesses the storage service 44 using the authentication token of the external service included in the service information acquired from the participant management unit 56. As a result, the file reading unit 52 acquires a view of files and folders transmitted from the storage service 44 (sequence 2.5.).

Next, the file reading unit 52 displays the file selection screen 1100 (see FIG. 15) including a list of files and folders acquired in sequence 2.5 on the display 3 (sequence 2.6.).

Thereafter, when an arbitrary file is selected by the user in the file selection screen 1100 (sequence 2.7.), the file reading unit 52 transmits the acquisition request of the selected file to the storage service 44 (sequence 2.8.). At this time, the file reading unit 52 accesses the storage service 44 using the authentication token of the external service included in the service information acquired from the participant management unit 56. As a result, the file reading unit 52 acquires the file transmitted from the storage service 44 (sequence 2.9.). The file reading unit 52 displays the file acquired in sequence 16 on the display 3 through the blackboard display unit 58 (sequence 2.10.).

<Sequence 3.1.>

Thereafter, a plurality of users registered in the participant view hold a meeting using the electronic blackboard apparatus 14 (sequence 3.1). In this arrangement, each user can write to the electronic blackboard apparatus 14 or the like.

<Sequence 4.1. to Sequence 4.10.>

Then, the user clicks the file storing button in the user individual information display screen 1300 (see FIG. 17) displayed on the display 3 of the electronic blackboard apparatus 14 (sequence 4.1.). In this case, the participant management unit 56 transmits the service information acquired in sequence 1.6 to the file transmission unit 54 and requests the file transmission unit 54 to display the storage folder selection screen (sequence 4.2).

Accordingly, the file transmission unit 54 references the participant view information of the user from the participant view and checks the authentication status of the user (sequence 4.3.). Here, when the authentication status of the user is "ON," the file transmission unit 54 requests the storage service 44 to list the folders (sequence 4.4.). At this time, the file transmission unit 54 accesses the storage service 44 using the authentication token of the external service included in the service information acquired from the participant management unit 56. As a result, the file transmission unit 54 acquires a list of folders transmitted from the storage service 44 (sequence 4.5.).

Next, the file transmission unit 54 displays the storage folder selection screen 1200 (see FIG. 16) including a list of folders acquired in sequence 4.5 on display 3 (sequence 4.6.).

Thereafter, when an arbitrary folder is selected by the user on the storage folder selection screen 1200 (sequence 4.7.), the file transmission unit 54 requests the blackboard display unit 58 to acquire the contents of the board (sequence 4.8.). As a result, the file transmission unit 54 acquires the contents of the board book transmitted from the blackboard display unit 58 (sequence 4.9.). The file transmission unit 54 stores the file representing the board book content acquired in sequence 4.9 in the folder selected by the user of the storage service 44 (sequence 4.10.). At this time, the file transmission unit 54 accesses the storage service 44 using the authentication token of the external service included in the service information acquired from the participant management unit 56.

<Sequence 5.1. to Sequence 5.7.>

Thereafter, when the user depresses the meeting end button 1500 (see FIG. 17) (sequence 5.1), the file transmission unit 54 requests the blackboard display unit 58 to acquire the contents of the board document (sequence 5.2). As a result, the file transmission unit 54 acquires the contents of the board book transmitted from the blackboard display unit 58 (sequence 5.3.).

The file transmission unit 54 creates a list of e-mail addresses including the e-mail addresses (e.g., the e-mail addresses illustrated in the distribution information of the participant view) of all the users illustrated in the participant view (i.e., the users who are in the unauthenticated state) in sequence 5.4. The file transmission unit 54 transmits a file representing the board writing content acquired in sequence 5.3. to each e-mail address illustrated in the list of e-mail addresses (sequence 5.5.).

Thereafter, the determination unit 56C of the participant management unit 56 ends the monitoring of the participant view (sequence 5.6.). Further, the participant management unit 56 performs predetermined termination processing (for example, logging off all users logged in by the IC card 630, clearing all set values set in the participant view, processing for causing the blackboard display unit 58 to erase the board book contents displayed on the display 3, processing for switching its own device to the sleep state or the power off state, etc.) (sequence 5.7.).

Second Embodiment

Next, a second embodiment will be described. In the second embodiment, changes from the first embodiment will be described. In the second embodiment, the configuration portion similar to the first embodiment is denoted by the same reference numerals as the first embodiment, and the detailed description thereof will not be repeated.

(Functional Configuration of Information Processing System 1)

Figure 21:
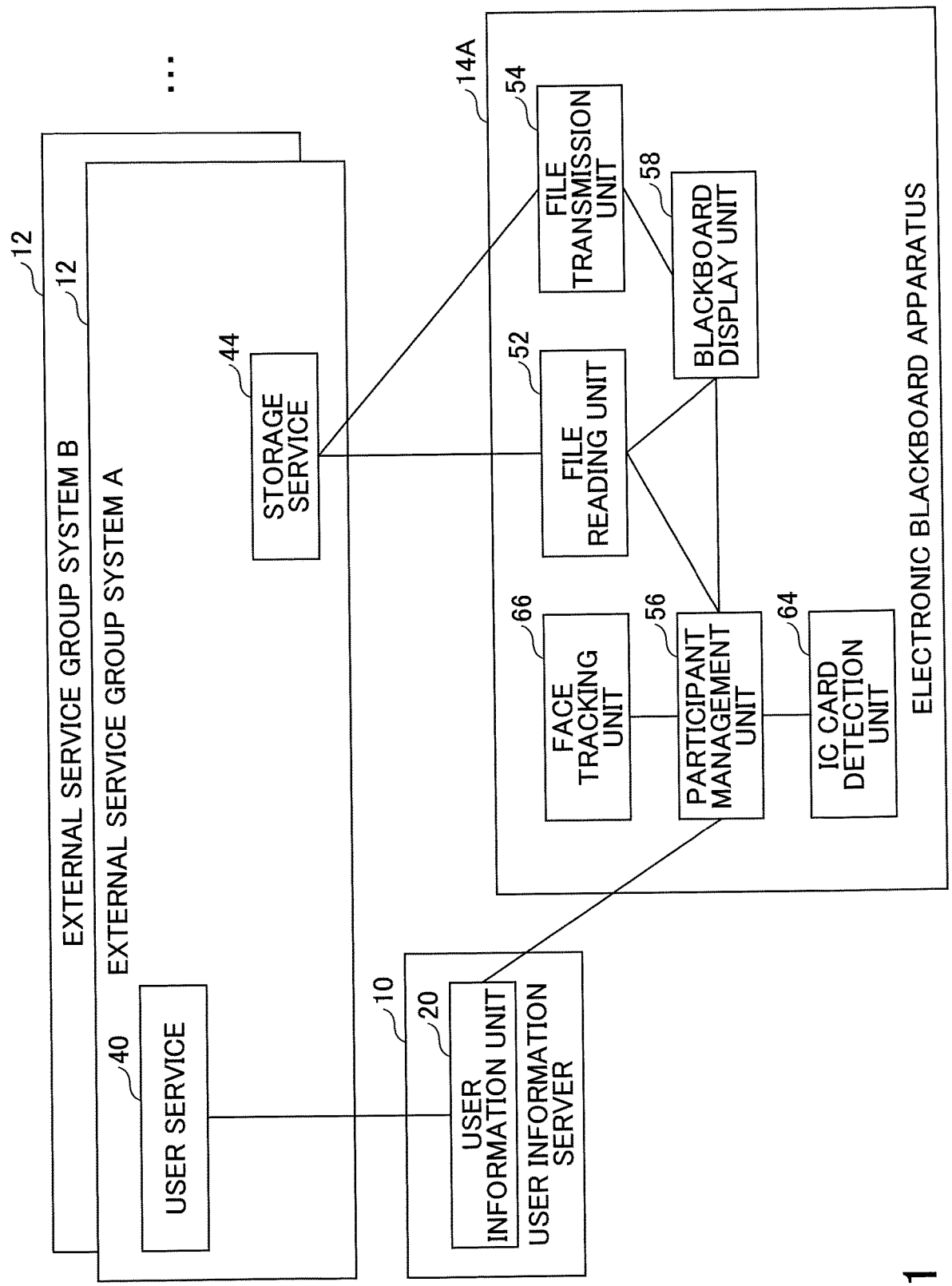
FIG. 21 is a functional configuration diagram illustrating an example of an information processing system according to the second embodiment.

FIG. 21 is a functional configuration diagram illustrating an example of an information processing system according to a second embodiment. The information processing system 1 according to the second embodiment is different from the information processing system 1 according to the first embodiment in that the information processing system 1 includes an electronic blackboard apparatus 14A instead of the electronic blackboard apparatus 14. The electronic blackboard apparatus 14A differs from the electronic blackboard apparatus 14 in that it further includes a face tracking unit 66.

The face tracking 66 tracks the faces of all users registered in the participant view for images captured by camera 618 (see FIG. 3). For example, the face tracking unit 66 uses known image recognition techniques to track the face of each user based on feature point data information representing feature point data of each user's face (see FIG. 22). The camera 618 captures an image in front of the electronic blackboard apparatus 14A. This allows the camera 618 to image an image containing the face of each user present at the location (e.g., meeting room) of the electronic blackboard apparatus 14A.

In the second embodiment, the predetermined condition determined by the determination unit 56C of the participant management unit 56 is that any user registered in the participant view is no longer displayed on the image captured by the camera 618.

For example, the face tracking unit 66 checks at predetermined time intervals (e.g., 30 second intervals) whether each user registered in the participant view is copied to an image captured by camera 618. If, for example, it is checked by the face tracking unit 66 that any user registered in the participant view is not copied to the image captured by the camera 618 consecutively for a predetermined number (for example, five times), the determination unit 56C determines that the user has moved away from the electronic blackboard apparatus 14A.

Similar to the first embodiment, the restriction unit 56D of the participant management unit 56 allows a user who is determined to be away from the electronic blackboard apparatus 14A by the determination unit 56C to remain unauthenticated and restricts access to resources (files and folders in the storage service 44) possessed by the user.

For example, the face tracking unit 66 causes the camera 618 to image the user's face when the user holds the IC card 630. The face tracking unit 66 extracts the feature point data of the user from the image of the user's face and registers the user's feature point data in the feature point data information view (see FIG. 22) in association with the user's user ID. That is, the face tracking unit 66 registers the feature point data of the user in the feature point data information view every time the user holds the IC card 630. However, this may not be limited thereto, and the feature point data of each user may be previously stored in the electronic blackboard apparatus 14A, the user information server 10, or the like in association with the user ID.

(Examples of Feature Point Data Information)

FIG. 22 is a diagram illustrating an example of feature point data information used in the electronic blackboard apparatus 14A according to the second embodiment. In the feature point data information view illustrated in FIG. 22, feature point data representing feature point data of a user's face is associated with a user ID for each of a plurality of users.

(Procedure of Processing by the Electronic Blackboard Apparatus 14A)

Figure 23:
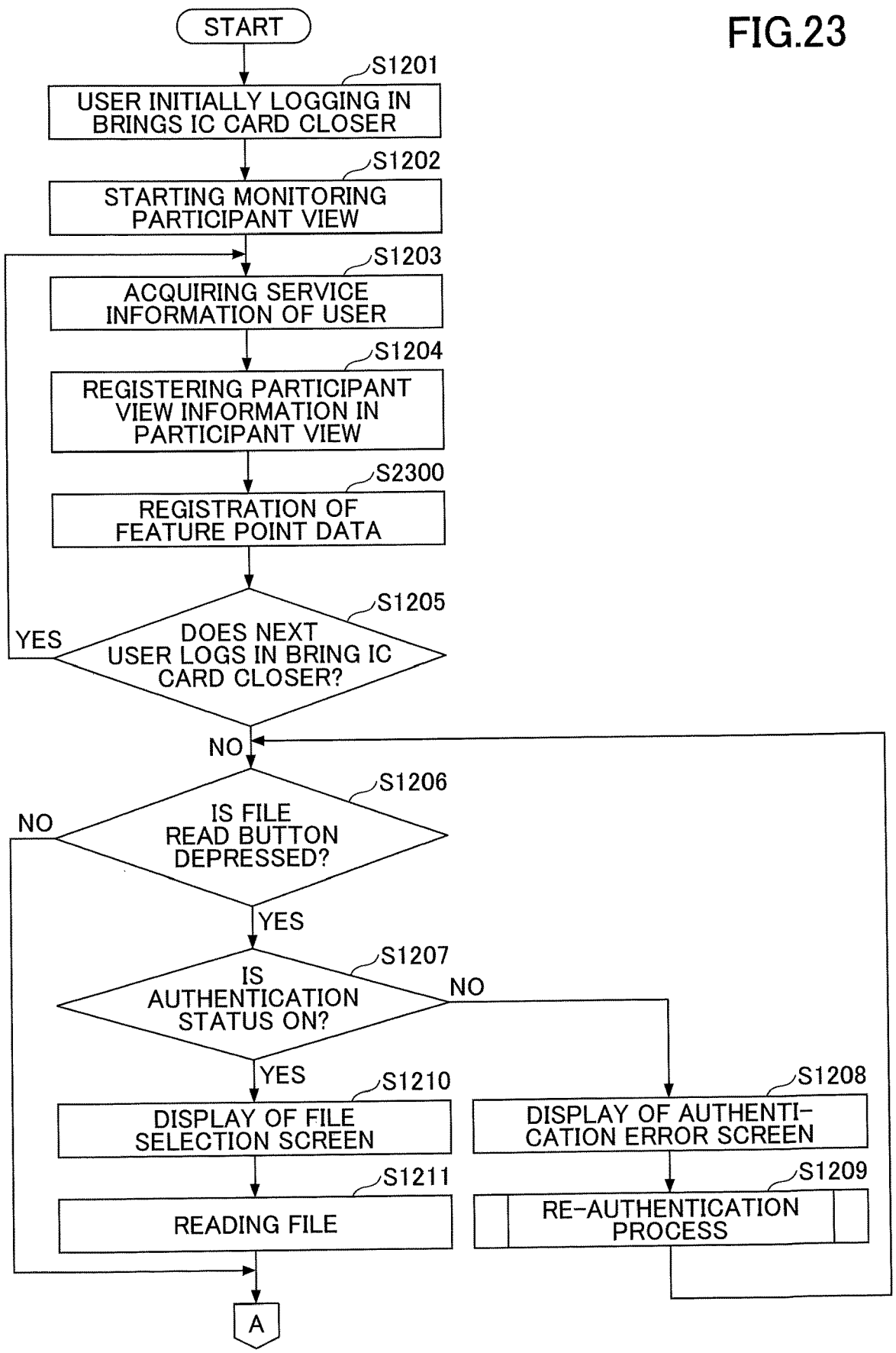
FIG. 23 is a flowchart illustrating a procedure of processing by the electronic blackboard apparatus according to a second embodiment.

FIG. 23 is a flowchart illustrating a procedure of processing by the electronic blackboard apparatus 14A according to the second embodiment. The flowchart illustrated in FIG. 23 differs from the flowchart of the first embodiment illustrated in FIG. 12 in that step S2300 is provided next to step S1204. In step S2300, the camera 618 captures an image of the face of the user closest to the camera 618. The face tracking unit 66 extracts the user's feature point data from the image captured by the camera 618. Further, the face tracking unit 66 registers feature point data representing feature point data of the extracted user in the feature point data information view in association with the user ID. The face tracking unit 66 then starts tracking the user using the registered feature point data.

(Procedure for Updating the Participant View by the Electronic Blackboard Apparatus 14A)

Figure 24:
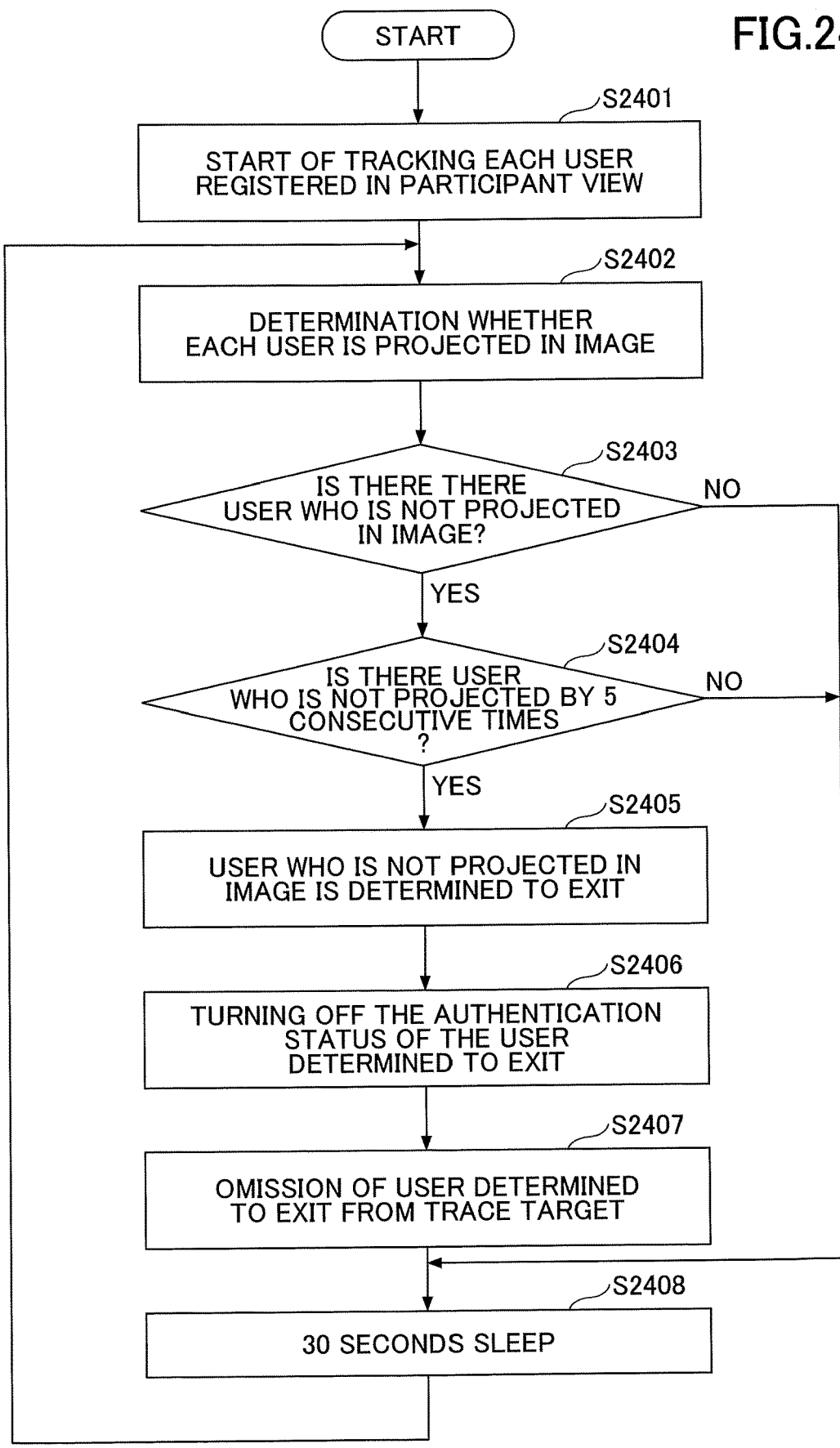
FIG. 24 is a flowchart illustrating a procedure of updating a participant view by the electronic blackboard apparatus according to the second embodiment.

FIG. 24 is a flowchart illustrating a procedure of updating a participant view by the electronic blackboard apparatus 14A according to the second embodiment.

First, in step S2401, the face tracking unit 66 starts tracking each user registered in the participant view. Next, in step S2402, it is determined whether the face tracking unit 66 is displayed on the image captured by the camera 618 for each user registered in the participant view.

Next, in step S2403, the face tracking unit 66 determines whether there was a user who was not displayed on the image captured by the camera 618. When it is determined in step S2403 that "a user not illustrated in the image does not exist" (step S2403: No), the electronic blackboard apparatus 14A proceeds to process into step S2408.

Meanwhile, in step S2403, when it is determined that "there is a user who is not displayed in the image" in step S2403 (YES in step S2403), the face tracking unit 66 determines whether the user is not displayed in the image five times consecutively.

In step S2404, when it is determined that "the number of times that the user is not displayed on the image is not five consecutive times" (step S2404: No), the electronic blackboard apparatus 14A proceeds to process into step S2408.

Meanwhile, in step S2404, when it is determined that "the user has had five consecutive times the number of times that the image has not been displayed" (YES in step S2404), the determination unit 56C of the participant management unit 56 determines that the user that has not been displayed in the image has exited (that is, the user has moved away from the electronic blackboard apparatus 14A) (step S2405). In step S2406, the restricting unit 56D of the participant management unit 56 sets the authentication status to "OFF" in the participant view information of the user that is determined to be exited.

Thereafter, when the face tracking unit 66 excludes the user who is determined to have exited from the tracking target, the electronic blackboard apparatus 14A advances the process to step S2408.

In step S2408, the face tracking unit 66 sleeps for 30 seconds. Thereafter, the electronic blackboard apparatus 14A returns the processing to step S2402.

(Sequence of Processing by Electronic Blackboard Apparatus 14A)

Figure 25:
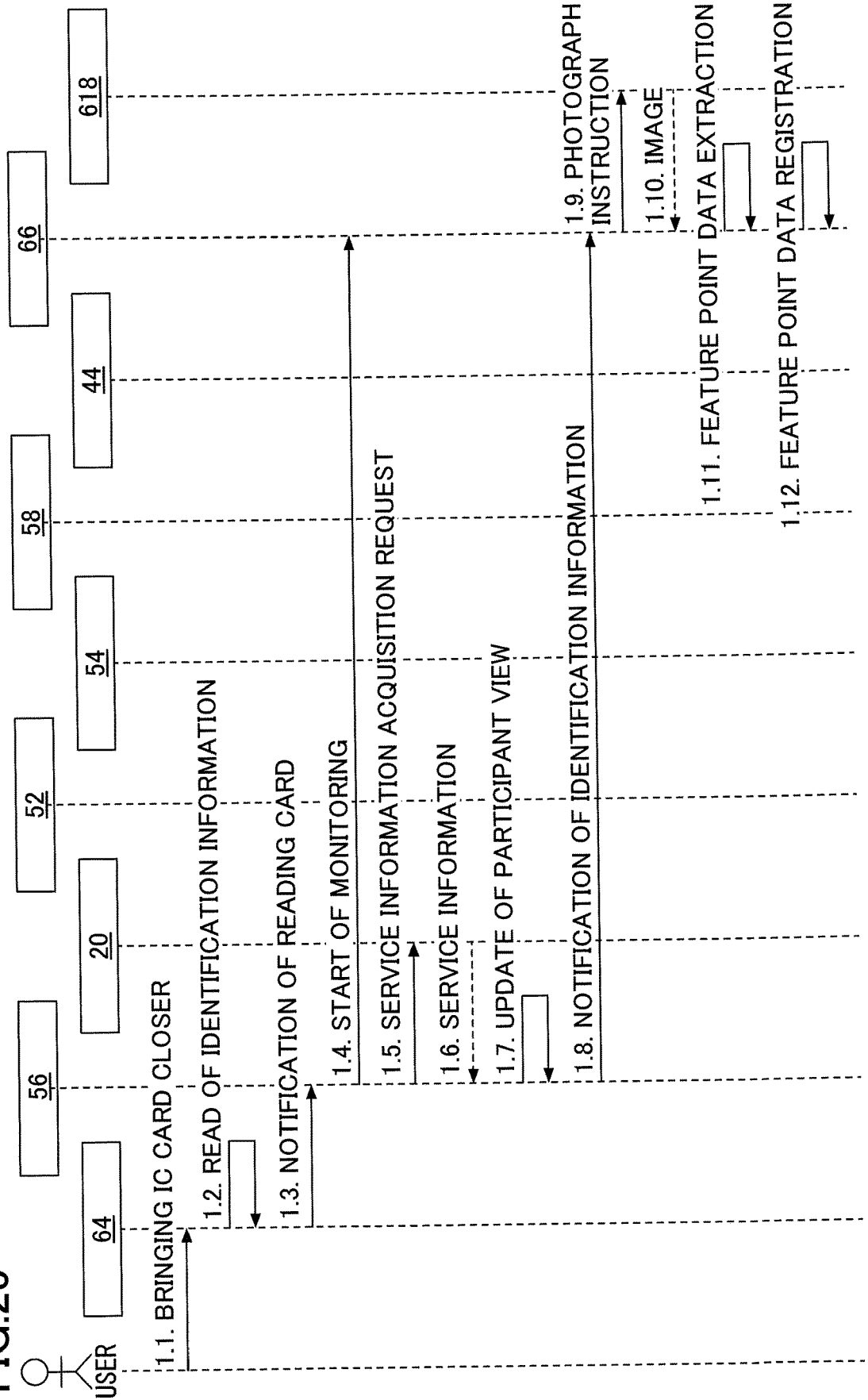
FIG. 25 is a network diagram illustrating a network of processing by the electronic blackboard apparatus according to the second embodiment.

FIG. 25 is a sequence diagram illustrating a sequence of processing by the electronic blackboard apparatus 14A according to the second embodiment. Sequences 1.1 1.12. illustrated in FIG. 25 show differences from sequences 1.1. to 1.7. performed by the electronic blackboard apparatus 14A. That is, instead of the sequences 1.1. to 1.7. illustrated in FIG. 19, the electronic blackboard apparatus 14A performs the sequences 1.1. to 1.12. illustrated in FIG. 25.

<Sequence 1.1. to 1.12.>

In the electronic blackboard apparatus 14A, first, the user brings the IC card 630 closer to the RF tag reader 617 (the IC card detection unit 64) (sequence 1.1). At this time, the RF tag reader 617 reads the identification information from the IC card 630 (sequence 1.2.).

Next, the IC card detection unit 64 notifies the participant management unit 56 of the identification information read from the IC card 630 (sequence 1.3.). Next, the participant management unit 56 instructs the face tracking unit 66 to start tracking each user registered in the participant view (sequence 1.4).

Next, the participant management unit 56 transmits the identification information notified from the IC card detection unit 64 to the user information unit 20 of the user information server 10 and requests the user information unit 20 to provide service information (sequence 1.5.). As a result, the participant management unit 56 acquires the service information transmitted from the user information unit 20 (sequence 1.6.).

Next, the participant management unit 56 (the registration unit 56B) registers the participant view information (user ID, user name, authentication status, final authentication time, and distribution destination information of the electronic blackboard system) corresponding to the identification information notified from the IC card detection unit 64 in the participant view (sequence 1.7).

Next, the participant management unit 56 notifies the face tracking unit 66 of the identification information notified from the IC card detection unit 64 (sequence 1.8.). The face tracking unit 66 instructs the camera 618 to photograph the user's face (sequence 1.9.). As a result, the face tracking unit 66 acquires an image of the face of a user imaged by the camera 618 (sequence 1.10.).

The face tracking unit 66 extracts feature point data of the user's face from images of the user's face acquired in sequence 1.10. (sequence 1.11.). Further, the face tracking unit 66 matches the feature point data extracted in sequence 1.11 with the identification information notified from the participant management unit 56 and registers the feature point data in a list of feature point data information (sequence 1.12.).

As described above, the electronic blackboard apparatuses 14 and 14A according to each embodiment include the authentication unit 56A for performing login authentication of the user, the registration unit 56B for registering a user whose login authentication is performed by the authentication unit 56A in the participant view, the determination unit 56C for determining whether each of a plurality of users registered in the participant view satisfies a predetermined condition, and the restriction unit 56D for restricting access to resources owned by the user while registering the user in the participant view when it is determined that any user registered in the participant view satisfies a predetermined condition. Accordingly, when some of the users are away from the electronic blackboard apparatus 14 and 14A, the electronic blackboard apparatus 14 and 14A according to the embodiments can prevent other users from unauthorized access to the resources owned by the user.

Third Embodiment

Next, a third embodiment will be described. In the third embodiment, changes from the first embodiment will be described. In the third embodiment, the configuration portion similar to the first embodiment is denoted by the same reference numerals as the first embodiment, and the detailed description thereof will not be repeated.

(System Configuration)

Figure 26:
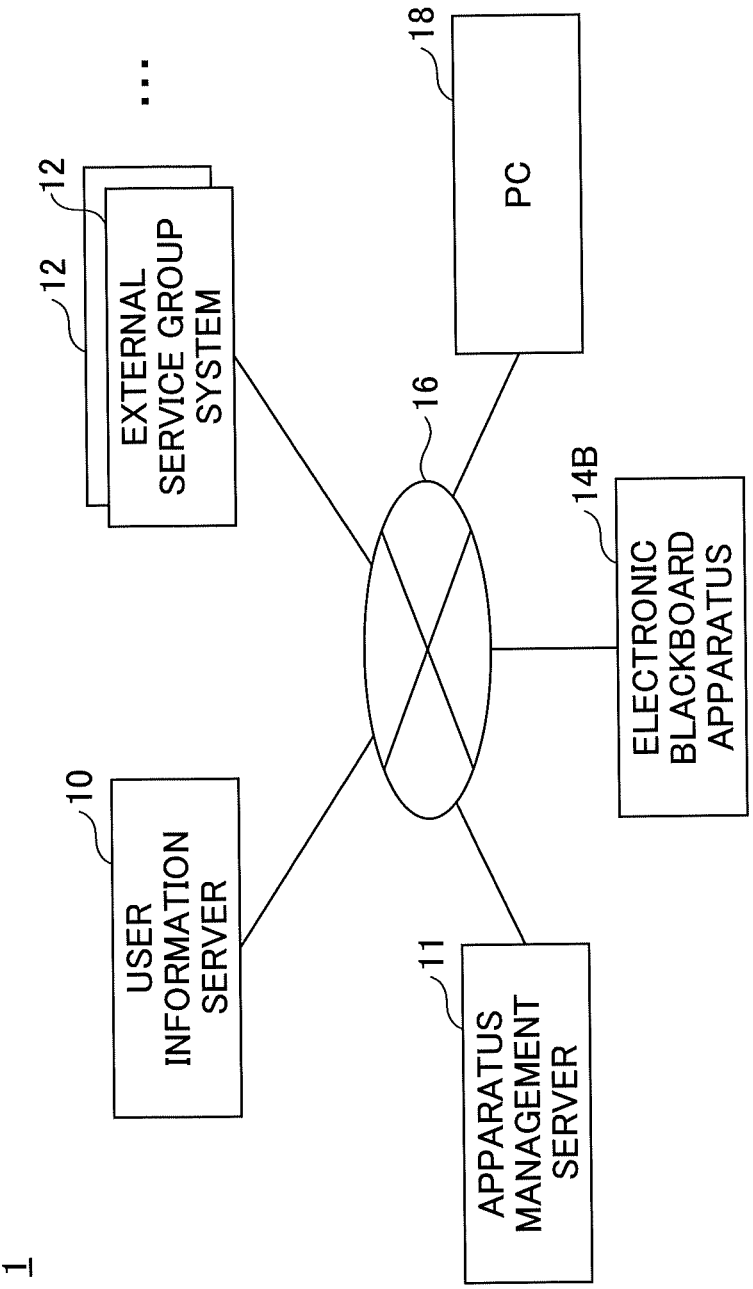
FIG. 26 is a configuration diagram illustrating an example of an information processing system according to a third embodiment.

FIG. 26 is a configuration diagram illustrating an example of an information processing system according to the third embodiment. The information processing system 1 illustrated in FIG. 26 differs from the information processing system 1 according to the first embodiment (see FIG. 1) in that the information processing system 1 further includes the apparatus management server 11 and the PC 18, and the electronic blackboard apparatus 14B instead of the electronic blackboard apparatus 14. The apparatus management server 11 and the PC 18 are connected to the network 16 and are capable of communicating with the electronic blackboard apparatus 14B through the network 16.

The apparatus management server 11 stores the apparatus management information and the like to be described later and is used from the electronic blackboard apparatus 14B. The apparatus management server 11 is implemented by one or more computers. Although the configuration diagram of FIG. 1 illustrates an example in which the user information server 10 and the apparatus management server 11 are separated, the user information server 10 and the apparatus management server 11 may be realized by one server device.

The PC 18 is an example of a "terminal apparatus" and can be remotely connected to the electronic blackboard apparatus 14B via the network 16. A user may participate in a meeting held from a remote location using the electronic blackboard apparatus 14B by remote connection unit from the PC 18 to the electronic blackboard apparatus 14B.

(Outline of Information Processing System Processing)

Figure 27:
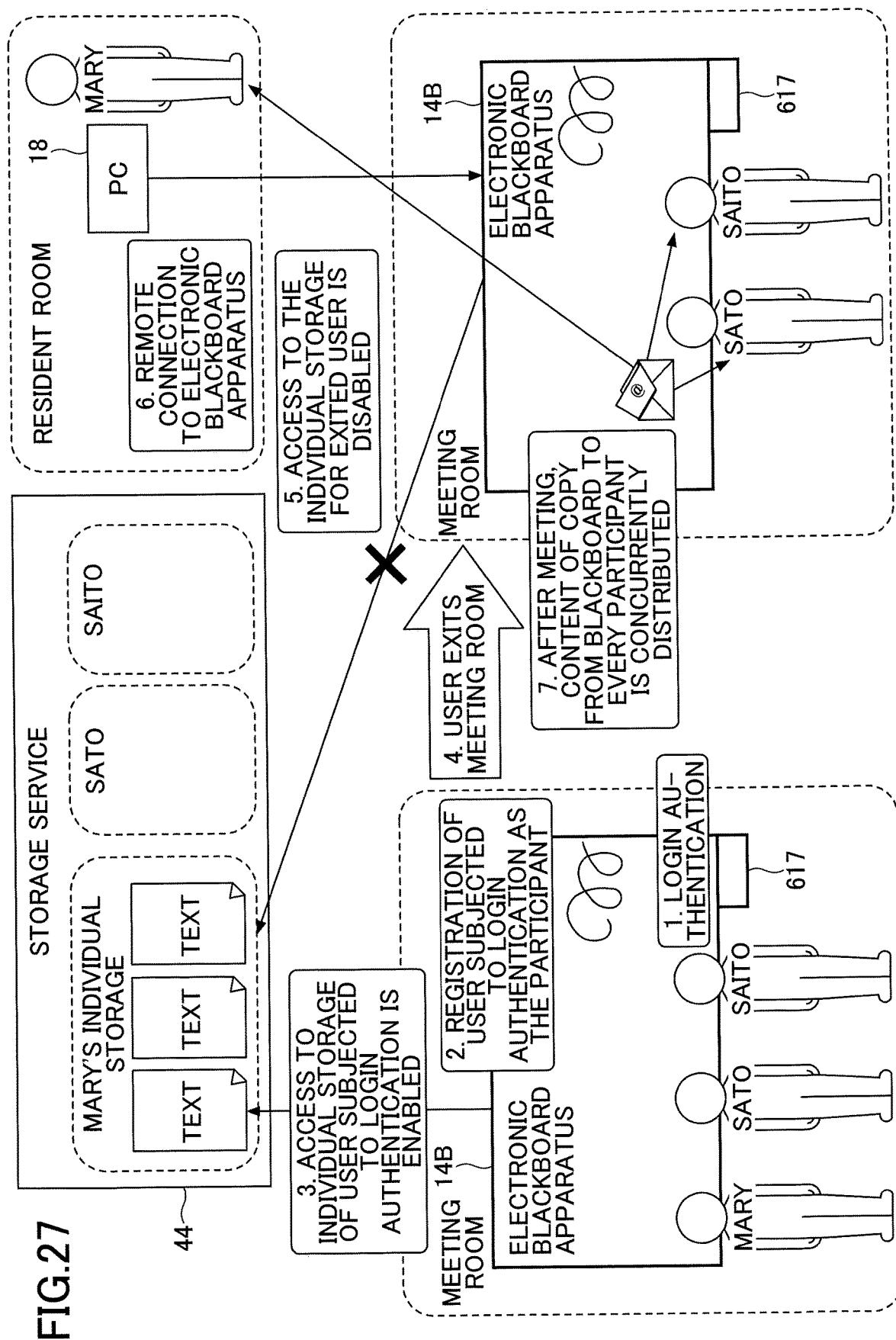
FIG. 27 is a diagram for explaining a processing overview by the information processing system according to the third embodiment.

FIG. 27 is a diagram for explaining a processing overview by the information processing system 1 according to the third embodiment. FIG. 27 illustrates an example of three users (Mary, Sato, Saito) holding a meeting in a meeting room using the electronic blackboard apparatus 14B.

1. Each user is required to have login authentication performed by the electronic blackboard apparatus 14B by bringing an IC card 630 closer to the RF tag reader 617 to utilize the electronic blackboard apparatus 14B. The login authentication by the user may be by other means (e.g., by entering the user ID and password).

2. A user who has been login authenticated by the electronic blackboard apparatus 14B registers the participant view information, thereby allowing the electronic blackboard apparatus 14B to recognize the user as the participant.

3. When login authentication is performed, each user is able to access (read and store files) the storage (not limited thereto, but may be a schedule service, shared site service, or the like) owned by him/her in the storage service 44 from the electronic blackboard apparatus 14B.

4. When the user leaves the meeting room where the electronic blackboard apparatus 14B is installed, the login state is automatically unauthorized. In this embodiment, after a predetermined period of time (e.g., 3 minutes) has elapsed since the login authentication was performed by the user, the user is automatically in the unauthenticated state. "Authentication state" means the status in which resources can be used (authentication ON) by logging in and registering in the participant view. "Unauthenticated state" means a state in which the user has logged in and registered to the participant view, but the resource cannot be used (authentication OFF). Also, "logout state" means a state that is not included in the participant view or is deleted once, and for which the resource cannot be used.

5. If the user is in the unauthenticated state, the electronic blackboard apparatus 14B cannot access the user's storage. Accordingly, it is possible to prevent other users from illegally accessing the storage of users who have left the meeting room. FIG. 27 illustrates an example in which the user Mary is automatically in an unauthenticated state due to the user "Mary" exiting the meeting room, thus preventing the user "Mary" from accessing the individual storage of the user "Mary".

6. Users who leave the meeting room can participate in remote sharing of a videoconference or meeting from a remote location by remotely connecting from an external terminal apparatus to the electronic blackboard apparatus 14B. In FIG. 27, a user ""Mary"" exiting the meeting room is illustrated to remotely connect from the PC 18 in the room to the electronic blackboard apparatus 14B. At this time, in the PC 18, based on the user ID of the logged-in user "Mary," an apparatus in which the user "Mary" is a participant is presented as a candidate of the remote connection destination (i.e., the electronic blackboard apparatus 14B in FIG. 27). This allows the user "Mary" to easily perform a remote connection from the PC 18 to the electronic blackboard apparatus 14B.

7. After the meeting, the electronic blackboard apparatus 14B can concurrently transmit a file indicating the content of copy from the blackboard displayed on the display 3 to the e-mail address of all the users listed in the participant view (i.e., the user who is in the authentication status and the user who is in the unauthenticated state) by an e-mail (not limited thereto, but may be a file transmission to an external storage device, a file server, or the like).

However, the electronic blackboard apparatus 14B does not distribute a file representing the content of the copy from the blackboard to the user who intentionally logs out of the electronic blackboard apparatus 14B. Further, in addition to the user for whom login authentication is performed, the electronic blackboard apparatus 14B may distribute a file representing the content of the copy from the blackboard to other users (for example, the user registered in the schedule) concurrently.

As described above, in the information processing system 1 according to the third embodiment, while maintaining a state in which other users cannot perform the unauthorized access to the individual storage of the user who exits the meeting room, when the user who exits the meeting room accesses the electronic blackboard apparatus 14B from the a terminal apparatus at a remote location, the candidate of the remote connection destination can be presented to the user. This allows a user who exits the meeting room to easily perform a remote connection from a remote terminal to the electronic blackboard apparatus 14B so as to participate again in a video meeting or remote sharing of the meeting.

(Functional Configuration of Information Processing System)

Figure 28:
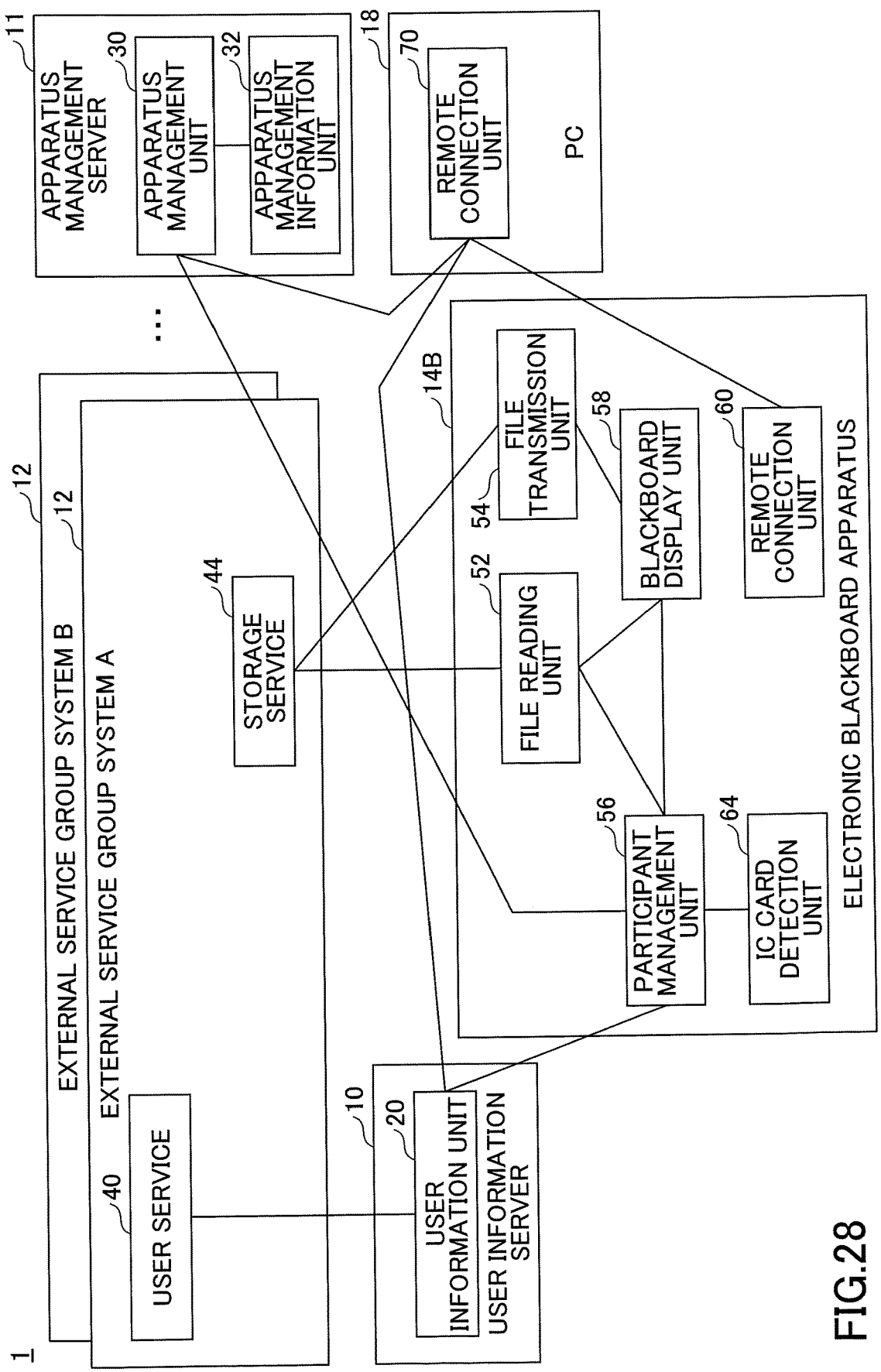
FIG. 28 is a functional configuration diagram illustrating an example of an information processing system according to a third embodiment.

FIG. 28 is a functional configuration diagram illustrating an example of an information processing system according to a third embodiment.

As illustrated in FIG. 28, the apparatus management server 11 includes an apparatus management unit 30 and an apparatus management information unit 32. The apparatus management information unit 32 retains apparatus management information (see FIG. 29). The apparatus management unit 30 updates the apparatus management information held by the apparatus management information unit 32. For example, when the meeting by the electronic blackboard apparatus 14B is started, the apparatus management unit 30 registers the apparatus management information represented by the user ID of the participant of the meeting in the apparatus management information unit 32 in response to a request from the participant management unit 56 of the electronic blackboard apparatus 14B.

The PC 18 includes a remote connection unit 70. The remote connection unit 70 remotely connects the electronic blackboard apparatus 14B with the remote connection unit by using the IP address and performs remote sharing of the contents of the board writing, camera images, and audio of the microphone, etc. between the electronic blackboard apparatus 14B. For example, the remote connection unit 70 is implemented by an application such as a remote connection unit application (or an electronic blackboard application or a remote sharing application of the PC 18) introduced to the PC 18. When the remote connection unit 70 starts the remote connection unit application, the remote connection unit 70 displays a login screen requesting the user to input login information (for example, user ID and password). When the login information is input to the login screen, the remote connection unit 70 transmits the login information to the user information unit 20 of the user information server 10. The user information unit 20 returns the user ID matching the login information to the remote connection unit 70.

The remote connection unit 70 acquires the apparatus management information from the apparatus management server 11 and retrieves the apparatus in which a meeting in which the logged-in user participates from among the apparatus management information based on the user ID obtained from the user information unit 20 as the candidate of the remote connection destination. When the candidate of the remote connection destination is retrieved, the remote connection unit 70 displays a screen recommending the remote connection destination (see FIG. 36) for presenting the candidate of the remote connection destination to the user. When the candidate of the remote connection destination is not searched, the remote connection unit 70 displays a screen (see FIG. 37) for selecting the connection destination for the user to select the remote connection destination.

The electronic blackboard apparatus 14B includes a remote connection unit 60. At the request of the remote connection unit 70 of the PC 18, the remote connection unit 60 provides the remote connection unit 70 with one or more of sharing board book contents, camera image sharing, or microphone voice sharing.

In the third embodiment, at the start of In

In the third embodiment, at the start of the video meeting, the participant management unit 56 of the electronic blackboard apparatus 14B can transmit the user ID and the apparatus IP registered in the participant view (see FIG. 10) to the apparatus management server 11 to update the apparatus management information (see FIG. 29) held by the apparatus management server 11.

(Example of Apparatus Management Information)

FIG. 29 is a diagram illustrating an example of the apparatus management information retained by the apparatus management information unit 32. As illustrated in FIG. 29, the apparatus management information is information in which the IP address of the electronic blackboard apparatus 14B is associated with the user ID of the participant in the meeting using the electronic blackboard apparatus 14B (i.e., the user ID of the user who logged in the electronic blackboard apparatus 14B). The apparatus management information is registered with the apparatus management information unit 32 by the apparatus management unit 30 in response to a request from the participant management unit 56 of the electronic blackboard apparatus 14B when a meeting by the electronic blackboard apparatus 14B starts or when a participant participates sequentially.

When a meeting is initiated on the electronic blackboard apparatus 14B, for example, the first participant in the meeting held on the electronic blackboard apparatus 14B successfully authenticates the electronic blackboard apparatus 14B. Other times may be when the first participant starts and starts the operation of the electronic blackboard apparatus 14B or when the start time of the meeting schedule is reached. At the start of the meeting, the electronic blackboard apparatus 14B transmits the apparatus IP address of the electronic blackboard apparatus 14B, the participant information such as the user ID based on the authentication of the first participant, and the like to the apparatus management server 11. Further, the second and subsequent participants of the meeting participate in the meeting one after another, and whenever the authentication with the electronic blackboard apparatus 14B is succeeded, the participant information such as the user ID of the participant based on the authentication and the apparatus IP address of the electronic blackboard apparatus 14B are transmitted from the electronic blackboard apparatus 14B to the apparatus management server 11, and the participant is additionally stored for each apparatus IP address. The accumulated apparatus management information in this way allows the identification of which participants participate in the meeting by the electronic blackboard apparatus 14B. In addition, the apparatus management information allows the electronic blackboard apparatus 14B to be remotely connected to the user who performs the remote connection unit from the terminal apparatus.

The apparatus management information further includes the ID information of each electronic blackboard apparatus transmitted from the electronic blackboard apparatus 14B or the like, and may manage the apparatus IP address and the participant view for each ID information of the electronic blackboard apparatus. In this case, it is possible to display the ID information of the electronic blackboard apparatus, and even when the apparatus IP is changed, the destination electronic blackboard apparatus may be specified by the ID information of the electronic blackboard apparatus or selected by each device. Further, the ID information of the electronic blackboard apparatus may be input, created, and edited by the administrator or the like to the electronic blackboard apparatus 14B or the apparatus management server 11 in order to make it easier to select the ID information at the time of recommendation to the participants.

(Procedure of Processing by the Electronic Blackboard Apparatus 14B)

Figure 30:
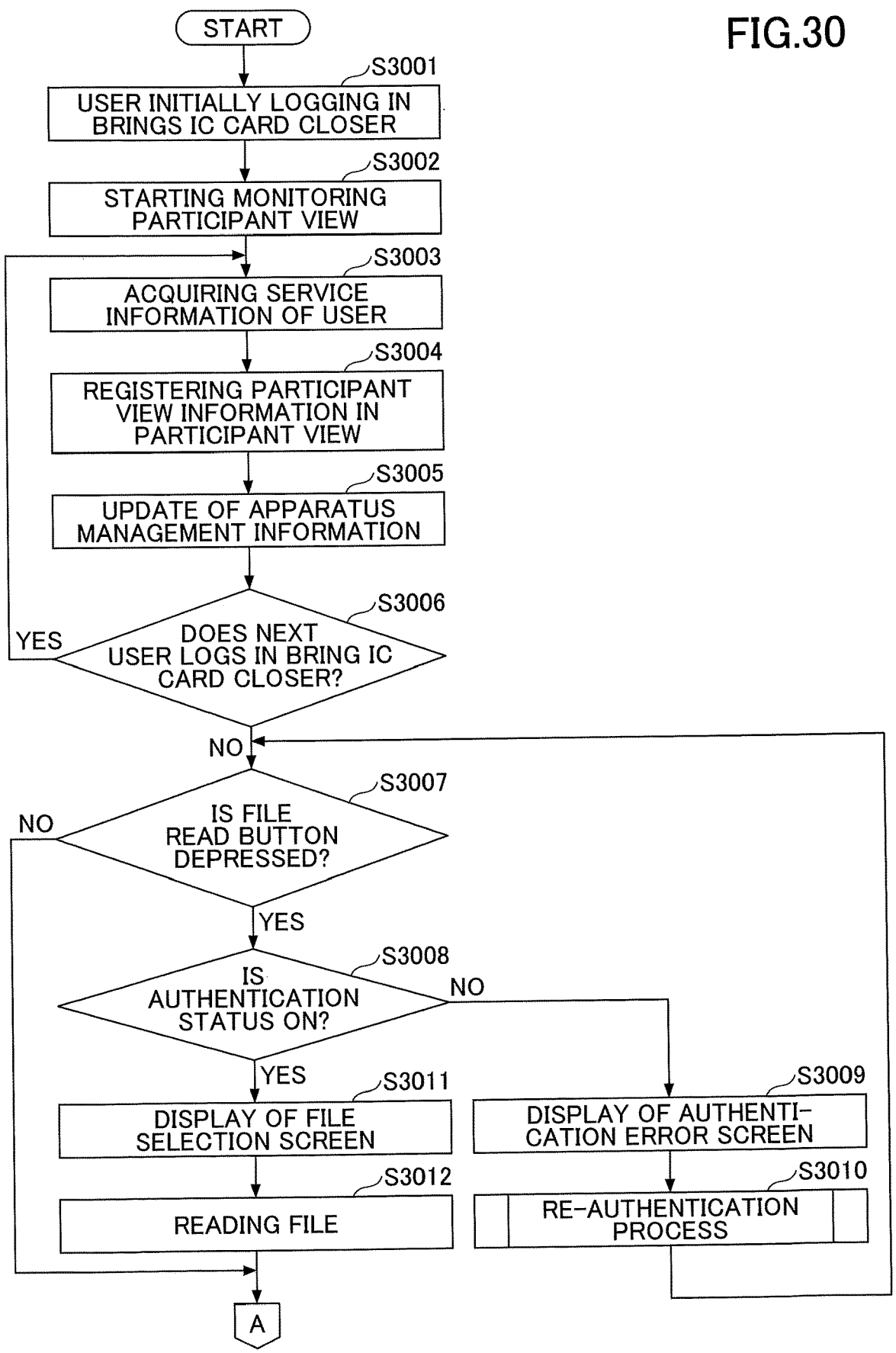
FIG. 30 is a flowchart illustrating a procedure of processing by the electronic blackboard apparatus according to a third embodiment.
Figure 31:
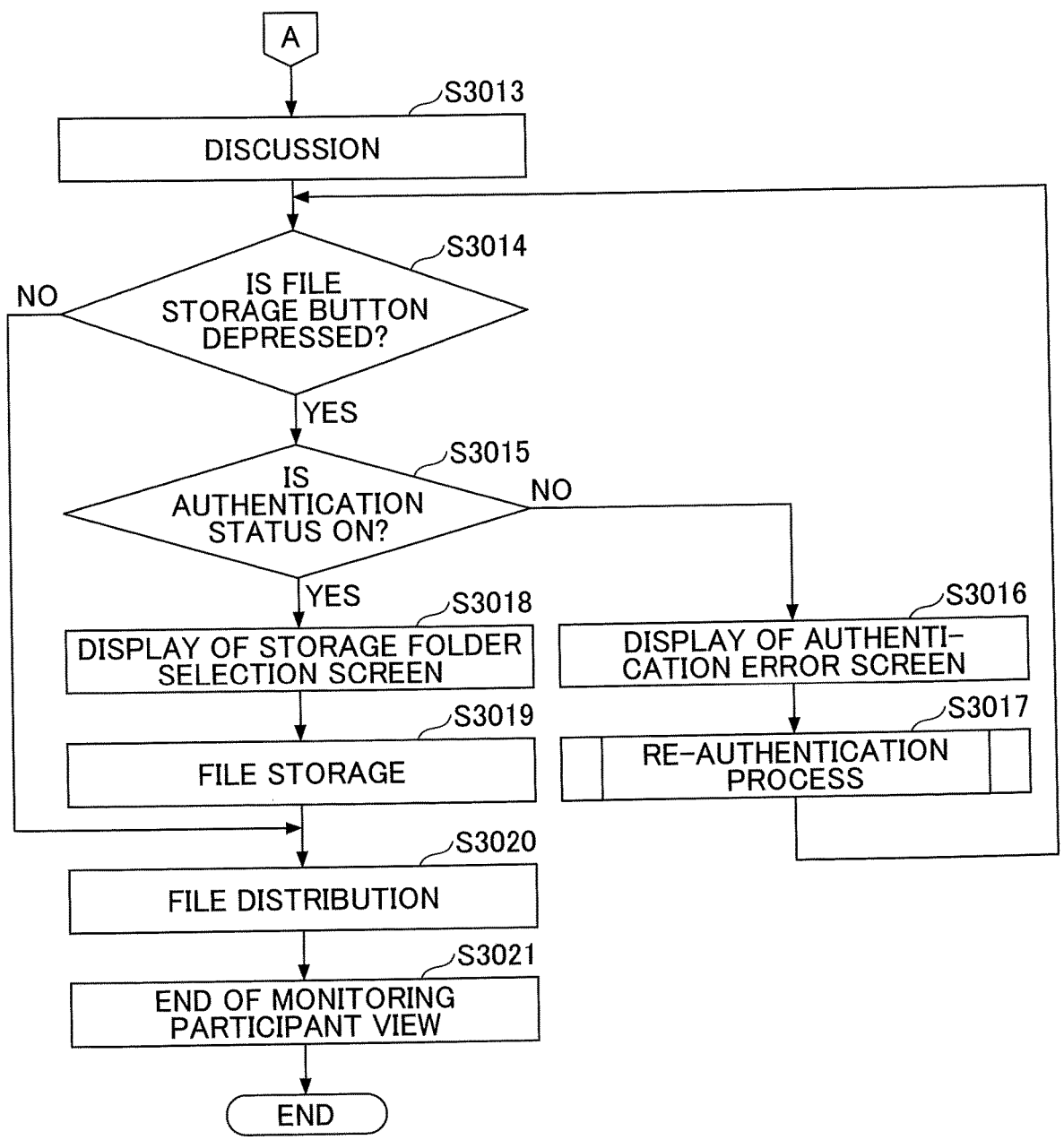
FIG. 31 is a flowchart illustrating a procedure of processing by the electronic blackboard apparatus according to a third embodiment.

FIGS. 30 and 31 are flowcharts illustrating a procedure of processing by the electronic blackboard apparatus 14B according to the third embodiment.

In the electronic blackboard apparatus 14B, the user who first logs in holds the IC card 630 to the RF tag reader 617 (step S3001). At this time, the RF tag reader 617 reads the identification information from the IC card 630.

Next, in step S3002, the determination unit 56C of the participant management unit 56 starts monitoring the participant view. Thereafter, the determination unit 56C calculates the elapsed time after login authentication for each user registered in the participant view at a predetermined time interval (for example, at 1 second intervals). The determination unit 56C determines that when any user registered in the participant view reaches a predetermined time (for example, 3 minutes) after login authentication, the user has moved away from the electronic blackboard apparatus 14B. In this case, the determination unit 56C sets "OFF" to the authentication status of the participant view information of the user.

Next, in step S3003, the participant management unit 56 transmits the identification information read in step S3001 to the user information server 10 and acquires the service information (see FIG. 14) of the user corresponding to the identification information from the user information server 10.

Next, in step S3004, the registration unit 56B of the participant management unit 56 registers the participant view information (user ID, user name, authentication status, final authentication time, and distribution destination information of the electronic blackboard system) corresponding to the identification information read in step S3001 in the participant view.

Next, in step S3005, the participant management unit 56 transmits the user ID of the user registered in the participant view and the apparatus IP of the electronic blackboard apparatus 14B to the apparatus management server 11 to update the apparatus management information (see FIG. 29). For example, when the first user is registered in the participant view, the participant management unit 56 adds a record in which the first user's user ID is associated with the IP address of the electronic blackboard apparatus 14B to the apparatus management information held by the apparatus management server 11. When the second and subsequent users are registered in the participant view, the participant management unit 56 adds the user ID of the second and subsequent users to the above-described record of the apparatus management information held by the apparatus management server 11.

Hereinafter, since the steps S3006 to S3021 are the same as the steps S3005 to S3020 described in the first embodiment (FIG. 19 and FIG. 20), the description will not be repeated here.

(Sequence of Processing by Electronic Blackboard Apparatus 14B)

Figure 32:
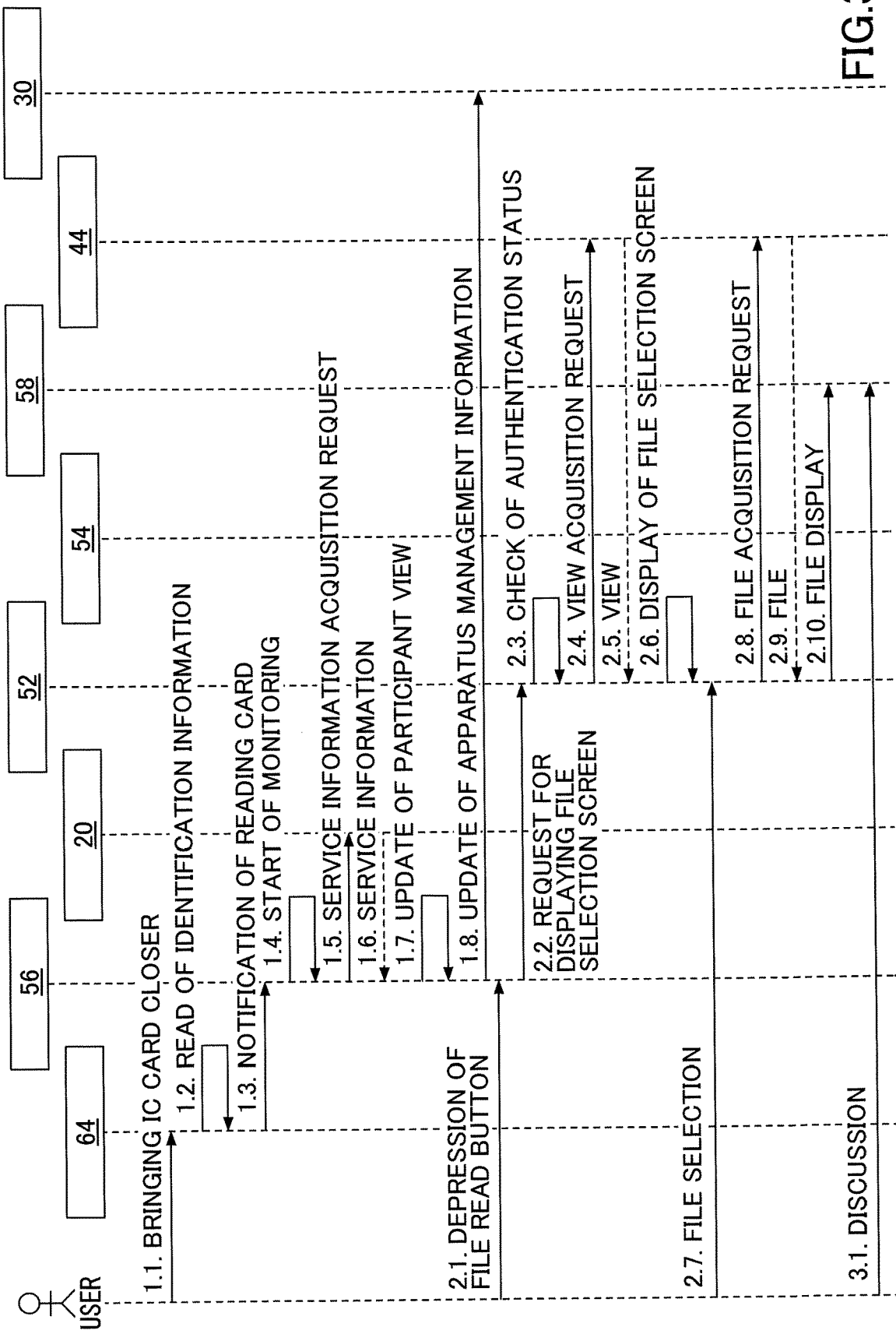
FIG. 32 is a network diagram illustrating a network of processing by the electronic blackboard apparatus according to a third embodiment.
Figure 33:
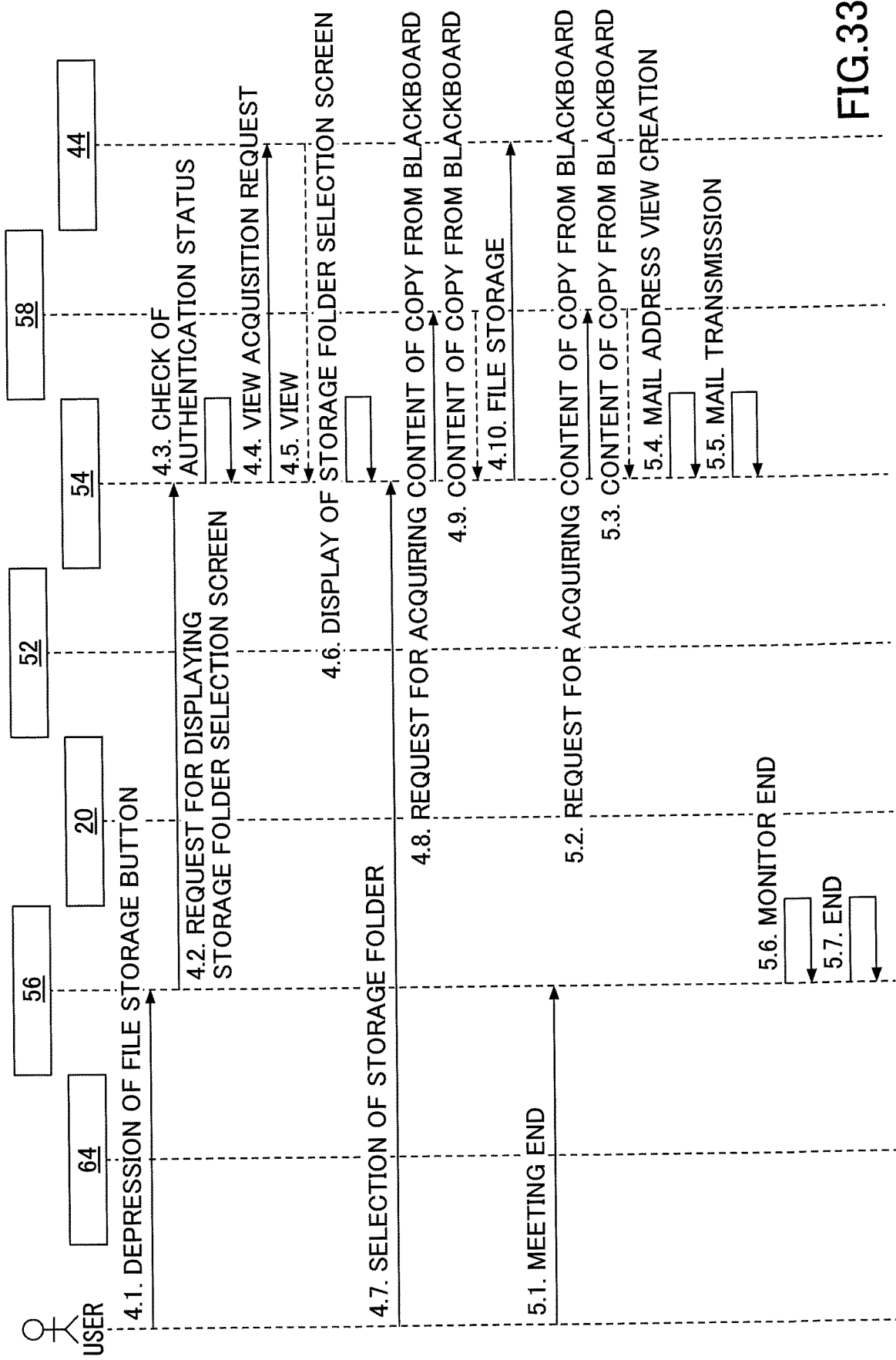
FIG. 33 is a network diagram illustrating a network of processing by the electronic blackboard apparatus according to the third embodiment.

FIGS. 32 and 33 are sequence diagrams illustrating a sequence of processing by the electronic blackboard apparatus 14B according to the third embodiment.

<Sequence 1.1. to Sequence 1.7.>

In the electronic blackboard apparatus 14B, first, the user brings the IC card 630 closer to the RF tag reader 617 (the IC card detection unit 64) (sequence 1.1). At this time, the RF tag reader 617 reads the identification information from the IC card 630 (sequence 1.2.).

Next, the IC card detection unit 64 notifies the participant management unit 56 of the identification information read from the IC card 630 (sequence 1.3.). Next, the participant management unit 56 (determination unit 560) starts monitoring the participant view (sequence 1.4.).

Next, the participant management unit 56 transmits the identification information notified from the IC card detection unit 64 to the user information unit 20 of the user information server 10 and requests the user information unit 20 to provide service information (sequence 1.5.). As a result, the participant management unit 56 acquires the service information transmitted from the user information unit 20 (sequence 1.6.).

Next, the participant management unit 56 (the registration unit 56B) registers the participant view information (user ID, user name, authentication status, final authentication time, and distribution destination information of the electronic blackboard system) corresponding to the identification information notified from the IC card detection unit 64 in the participant view (sequence 1.7).

Next, in step S3005, the participant management unit 56 transmits the user ID of the user registered in the participant view and the apparatus IP of the electronic blackboard apparatus 14B to the apparatus management server 11 to update the apparatus management information (see FIG. 29) held by the apparatus management server 11.

Hereinafter, since the sequences 2.1 to 5.7 are similar to the sequences 2.1 to 5.7 described in the first embodiment (FIGS. 19 and 20), the description thereof is omitted.

(Processing Procedure by PC18, etc.)

Figure 34:
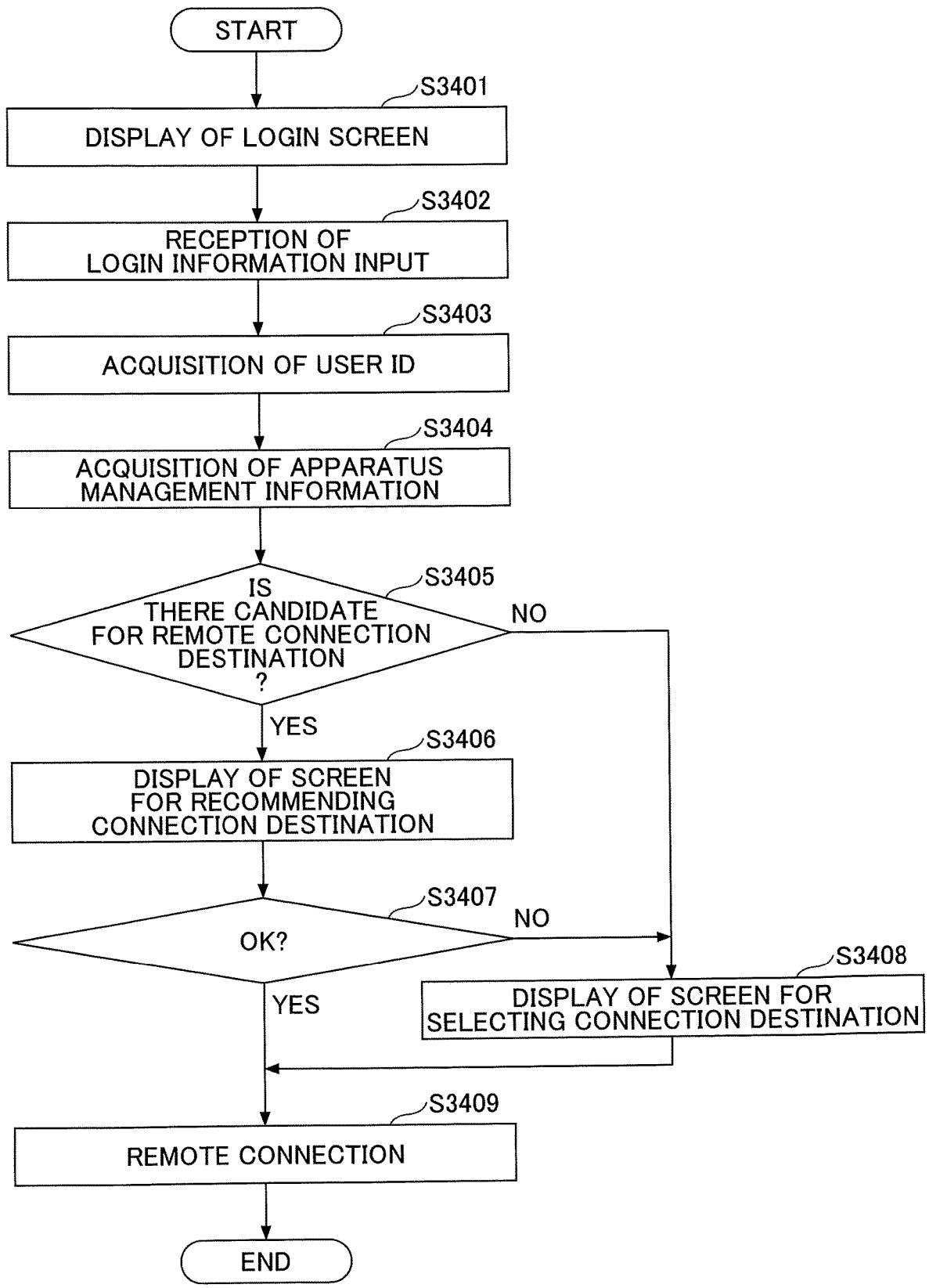
FIG. 34 is a flowchart showing a processing procedure by a PC or the like according to the third embodiment.

FIG. 34 is a flowchart illustrating a procedure when a remote information processing apparatus such as the PC18 according to the third embodiment and performing a remote connection unit to the electronic blackboard apparatus or the like.

In the PC 18, first, in step S3401, the remote connection unit 70 of the remote connection unit application displays the login screen. In step S3402, the remote connection unit 70 receives the ID and password input to the login screen. In step S3403, the remote connection unit 70 transmits an ID and a password to the user information unit 20 of the user information server 10 and acquires user information (user information corresponding to the user ID) including the user ID that is returned from the user information unit 20.

Next, in step S3404, the remote connection unit 70 acquires the apparatus management information from the apparatus management server 11. In step S3405, the remote connection unit 70 determines whether the candidate of the remote connection destination (that is, the apparatus associated with the user ID acquired in step S3403) is included in the apparatus management information acquired in step S3404.

In step S3405, when it is determined that the candidate of the remote destination is included (YES in step S3405), and the remote connection unit 70 displays the recommended connection destination screen (see FIG. 36) for presenting the candidate of the remote destination to the user (step S3406). In step S3407, the remote connection unit 70 determines whether "OK" is selected in the recommended connection destination screen.

In step S3409, when it is determined that "OK" is selected in step S3407 (YES in step S3407), the remote connection unit 70 performs remote connection unit for a candidate remote connection destination. The PC 18 ends the series of processes illustrated in FIG. 34.

When it is determined in step S3407 that "OK" is not selected (step S3407: No), in step S3408, the connection destination selection screen (see FIG. 37) for having the user select the remote connection destination is displayed. In step S3409, the remote connection unit 70 performs remote connection unit to the remote connection destination selected on the connection destination selection screen. The PC 18 ends the series of processes illustrated in FIG. 34.

In step S3405, when it is determined that the candidate of the remote destination is not included (NO in step S3405), in step S3408, the remote connection unit 70 displays the connection destination selection screen (see FIG. 37) for having the user select the remote destination. In step S3409, the remote connection unit 70 performs remote connection unit to the remote connection destination selected on the connection destination selection screen. The PC 18 ends the series of processes illustrated in FIG. 34.

(Sequence of Processing by PC18, Etc.)

Figure 35:
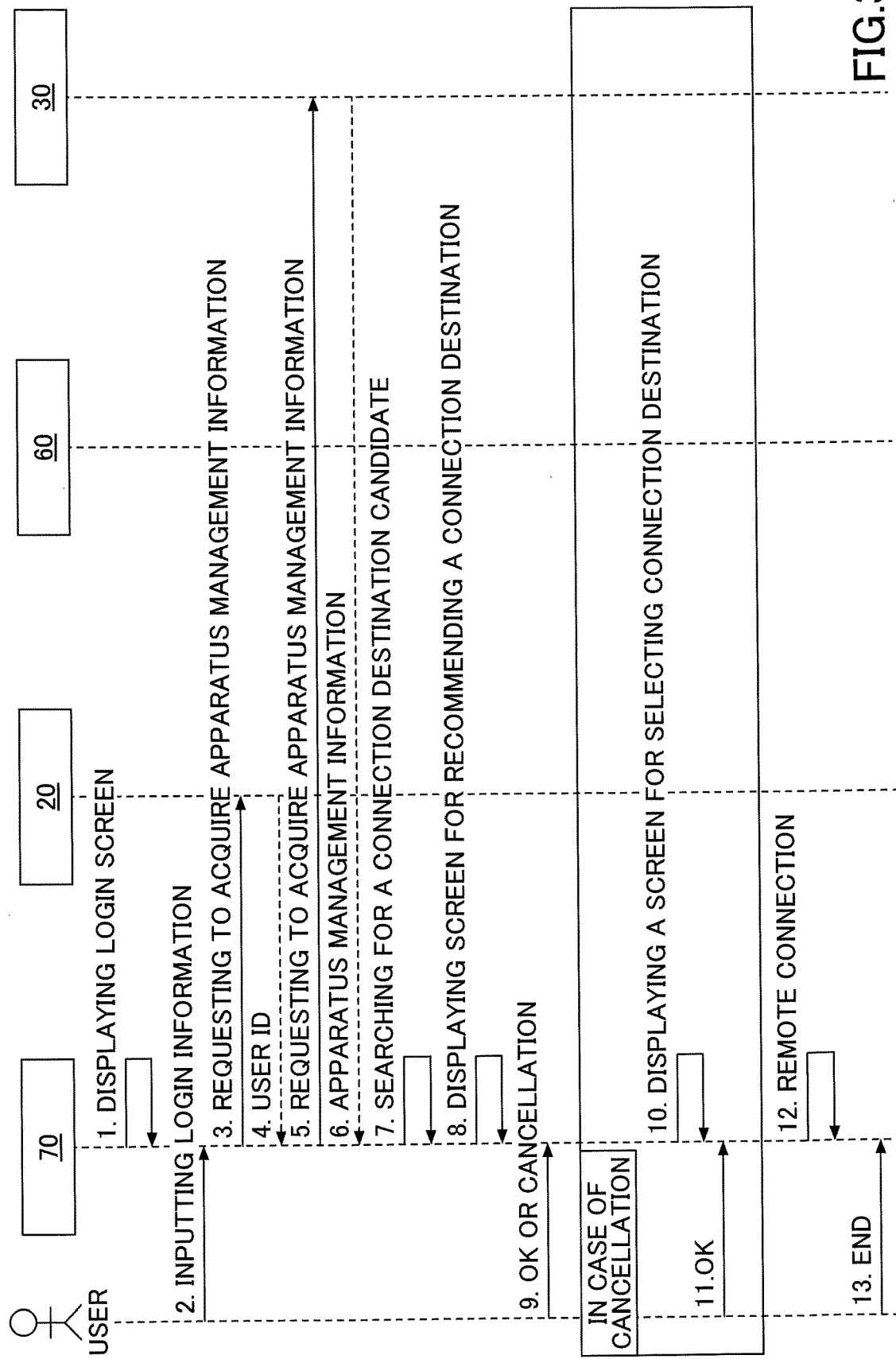
FIG. 35 is a sequence diagram illustrating a sequence of processing by a PC or the like in accordance with the third embodiment.

FIG. 35 is a sequence diagram illustrating a sequence of processing when a remote information processing apparatus such as the PC18 according to the third embodiment and performing a remote connection unit to the electronic blackboard apparatus or the like.

First, the remote connection unit 70 of the remote connection unit application of the PC 18 displays the login screen (sequence 1.). Then, the user enters login information (user ID and password) for the login screen (sequence 2). The remote connection unit 70 of the PC 18 transmits login information together with the user ID acquisition request to the user information unit 20 of the user information server 10 (sequence 3). As a result, the remote connection unit 70 of the PC 18 acquires user information (user information corresponding to the user ID) including the user ID that is returned from the user information unit 20 (sequence 4.). Subsequently, the remote connection unit 70 of the PC 18 transmits the request for acquiring the apparatus management information to the apparatus management unit 30 of the apparatus management server 11 (sequence 5). As a result, the remote connection unit 70 of the PC 18 acquires the apparatus management information returned from the apparatus management unit 30 (sequence 6.). The remote connection unit 70 of the PC 18 retrieves the candidate of the remote connection destination (that is, the apparatus associated with the user ID acquired from the user information unit 20) from among the apparatus management information (sequence 7).

Here, assuming that the candidate of the remote connection destination is retrieved, the remote connection unit 70 of the PC 18 displays a screen recommending the remote connection destination (see FIG. 36) for presenting the candidate of the remote connection destination to the user (sequence 8.). Then, the user selects "OK" or "Cancel" on the Recommended host screen (sequence 9).

When "Cancel" is selected in sequence 9, the remote connection unit 70 of the PC 18 displays the screen for selecting the connection destination (see FIG. 37) for making the user select the remote connection destination (sequence 10). When the user selects the remote connection destination and selects "OK" on the connection destination selection screen (sequence 11.), the remote connection unit 70 of the PC 18 performs remote connection to the remote connection destination selected on the connection destination selection screen (sequence 12.). Thereafter, if the user wishes to terminate the remote connection unit, the user instructs the remote connection unit 70 of the PC 18 to terminate (sequence 13.).

On the other hand, when "OK" is selected in sequence 9, the remote connection unit 70 of the PC 18 makes a remote connection unit to a candidate remote connection destination (sequence 12.). Thereafter, if the user wishes to terminate the remote connection unit, the user instructs the remote connection unit 70 of the PC 18 to terminate (sequence 13.).

With the series of processes illustrated in FIGS. 34 and 35, the user can easily remotely connect from the PC 18 to the electronic blackboard apparatus 14B presented as a candidate remote destination. This remote connection unit allows remote sharing of the PC 18 and the electronic blackboard apparatus 14B. For example, the remote connection unit 70 of the PC 18 may cause the screen of the electronic blackboard apparatus 14B to be displayed on a display provided by the PC 18. For example, the remote connection unit 70 of the PC 18 may receive the voice input to the microphone and the image captured by the camera from the electronic blackboard apparatus 14B and cause the output from the PC 18 in the electronic blackboard apparatus 14B. For example, the remote connection unit 70 of the PC 18 may transmit the voice input to the microphone and the image captured by the camera to the electronic blackboard apparatus 14B for output to the electronic blackboard apparatus 14B at the PC 18. For example, the remote connection unit 70 of the PC 18 can access the individual storage (file acquisition, file sharing, etc.) of the user of the PC 18 through the electronic blackboard apparatus 14B.

A part of the processing illustrated in FIG. 34 and FIG. 35 may be performed by the user information server 10 or the remote connection unit 60 of the electronic blackboard apparatus 14B. For example, the remote connection unit 60 of the user information server 10 or the electronic blackboard apparatus 14B may receive a search request of the remote connection destination from another device such as the PC 18 and search for the remote connection unit candidate from among the apparatus management information to display the recommended connection destination screen or the connection destination selection screen on the apparatus such as the PC 18.

In addition, when remotely connecting from the electronic blackboard apparatus 14B to another device, a recommended destination indication, including other information processing apparatus such as the PC 18 and other electronic blackboard devices, may be provided on the electronic blackboard apparatus 14B.

In the example of FIG. 34 and FIG. 35, "Mary" exits the meeting room in which the electronic blackboard apparatus 14B is installed, and "Mary" is registered in the participant view on the electronic blackboard apparatus 14B, but a certain time has elapsed since the login (the first embodiment) or a predetermined number of times has not been reflected on the image (the second embodiment). Therefore, it has been described that the Mary is remotely connected to the PC 18 when the image is in the "unauthenticated" state. In this state, when the meeting materials, such as a board document, are concurrently distributed from the electronic blackboard apparatus 14B as illustrated in 7. of FIG. 27, the documents are transmitted to the participants in the authentication status and the unauthenticated state as a destination (or a storage destination). Therefore, the "Mary" can receive the documents even after remote connection unit from the PC 18 after exiting.

On the other hand, when "Mary" exits the meeting room, "Mary" may enter the logout state by performing operations such as logout or deletion from the participant view on the screen of the electronic blackboard apparatus 14B. In this case, because the electronic blackboard apparatus 14B is in a logout state that is not included in the participant view, when "Mary" is remotely connected from the PC 18 or the like, it may be registered (added) or re-registered in the participant view of the electronic blackboard apparatus 14B. Accordingly, even if the electronic blackboard apparatus 14B is one time out of the participant or does not originally include the participant, the destination associated with the ID of the remotely connected participant (Mary) may be included as an address (e.g., the mail destination and the file storage destination) at the time of simultaneous distribution of meeting materials and the like from the electronic blackboard apparatus 14B.

Further, if "Mary" is remotely connected to the electronic blackboard apparatus 14B from the PC 18 or the like when the electronic blackboard apparatus 14B is in a logout state not included in the participant view, the "Mary" may be added to the participant view and the "Unauthenticated state" may be changed to "Unauthenticated state." This allows the distribution of materials to be included and restricts Mary's access to individual storage from the electronic blackboard apparatus 14B to participants.

(Example of Recommended Connection Screen)

Figure 36:
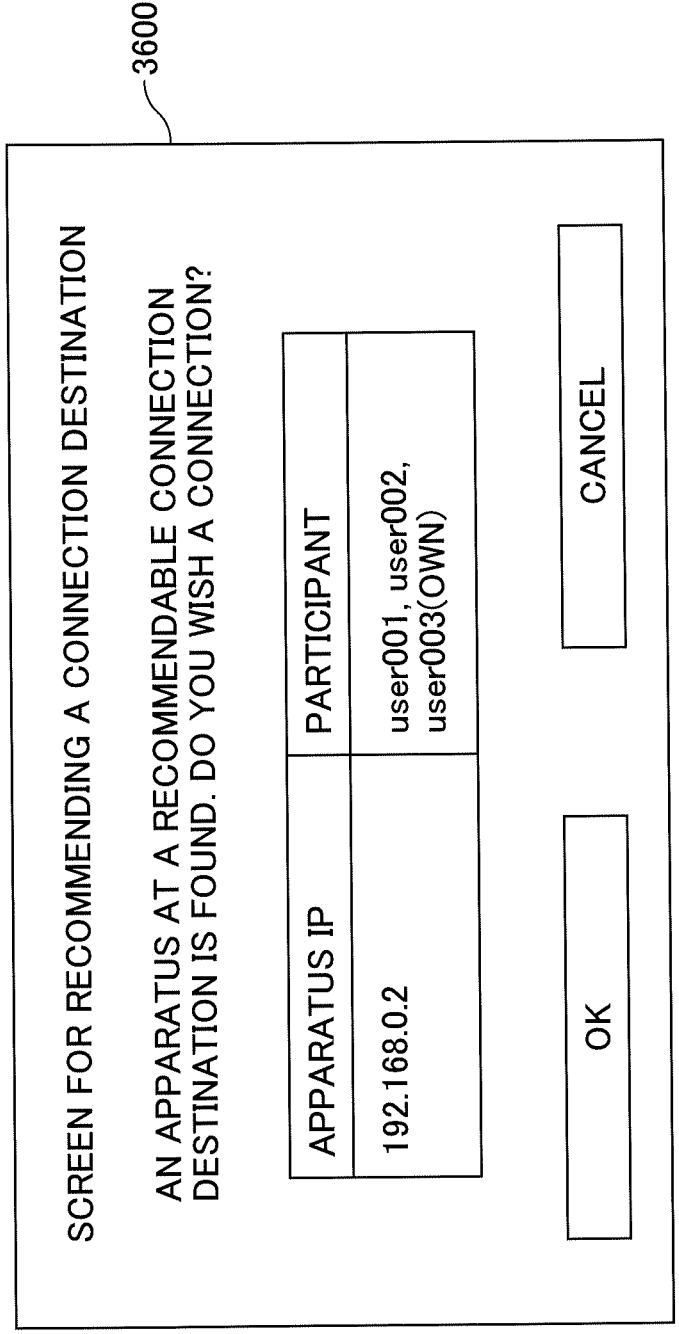
FIG. 36 is a diagram illustrating an example of a recommended connection destination screen displayed in the PC according to the third embodiment.

FIG. 36 is a diagram illustrating an example of a screen for recommending a connection destination displayed in the PC 18 according to the third embodiment. The recommended connection destination screen 3600 illustrated in FIG. 36 is an example of a screen displayed on a display provided with the PC 18 when a candidate for a remote connection destination is retrieved from the apparatus management information. As illustrated in FIG. 36, the recommended connection destination screen 3600 shows the IP address of the candidate device of the remote connection destination and the video meeting participants who use the apparatus. FIG. 36 illustrates the case in which the user ID of the login user of the PC 18 is "user003." The remote connection unit 70 of the PC 18 performs remote connection unit to a candidate remote connection destination when the "OK" button is selected in the recommended connection destination screen 3600. Meanwhile, the remote connection unit 70 of the PC 18 displays the connection destination selection screen 3700 illustrated in FIG. 37 when the "Cancel" button is selected in the recommended connection destination screen 3600.

(Example of Connection Destination Selection Screen)

Figure 37:
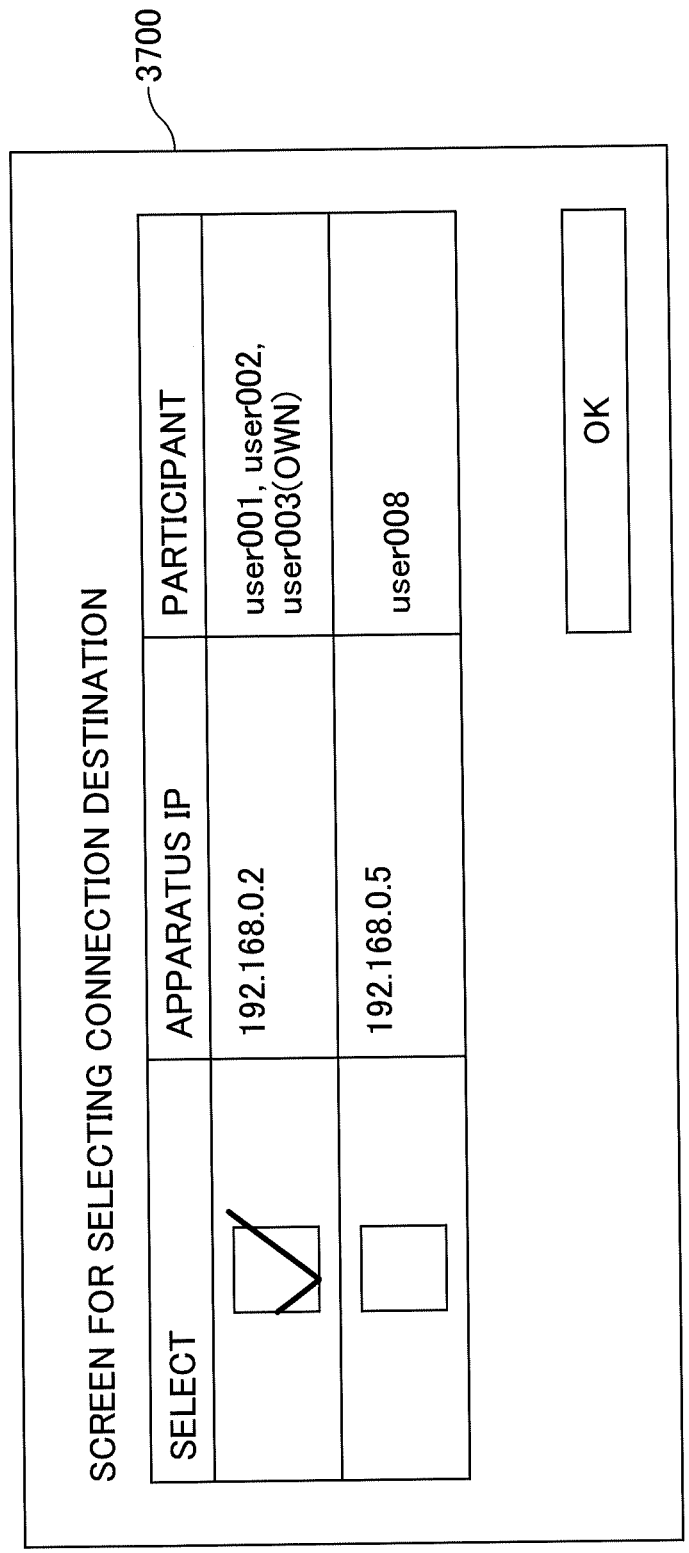
FIG. 37 is a diagram illustrating an example of the connection destination selection screen displayed in the PC according to the third embodiment.

Display 306 displays various information such as cursors, menus, windows, characters, or images. The connection destination selection screen 3700 illustrated in FIG. 37 is an example of a screen displayed on a display provided with the PC 18 when the candidate of the remote connection destination is not searched from among the apparatus management information or when the user does not want to remotely connect to the candidate of the remote connection destination. As illustrated in FIG. 37, a plurality of devices (i.e., all of the apparatuses illustrated in the apparatus management information) that can be remotely connected from the PC 18 are displayed on the connection destination selection screen 3700. A check box is provided for each device in the host selection screen 3700. The user can remotely connect the PC 18 to the selected device by selecting a check box for any apparatus and then selecting the "OK" button. In the example illustrated in FIG. 37, the check box of the candidate device of the remote connection destination is automatically selected. However, such a selection may not be performed.

In addition, when the participant has not yet logged in or when the operation of logging out or the operation of removing the participant from the participant view is performed in the electronic blackboard apparatus 14B, the electronic blackboard apparatus 14B may not be displayed on the screen 3600 recommending a connection destination in the PC 18 because it is not included in the participant view of the electronic blackboard apparatus 14B. In this case, the participant remotely connecting from the PC 18 may select a destination on the host selection screen 3700 displayed on the PC 18 and connect to the electronic blackboard apparatus 14B. In addition, even when the electronic blackboard apparatus 14B performs the logout operation or the operation of removing the same from the participant view, all the participants who have logged in may be retained in the electronic blackboard apparatus 14B as the logged in participant view, and the recommended connection destination screen may be displayed on the apparatus remotely connected to the PC 18 or the like based on the logged in participant view.

(Example of Screen Sharing by Electronic Blackboard Apparatus 14B and PC18)

Figure 38:
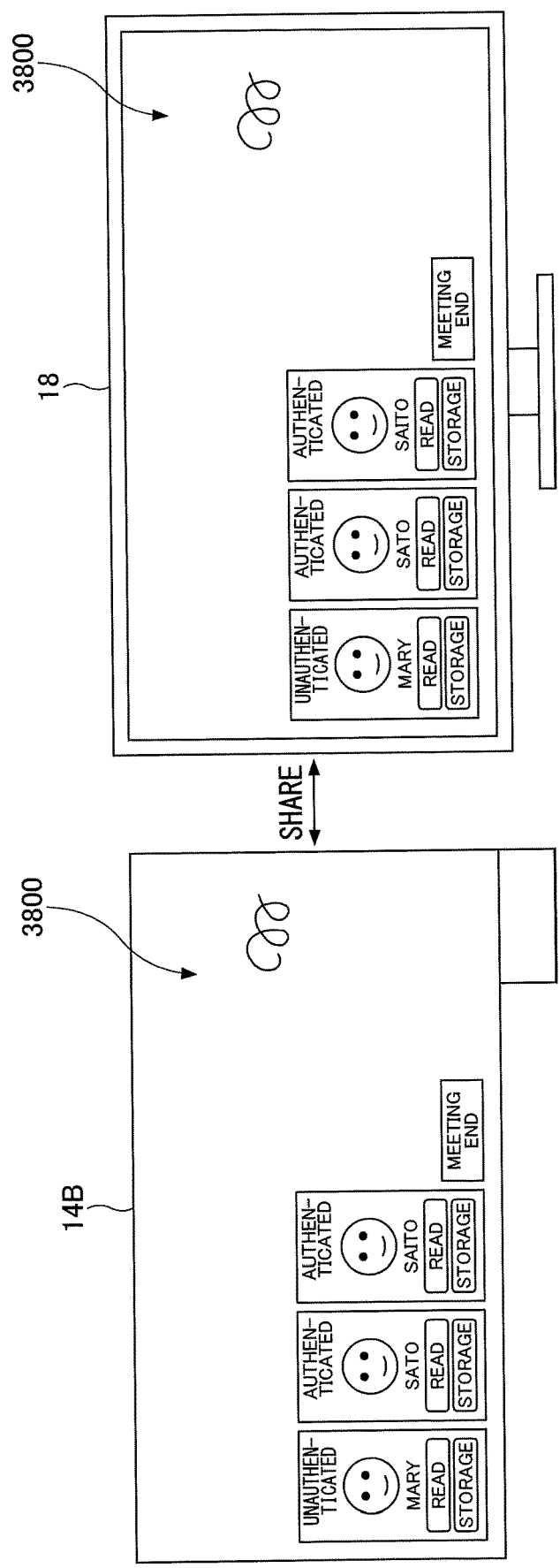
FIG. 38 is a diagram illustrating an example of screen sharing by the electronic blackboard apparatus and the PC according to the third embodiment.

FIG. 38 is a diagram illustrating an example of screen sharing by the electronic blackboard apparatus 14B and the PC 18 according to the third embodiment. In FIG. 38, the remote connection unit 70 of the PC 18 is remotely connected to the electronic blackboard apparatus 14B, so that the screen 3800 displayed on the electronic blackboard apparatus 14B is also displayed on the display of the PC 18. The screens 3800 and 3800 displayed on the PC 18 are synchronized with each other and shared remotely. Therefore, when the screens 3800 are changed in the electronic blackboard apparatus 14B, the screens 3800 are also changed in the PC 18. The remote connection unit 70 of the PC 18 can be remotely operated on the screen 3800. That is, the remote connection unit 70 of the PC 18 can perform remote control (for example, write, select, display a file) on the screen 3800 displayed on the electronic blackboard apparatus 14B. In this case, the display contents of the screen 3800 are also changed in the PC 18.

In FIG. 38, since "Mary" has left the meeting room, the "Mary" is "unauthentication status" on the screen 3800 of the electronic blackboard apparatus 14B of the meeting room. The screen 3800 is remotely shared on the screen of the PC 18. Accordingly, the electronic blackboard apparatus 14B is able to send mail and send files of information shared at a meeting such as a board writing to a destination associated with a "Mary" ID, while restricting the participants in the meeting room from accessing the "Mary" storage. Further, the "Mary" may be "authentication status" in the remote connection unit application on the PC 18 side, enabling viewing and writing of the files of the "Mary" individual storage from the screen of the remote connection unit application, and remote sharing of the screen or the files to the electronic blackboard apparatus 14B.

Further, in FIG. 38, the user individual information display screen 1300 on the electronic blackboard apparatus 14B or the participant view of the operation panel including the user-specific information display may be displayed on the electronic blackboard apparatus 14B to notify the participant in the meeting room of the fact that "Mary" has logged in as remote device such as the PC 18, the PC 18 has been remotely connected to the electronic blackboard apparatus 14B, or "Mary" has been registered in the participant view. The display of the login or remote connection unit of the remote device by the electronic blackboard apparatus 14B may be displayed by displaying the name or ID representing the apparatus or by changing the color of the apparatus, for each user individual information display screen 1300 so that it is known from which device each participant participates. For example, by acquiring the apparatus management information to be stored in association with the participant of each device, the electronic blackboard apparatus 14B can store and display which device participated in each participant in the participant view.

In addition, for example, a message by a participant who is logged in and remotely connected to the PC 18 may be displayed on the user individual information display screen 1300 of the electronic blackboard apparatus 14B. For example, when a message is input to a remote connection unit application of the PC 18, for example, requesting a meeting material to be sent, the message is transmitted to the user information server 10, the message is stored in accordance with the user information, such as the user information view, and the electronic blackboard apparatus 14B that acquired the user information may implement the message display method on the user individual information display screen 1300.

(Hardware Configuration Diagram of the Apparatus Management Server 11 and the PC 18)

Figure 39:
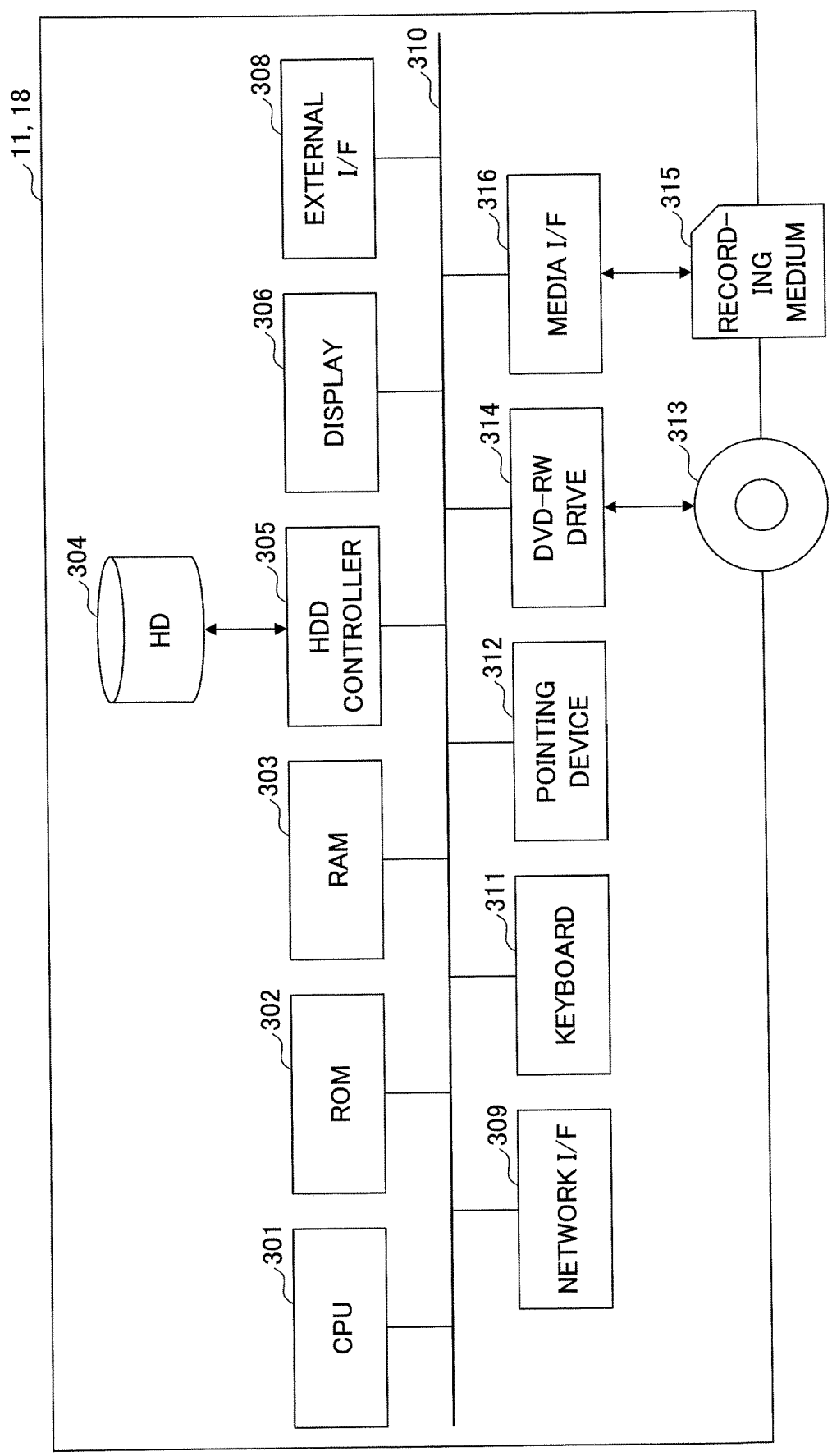
FIG. 39 is a diagram illustrating the hardware configuration of the apparatus management server and the PC used in the information processing system according to the third embodiment.

FIG. 39 is a hardware configuration diagram illustrating an apparatus management server 11 and a PC 18 used in the information processing system according to the third embodiment.

As illustrated in FIG. 39, the apparatus management server 11 and the PC 18 are constructed by a computer and include a CPU 301, ROM 302, RAM 303, HD 304, an HDD (hard disk drive) controller 305, a display 306, an external apparatus connection I/F (interface) 308, a network I/F 309, a data bus 310, a keyboard 311, a pointing device 312, a DVD-RW (Digital Versatile Disk Rewritable) drive 314, and a media I/F 316, as illustrated in FIG. 39.

Of these, the CPU 301 controls the operation of the entire apparatus management server 11 and the PC 18. The ROM 302 stores a program used to drive the CPU 301, such as an IPL. RAM 303 is used as the work area of CPU 301. The HD 304 stores various data such as a program. The HDD controller 305 controls the reading or writing of various data to the HD 304 according to the control of the CPU 301. Display 306 displays various information such as cursors, menus, windows, characters, or images. The external apparatus connection I/F 308 is an interface for connecting various external devices. In this case, the external device may be, for example, a USB (Universal Serial Bus) memory or a printer. The network I/F 309 is an interface for performing data communication using the communication network 16. The data bus 310 is an address bus or data bus for electrically connecting components such as the CPU 301 illustrated in FIG. 39.

The keyboard 311 is a type of input means having a plurality of keys for inputting characters, numbers, various instructions, and the like. The pointing device 312 is a type of input means for selecting and executing various instructions, selecting a processing target, moving a cursor, and the like. The DVD-RW drive 314 controls the reading or writing of various data to the DVD-RW 313 as an example of a removable recording medium. It is not limited to DVD-RW, but may be DVD-R, etc. The media I/F 316 controls the reading or writing (storage) of data to a recording medium 315, such as a flash memory.

(Variations of Terminal Apparatus)

Figure 41:
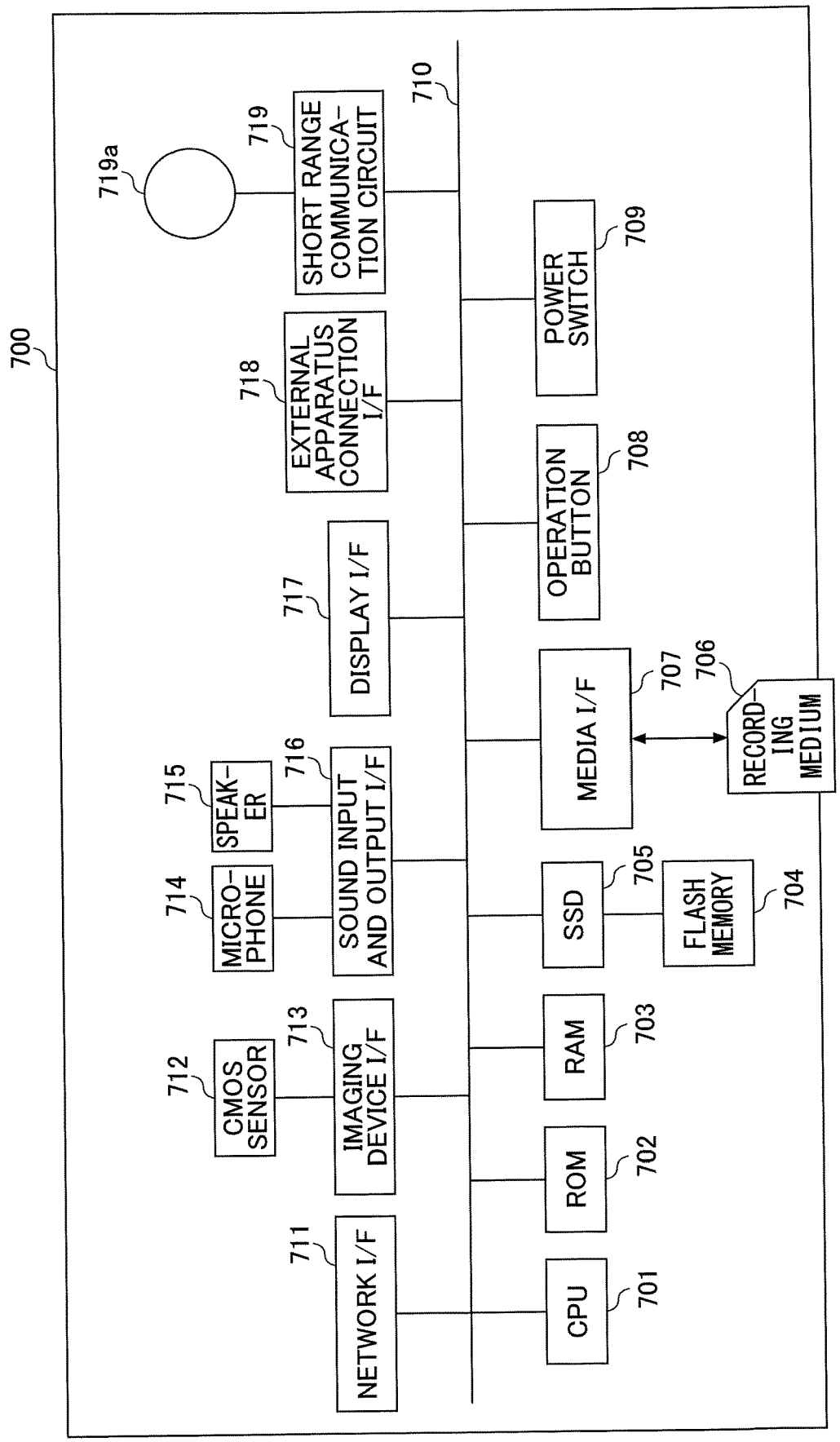
FIG. 41 is a hardware configuration diagram of a video meeting terminal that is an example of a terminal apparatus used in the information processing system according to the third embodiment.
Figure 42:
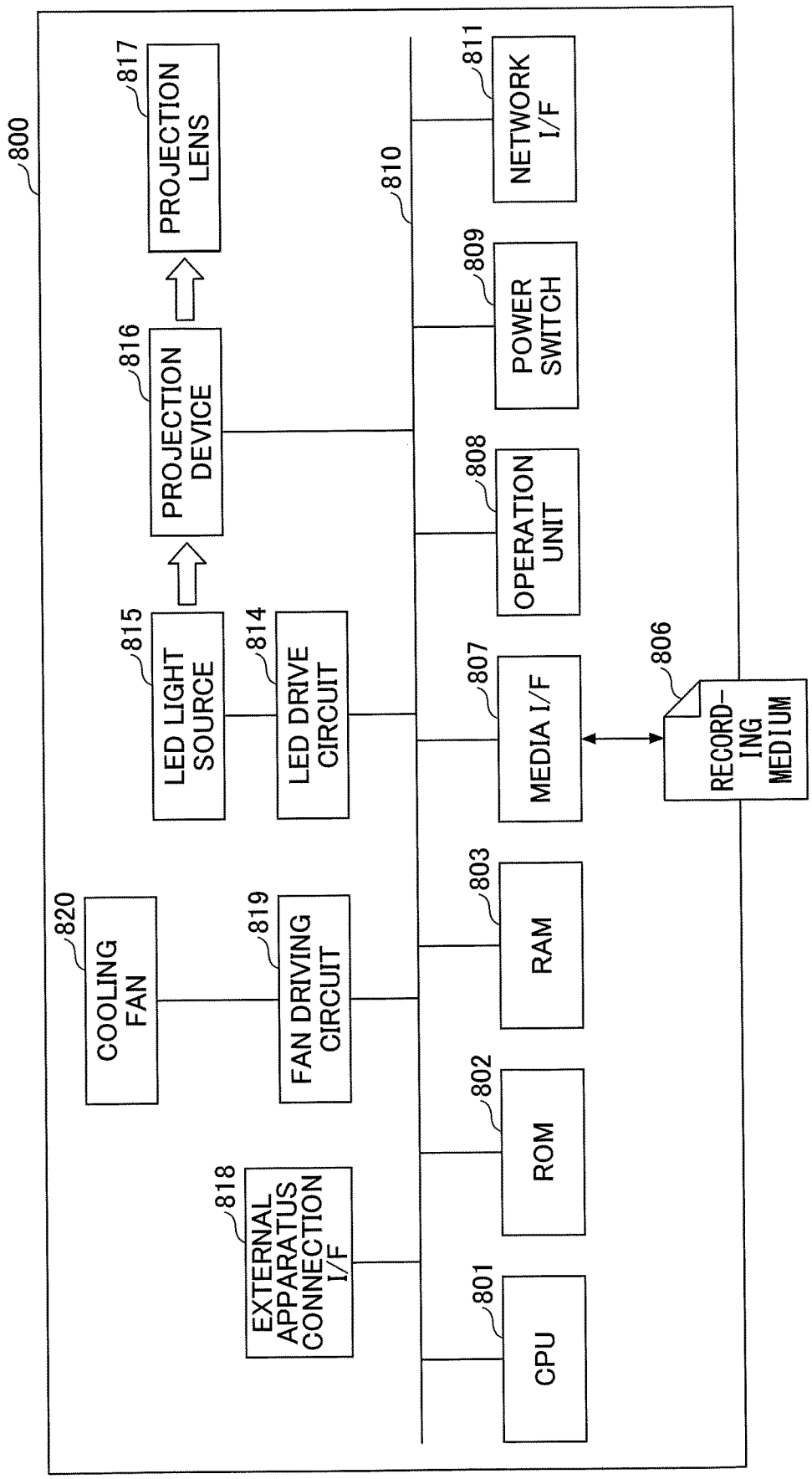
FIG. 42 is a hardware configuration diagram of a projector as an example of a terminal apparatus used in an information processing system according to the third embodiment.

The "terminal apparatus" that performs the remote connection unit to the electronic blackboard apparatus 14B is not limited to a PC. The "terminal apparatus" may be any device that provides a remote connection unit to at least the electronic blackboard apparatus 14B and can be remotely shared with the electronic blackboard apparatus 14B. For example, "terminal apparatuses" may be smartphones, video meeting terminals, or projectors, as illustrated in FIGS. 41-42. The present invention is also applicable to remote sharing between electronic blackboard apparatuses that make remote connections from other electronic blackboard apparatuses to electronic blackboard apparatus 14B.

(Example of Terminal Apparatus: Smartphones)

Figure 40:
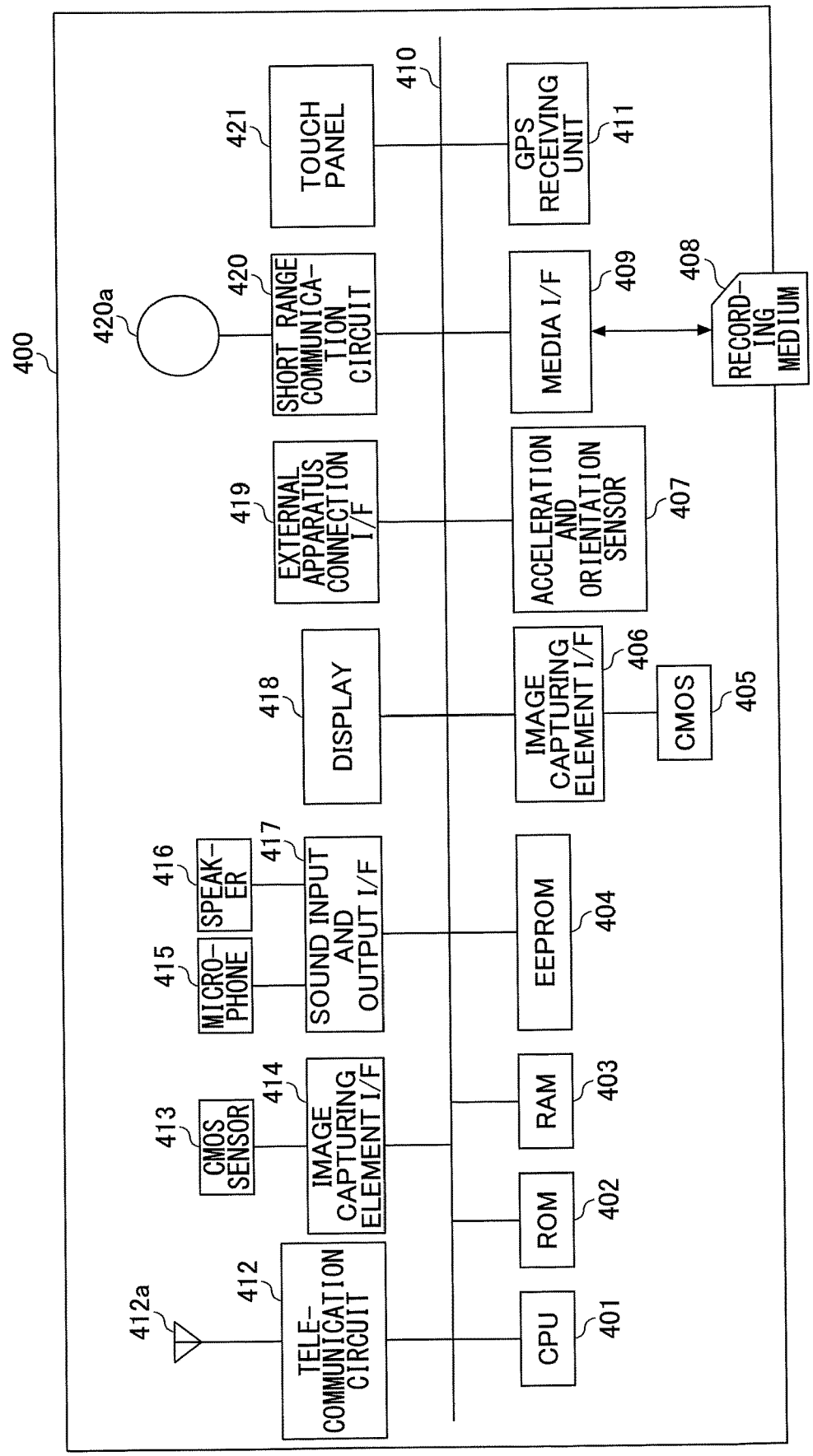
FIG. 40 is a diagram illustrating a hardware configuration of a smartphone as an example of a terminal apparatus used in an information processing system according to the third embodiment.

FIG. 40 is a hardware configuration diagram of a smartphone as an example of a terminal apparatus used in the information processing system according to the third embodiment. As illustrated in FIG. 40, the smartphone 400 includes a CPU 401, ROM 402, RAM 403, EEPROM 404, CMOS sensor 405, image capturing element I/F 406, acceleration and orientation sensor 407, media I/F 409, and GPS receiving unit 411.

In these, the CPU 401 totally controls the operation of the smartphone 400. The ROM 402 stores a program used to drive the CPU 401, an IPL, and so on. RAM 403 is used as the work area of the CPU 401. The EEPROM 404 reads out or writes various data such as a smartphone program according to the control of the CPU 401. The CMOS (Complementary Metal Oxide Semiconductor) sensor 405 is a type of built-in imaging means that captures a subject (mainly a self-image) according to the control of the CPU 401 and obtains image data. It may be an imaging unit such as a CCD (Charge Coupled Device) sensor, not a CMOS sensor. The image capturing element I/F 406 is a circuit that controls the drive of the CMOS sensor 405. The acceleration and orientation sensor 407 is a variety of sensors, such as an electromagnetic compass, a gyrocompass, and an acceleration sensor, which detect geomagnetic fields. The media I/F 409 controls the reading or writing (storage) of data to a recording medium 408, such as a flash memory. The GPS receiving unit 411 receives the GPS signal from the GPS satellite.

The smartphone 400 also includes a telecommunication circuit 412, a CMOS sensor 413, an image capturing element I/F 414, a microphone 415, a speaker 416, a sound input and output I/F 417, a display 418, an external apparatus connection I/F (Interface) 419, a short range communication circuit 420, an antenna 420a of the near range communication circuit 420, and a touch panel 421.

Of these, the telecommunications circuit 412 is a circuit for communicating with other apparatuses via a communication network. The CMOS sensor 413 is a type of built-in imaging means that captures a subject according to a control of the CPU 401 to obtain image data. The image capturing element I/F 414 is a circuit that controls the drive of the CMOS sensor 413. The microphone 415 is a built-in circuit that converts sound to an electrical signal. The speaker 416 is a built-in circuit that converts electrical signals to physical vibrations to produce sound, such as music and speech. The sound I/O I/F 417 is a circuit that processes sound signals between the microphone 415 and the speaker 416 according to the control of the CPU 401. The display 418 is a type of display means such as a liquid crystal or an organic EL (Electro Luminescence) for displaying an image of a subject or various icons. The external apparatus connection I/F 419 is an interface for connecting various external devices. The short range communication circuit 420 is a communication circuit such as a Near Field Communication (NFC) or Bluetooth® ("Bluetooth" is a registered trademark). The touch panel 421 is a type of input means by which a user depresses the display 418 to operate the smartphone 400.

The smartphone 400 also includes a bus line 410. The bus line 410 is an address bus, a data bus, or the like for electrically connecting components such as the CPU 401 illustrated in FIG. 40.

(Example of Terminal Apparatus: Video Meeting Terminal)

FIG. 41 is a hardware configuration diagram of a video meeting terminal that is an example of a terminal apparatus used in the information processing system according to the third embodiment. As illustrated in FIG. 41, the video meeting terminal 700 includes a CPU 701, ROM 702, RAM 703, flash memory 704, SSD 705, media I/F 707, operation button 708, power switch 709, bus line 710, network I/F 711, CMOS (Complementary Metal Oxide Semiconductor) sensor 712, image capturing element I/F, microphone 714, speaker 715, sound input and output I/F 716, display I/F 717, external apparatus connection I/F (interface) 718, short range communication circuit 719, antenna 719 of the short range communication circuit.

Of these, the CPU 701 totally controls the operation of the video meeting terminal 700. ROM 702 stores a program used to drive the CPU 701, such as an IPL. RAM 703 is used as the work area of the CPU 701. The flash memory 704 stores various data, such as communication programs, image data, and sound data. SSD 705 controls the reading or writing of various data to flash memory 704 in accordance with the control of CPU 701. HDD may be used instead of an SSD. The media I/F 707 controls the reading or writing (storage) of data to a recording medium 706, such as a flash memory. The operation button 708 is a button which is operated, for example, when selecting a destination of video meeting terminal 700. The power switch 709 is a switch for switching the power of the video meeting terminal 700 on and off.

The network I/F 711 is an interface for performing data communication using a communication network 16 such as the Internet. The CMOS sensor 712 is a type of built-in imaging means that captures a subject according to the control of the CPU 701 and obtains image data. It may be an imaging means, such as a CCD (Charge Coupled Device) sensor, not a CMOS sensor. The image capturing element I/F 713 is a circuit that controls the drive of the CMOS sensor 712. The microphone 714 is a built-in circuit that converts sound to an electrical signal. The speaker 715 is a built-in circuit that converts electrical signals into physical vibrations to produce sound, such as music and sound. Sound I/O I/F 716 is a circuit that processes the input and output of sound signals between the microphone 714 and the speaker 715 according to the control of CPU 701. Display I/F 717 is a circuit that transmits image data to an external display according to the control of CPU 701. The external apparatus connection I/F 718 is an interface for connecting various external devices. The short range communication circuit 719 is a communication circuit such as a Near Field Communication (NFC) or Bluetooth™.

The bus line 710 is also an address bus, a data bus, or the like for electrically connecting components such as the CPU 701 illustrated in FIG. 41.

The display 720 is a type of display means configured by a liquid crystal or an organic EL (Electro Luminescence) for displaying an image of a subject, an operation icon, or the like. The display 720 is also connected to the display I/F 717 by a cable. The cable may be a cable for analog RGB (VGA)

signals, a cable for component video, or a cable for HDMI (High-Definition Multimedia Interface) or DVI (Digital Video Interactive) signals.

The CMOS (Complementary Metal Oxide Semiconductor) sensor 712 is a type of internal imaging means that captures a subject according to the control of the CPU 401 and obtains image data. It may be an imaging means, such as a CCD (Charge Coupled Device) sensor, not a CMOS sensor. The external devices such as external cameras, external microphones, and external speakers can be connected to the external apparatus connection I/F 718 by USB cable. When an external camera is connected, the external camera drives over the built-in CMOS sensor 712 according to the control of the CPU 701. Similarly, when an external microphone is connected or an external speaker is connected, the external microphone or external speaker drives the built-in microphone 714 or the built-in speaker 715, respectively, according to the control of the CPU 701.

The recording medium 706 is detachably configured to the video meeting terminal 700. Further, the non-volatile memory that reads or writes data according to the control of the CPU 701 is not limited to the flash memory 704, and the EEPROM or the like may be used.

(Example of Terminal Apparatus: Projector)

FIG. 42 is a hardware configuration diagram illustrating a projector as an example of a terminal apparatus used in the information processing system according to the third embodiment. As illustrated in FIG. 42, projector 800 includes CPU 801, ROM 802, RAM 803, media I/F 807, operation unit 808, power switch 809, bus line 810, network I/F 811, LED (Light Emitting Diode) drive circuit 814, LED light source 815, projection device 816, projection lens 817, external device I/F (Interface) 818, fan drive circuit 819, cooling fan 820.

Of these, the CPU 801 controls the operation of the entire projector 800. ROM 802 stores the program used to drive CPU 801. RAM 803 is used as the work area of CPU 801.

The media I/F 807 controls the reading or writing (storage) of data to a recording medium 806, such as a flash memory.

The operation unit 808 is provided with various keys, buttons, LEDs, and the like and is used to perform various operations other than turning ON/OFF the power to the projector 800 by the user. For example, the operation section 808 receives an instruction operation such as an adjustment operation of the size of the projected image, an adjustment operation of the color tone, a focus adjustment operation, and a keystone adjustment operation, and outputs the received operation contents to the CPU 801.

The power switch 809 is a switch for switching the power of the projector 800 on and off.

The bus line 810 is an address bus, data bus, or the like for electrically connecting components such as CPU 801 illustrated in FIG. 42.

The network I/F 811 is an interface for performing data communication using a communication network such as the Internet.

The LED drive circuit 814 controls the lighting and turning off of the LED light source 815 under the control of the CPU 801.

The LED light source 815, when illuminated by control of the LED drive circuit 814, illuminates the projection light to the projection device 816.

The projection device 816 projects modulated light from the LED light source 815 as an image to a projection surface of the screen through the projection lens 817 in a spatial light modulation manner based on image data provided via an external apparatus connection I/F 818 or the like. Examples of projection devices 816 include liquid crystal panels or Digital Micromirror Devices (DMDs). The LED drive circuit 814, the LED light source 815, the projection device 816 and the projection lens 817 collectively function as a projection (projection means) for projecting an image onto a projection surface based on image data.

The external apparatus connection I/F 818 is directly connected to a PC (individual Computer) and acquires control signals and image data from the PC.

The fan drive circuit 819 is connected to the CPU 801 and the cooling fan 820 to drive/stop the cooling fan 820 based on a control signal from the CPU 801.

The cooling fan 820 rotates to evacuate air from the interior of the projector 800 and cool the interior of the projector 800.

When power is supplied, the CPU 801 starts according to a control program stored in the ROM 802, provides a control signal to the LED driving circuit 814 to light the LED light source 815, and provides a control signal to the fan driving circuit 819 to rotate the cooling fan 820 at a predetermined rated speed. The projector 800 is also ready for image display by the projection device 816 when the power supply from the power supply circuit 21 is initiated, and further power is supplied from the power supply circuit to various other components.

The projector 800 also transmits a power OFF signal from the power switch 809 to the CPU 801 when the power switch 809 is turned OFF. When the power OFF signal is detected, the CPU 801 provides a control signal to the LED driving circuit 814 to turn off the LED light source 815. Thereafter, when a predetermined time elapses, the CPU 801 provides a control signal to the fan driving circuit 819 to stop the cooling fan 820 and terminates its own control process, and finally provides an instruction to the power supply circuit to stop the supply of the power supply.

The present invention is not limited to the above specifically disclosed embodiments, and various modifications and variations are possible without departing from the scope of the claims. The information processing system 1 described in this embodiment is an example, and it is obvious that there are various system configuration examples depending on the application or purpose.

For example, the method of determining whether the user moved away from the information processing apparatus is not limited to the method described in the above-described embodiment. For example, a medium distance communication means such as BlueTooth or an RFID may be used to constantly communicate with the communication terminal of the user, and when communication with the communication terminal of the user becomes impossible, it may be determined that the user has moved away from the information processing apparatus.

The "information processing apparatus" of the present invention may be at least an apparatus capable of accessing a resource by a user who is logged in, and is not limited to an electronic blackboard apparatus. The "information processing apparatus" of the present invention may be, for example, a PJ (Projector), an IWB (Interactive White Board), an output device such as a digital signage, an HUD (Head Up Display) device, an industrial machine, an imaging device, a sound collector, a medical device, a network home appliance, a individual computer, a cellular phone, a smartphone, a tablet terminal, a game machine, a PDA (individual Digital Assistant), a digital camera, a wearable PC or a desktop PC, or the like.

The functions of the embodiments described above may also be implemented by one or more processing circuits. As used herein, a "processing circuit" includes a processor programmed to perform each function by software, such as a processor implemented in electronic circuits, an ASIC (Application Specific Integrated Circuit) designed to perform each function as described above, a digital signal processor (DSP), a field programmable gate array (FPGA), or a conventional circuit module.

Also, the apparatuses described in the examples are merely indicative of one of a plurality of computing environments for carrying out the embodiments disclosed herein. In some embodiments, at least one of the groups of devices described in the embodiments includes a plurality of computing devices such as a server cluster. The plurality of computing devices are configured to communicate with each other via any type of communication link, including networks, shared memory, and the like, and perform the processes disclosed herein. The functions of at least any of the apparatuses described in the examples may also be performed by other devices of the group of devices described in the examples. In addition, each element of any of the apparatuses and other devices in the group of devices described in the embodiment may be grouped into a single server device or divided into a plurality of devices.

The remote sharing includes sharing of screens displayed on electronic meeting boards between multiple electronic meeting boards installed at remote locations, joint editing of screens (performing electronic meeting board functions at remote locations), sharing of images and images of participants in meetings viewed on cameras with cameras owned by electronic meeting boards, and sharing, joint editing and transmission of files acquired from electronic meeting boards and shared storage. Here, the screen sharing refers to the display of the same contents on the screens of the respective electronic blackboard apparatuses between multiple electronic blackboard apparatuses installed at a remote location and the use of the same contents for discussion at a remote meeting. Joint editing refers to the writing together of multiple teleconferencing devices and the editing of files on the same screen.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Effects of the Invention

According to an embodiment of the present invention, when some users move away from the vicinity of the information processing apparatus, other users may be prevented from unauthorized access of the resources owned by the user.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing apparatus has been described in detail, it should be understood that various changes, substitutions, and alterations could be made thereto without departing from the spirit and scope of the invention.

What is claimed is:

1. An information processing apparatus utilized by a plurality of users at a predetermined installation location, the information processing apparatus comprising:
   circuitry that is configured to
      perform login authentication of a first user and a second user, among the plurality of users;
      register first user and the second user, who have been subjected to the login authentication, into a participant view; the participant view including a first authentication status of the first user and a second authentication status of the second user; the first authentication status indicating that the first user is authenticated, and the second authentications status indicating that the second user is authenticated;
      enable access to a first resource owned by the first user, and enable access to a second resource owned by the second user the first resource and the second resource being provided through an external service provider;
      change the second authentication status to a status indicating that the second user is unauthenticated;
      prevent access to the second resource owned by the second user, in response to determining that the second authentication status indicates that the second user is unauthenticated; and
      while the first user remains in an authenticated state and the second user remains in an unauthenticated state, transmit a file to all users in the participant view, including the first user in the authenticated state and the second user in the unauthenticated state.

2. The information processing apparatus according to claim 1, wherein the second authentication status is changed to a status indicating that the second user is unauthenticated when a predetermined time has elapsed after the second user has been subjected to the login authentication.

3. The information processing apparatus according to claim 1, the information processing apparatus further comprising:
   an image capturing unit configured to capture an image of the predetermined installation location, wherein the second authentication status is changed to a status indicating that the second user is unauthenticated when the second user has stopped appearing in the image captured by the image capturing unit.

4. The information processing apparatus according to claim 1, wherein, when the second user is in an unauthenticated state, the user is subjected to the login authentication again when access to the second resource is requested.

5. The information processing apparatus according to claim 1, wherein
access to the second resource is prevented by either restricting reading of a file or writing of the file to When a storage service.

6. The information processing apparatus according to claim 1, the information processing apparatus further comprising:
a display configured to simultaneously display a first individual information display screen and a second individual information display screen; the first individual display screen indicating the first user and the first authentication status, and the second individual display screen indicating the second user and the second authentication status.

7. The information processing apparatus according to claim 1,
wherein participants in a meeting are registered in the participant view, the first user and the second user among the participants in the meeting, and
wherein the file is transmitted to all users in the participant view, including the first user in the authenticated state and the second user in the unauthenticated state, in response to an operation of an operation component for ending the meeting.

8. The information processing apparatus according to claim 7, wherein, in response to the operation of the operation component, the circuitry performs a logoff process for the first user and the second user, and clears all values set in the participant view.

9. An information processing system utilized by a plurality of users at a predetermined installation location, the information processing system comprising:
a server apparatus; and
one or more information processing apparatuses, the server apparatus and the one or more information processing apparatuses including circuitry configured to:
perform login authentication of a first user and a second user, among the plurality of users;
register the first user and the second user, who have been subjected to the login authentication into a participant view; the participant view including a first authentication status of the first user and a second authentication status of the second user; the first authentication status indicating that the first user is authenticated, and the second authentications status indicating that the second user is authenticated;
enable access to a first resource owned by the first user, and enable access to a second resource owned by the second user the first resource and the second resource being provided through an external service provider;
change the second authentication status to a status indicating that the second user is unauthenticated;
prevent access to the second resource owned by the second user, in response to determining that the second authentication status indicates that the second user is unauthenticated; and
while the first user remains in an authenticated state and the second user remains in an unauthenticated state, transmit a file to all users in the participant view, including the first user in the authenticated state and the second user in the unauthenticated state.

10. The information processing system according to claim 9, wherein in a case where a user from among the plurality of users registered in the participant view logs into a first information processing apparatus among the one or more information processing apparatuses through a terminal apparatus different from the first information processing apparatus, the first information processing apparatus is presented as a candidate fora remote connection destination in the terminal apparatus in response to the login authentication.

11. The information processing system according to claim 10, wherein in a case where the user logs in the terminal apparatus apparatus and remotely connects to the first information processing apparatus using the terminal apparatus, the information processing apparatus displays that the user is remotely connected or registered in the participant view.

12. The information processing system according to claim 9, wherein in a case where a user not registered in the participant view logs in at a terminal apparatus different from a first information processing apparatus among the one or more information processing apparatuses and remotely connects to the first information processing apparatus using a remote connection unit of the terminal apparatus, the circuitry further registers the user logged in at the terminal apparatus in the participant view.

13. The information processing system according to claim 12, wherein in a case where the user who logs in at the terminal apparatus is registered in the participant view, the user who logs in at the terminal apparatus is registered in the participant view as unauthenticated.

14. The information processing system according to claim 9, wherein access to the second resource is prevented by either restricting reading of a file or writing of the file to a storage service.

15. A control method used in an information processing apparatus utilized by a plurality of users at a predetermined installation location, the control method comprising:
performing login authentication of a first user and a second user, among the plurality of users;
registering the first user and the second user, who have been subjected to the login authentication, into a participant view; the participant view including a first authentication status of the first user and a second authentication status of the second user; the first authentication status indicating that the first user is authenticated, and the second authentications status indicating that the second user is authenticated;
enabling access to a first resource owned by the first user, and enabling access to a second resource owned by the second user, the first resource and the second resource being provided through an external service provider;
changing the second authentication status to a status indicating that the second user is unauthenticated;
preventing access to the second resource owned by the second user, in response to determining that the second authentication status indicates that the second user is unauthenticated; and
while the first user remains in an authenticated state and the second user remains in an unauthenticated state, transmitting a file to all users in the participant view, including the first user in the authenticated state and the second user in the unauthenticated state.

16. The control method according to claim 15, wherein access to the second resource is prevented by either restricting reading of a file or writing of the file to a storage service.

* * * * *